(12) United States Patent
Klassen et al.

(10) Patent No.: US 11,128,188 B2
(45) Date of Patent: *Sep. 21, 2021

(54) ELECTRIC MACHINE

(71) Applicant: GENESIS ROBOTICS AND MOTION TECHNOLOGIES CANADA, ULC, Langley (CA)

(72) Inventors: James Brent Klassen, Surrey (CA); Damian Spasov, Port Moody (CA); Bradley Pope, Langley (CA)

(73) Assignee: GENESIS ROBOTICS AND MOTION TECHNOLOGIES CANADA, ULC, Langley (CA)

( * ) Notice: Subject to any disclaimer, the term of this patent is extended or adjusted under 35 U.S.C. 154(b) by 0 days.

This patent is subject to a terminal disclaimer.

(21) Appl. No.: 16/574,092

(22) Filed: Sep. 18, 2019

(65) Prior Publication Data

US 2020/0028390 A1 Jan. 23, 2020

Related U.S. Application Data

(63) Continuation of application No. 15/487,411, filed on Apr. 13, 2017, now Pat. No. 10,461,592, which is a (Continued)

(51) Int. Cl.
*H02K 1/27* (2006.01)
*H02K 1/22* (2006.01)
(Continued)

(52) U.S. Cl.
CPC .......... *H02K 1/2793* (2013.01); *B25J 9/0009* (2013.01); *B25J 9/12* (2013.01);
(Continued)

(58) Field of Classification Search
CPC .......... H02K 1/30; H02K 1/2793; H02K 1/27; H02K 1/2773; H02K 1/2766; H02K 1/02;
(Continued)

(56) References Cited

U.S. PATENT DOCUMENTS

| 1,730,424 A | 10/1929 | Harrison |
| 3,791,706 A | 2/1974 | Dobson |

(Continued)

FOREIGN PATENT DOCUMENTS

| CN | 1297056 C | 1/2007 |
| CN | 101919140 A | 12/2010 |

(Continued)

OTHER PUBLICATIONS

Extended European Search Report for EP application No. 17781694.9, dated Nov. 21, 2019, pp. 7.

(Continued)

*Primary Examiner* — Burton S Mullins

(57) ABSTRACT

An electric motor has a first carrier having an array of electromagnetic elements and a second carrier having electromagnetic elements defining magnetic poles. The first and second carriers each define an axis. An airgap is formed between the first and second carriers when in an operational position. An inner thrust bearing connects the first and second carriers and is arranged to allow relative rotary motion of the carriers. An outer thrust bearing connects the first and second carriers and is arranged to allow relative rotary motion of the carriers. The electromagnetic elements of each of the first and second carriers are arranged radially inward of the outer thrust bearing and radially outward of the inner thrust bearing. The inner thrust bearing and the outer thrust bearing are arranged to maintain the airgap against a magnetic attraction of the electromagnetic elements of the first and second carriers.

16 Claims, 43 Drawing Sheets

Related U.S. Application Data continuation of application No. 15/235,088, filed on Aug. 11, 2016, now Pat. No. 10,476,323.

(60) Provisional application No. 62/460,086, filed on Feb. 16, 2017, provisional application No. 62/363,202, filed on Jul. 15, 2016, provisional application No. 62/322,217, filed on Apr. 13, 2016.

(51) Int. Cl.

| | | |
|---|---|---|
| *H02K 1/32* | (2006.01) | |
| *B25J 9/00* | (2006.01) | |
| *B25J 9/12* | (2006.01) | |
| *B25J 15/00* | (2006.01) | |
| *B25J 15/02* | (2006.01) | |
| *B25J 15/08* | (2006.01) | |
| *B25J 17/00* | (2006.01) | |
| *B25J 19/00* | (2006.01) | |
| *H02K 1/02* | (2006.01) | |
| *H02K 1/06* | (2006.01) | |
| *H02K 1/08* | (2006.01) | |
| *H02K 1/14* | (2006.01) | |
| *H02K 1/16* | (2006.01) | |
| *H02K 1/24* | (2006.01) | |
| *H02K 3/04* | (2006.01) | |
| *H02K 3/12* | (2006.01) | |
| *H02K 3/24* | (2006.01) | |
| *H02K 3/26* | (2006.01) | |
| *H02K 5/04* | (2006.01) | |
| *H02K 5/16* | (2006.01) | |
| *H02K 5/18* | (2006.01) | |
| *H02K 7/08* | (2006.01) | |
| *H02K 9/02* | (2006.01) | |
| *H02K 9/19* | (2006.01) | |
| *H02K 15/04* | (2006.01) | |
| *H02K 16/04* | (2006.01) | |
| *H02K 19/10* | (2006.01) | |
| *H02K 21/00* | (2006.01) | |
| *H02K 21/14* | (2006.01) | |
| *H02K 21/22* | (2006.01) | |
| *H02K 21/24* | (2006.01) | |
| *H02K 41/03* | (2006.01) | |
| *H02K 9/00* | (2006.01) | |
| *H02K 1/20* | (2006.01) | |
| *H02K 7/14* | (2006.01) | |

(52) U.S. Cl.
CPC ........ *B25J 15/0009* (2013.01); *B25J 15/0233* (2013.01); *B25J 15/08* (2013.01); *B25J 17/00* (2013.01); *B25J 19/0029* (2013.01); *H02K 1/02* (2013.01); *H02K 1/06* (2013.01); *H02K 1/08* (2013.01); *H02K 1/14* (2013.01); *H02K 1/16* (2013.01); *H02K 1/22* (2013.01); *H02K 1/24* (2013.01); *H02K 1/27* (2013.01); *H02K 1/274* (2013.01); *H02K 1/278* (2013.01); *H02K 1/2773* (2013.01); *H02K 1/32* (2013.01); *H02K 3/04* (2013.01); *H02K 3/12* (2013.01); *H02K 3/24* (2013.01); *H02K 3/26* (2013.01); *H02K 5/04* (2013.01); *H02K 5/16* (2013.01); *H02K 5/18* (2013.01); *H02K 7/08* (2013.01); *H02K 9/00* (2013.01); *H02K 9/02* (2013.01); *H02K 9/19* (2013.01); *H02K 15/04* (2013.01); *H02K 16/04* (2013.01); *H02K 19/10* (2013.01); *H02K 21/00* (2013.01); *H02K 21/14* (2013.01); *H02K 21/22* (2013.01); *H02K 21/24* (2013.01); *H02K 41/031* (2013.01); *H02K 1/20* (2013.01); *H02K 7/14* (2013.01); *H02K 2201/12* (2013.01); *H02K 2213/03* (2013.01)

(58) Field of Classification Search
CPC .. H02K 1/22; H02K 1/20; H02K 3/24; H02K 1/278; H02K 19/10; H02K 9/19; H02K 1/08; H02K 1/16; H02K 9/02; H02K 5/18; H02K 3/26; H02K 21/22; H02K 1/32; H02K 1/24; H02K 21/00; H02K 7/08; H02K 21/24; H02K 9/005; H02K 5/04; H02K 3/04; H02K 1/06; H02K 5/16; H02K 16/04; H02K 21/14; H02K 7/14; H02K 2201/12; B25J 9/0009; B25J 15/0009; B25J 19/0029; B25J 19/0023; B25J 19/12; B25J 17/00; B25J 15/08; B25J 9/12

See application file for complete search history.

(56) References Cited

U.S. PATENT DOCUMENTS

| | | |
|---|---|---|
| 4,701,651 A | 10/1987 | Tanaka |
| 4,774,428 A | 9/1988 | Konecny |
| 4,873,962 A | 10/1989 | Safranek |
| 5,006,745 A | 4/1991 | Nishio et al. |
| 5,216,339 A | 6/1993 | Skybyk |
| 5,394,283 A | 2/1995 | Hans et al. |
| 5,442,250 A | 8/1995 | Stridsberg |
| 5,619,087 A | 4/1997 | Sakai |
| 5,698,919 A | 12/1997 | Obara |
| 6,081,057 A | 6/2000 | Tanaka |
| 6,348,751 B1 | 2/2002 | Jermakian |
| 6,741,428 B1 | 5/2004 | Oveyssi |
| 6,768,239 B1 | 7/2004 | Kelecy et al. |
| 6,948,855 B2 | 9/2005 | Shirasawa |
| 7,030,518 B2 | 4/2006 | Tsuboi et al. |
| 7,321,176 B2 | 1/2008 | Strothmann |
| 7,385,329 B2 | 6/2008 | Hill |
| 7,737,594 B2 | 6/2010 | Abe et al. |
| 8,026,626 B1* | 9/2011 | Meller ...................... F03D 9/25 290/55 |
| 8,624,456 B2 | 1/2014 | Lamperth et al. |
| 9,124,153 B2* | 9/2015 | Moller Hansen ......... F03D 9/25 |
| 10,148,144 B2 | 12/2018 | Busch et al. |
| 10,461,592 B2* | 10/2019 | Klassen ................... H02K 1/08 |
| 2003/0048021 A1 | 3/2003 | Frazee |
| 2005/0099080 A1 | 5/2005 | Matsumoto et al. |
| 2010/0090555 A1 | 4/2010 | Tajima et al. |
| 2011/0260566 A1* | 10/2011 | Odvarka ............... H02K 1/2793 310/156.12 |
| 2014/0145547 A1 | 5/2014 | Nakano |
| 2015/0229194 A1* | 8/2015 | Sromin ................... H02K 21/24 310/156.07 |
| 2015/0311756 A1* | 10/2015 | Sullivan ................. H02K 1/278 310/12.14 |
| 2015/0318745 A1* | 11/2015 | Matsuoka ............ H02K 1/2773 310/156.56 |

FOREIGN PATENT DOCUMENTS

| | | |
|---|---|---|
| CN | 202798411 U | 3/2013 |
| CN | 104508958 A | 4/2015 |
| CN | 105048665 A | 11/2015 |
| DE | 4216489 A1 | 11/1992 |
| EP | 2802062 A1 | 11/2014 |
| GB | 190904024 A | 10/1909 |
| JP | S58175950 A | 10/1983 |
| JP | S6016335 A | 1/1985 |
| JP | H03169250 A | 7/1991 |
| JP | H06-26517 A | 2/1994 |
| JP | H06-335191 A | 12/1994 |
| JP | 2005-045868 A | 2/2008 |
| JP | 2008-048498 A | 2/2008 |

(56) References Cited

FOREIGN PATENT DOCUMENTS

| | | |
|---|---|---|
| JP | 2008167589 A | 7/2008 |
| JP | 2010-051075 A | 3/2010 |
| JP | 2010057281 A | 3/2010 |
| JP | 2010-094001 A | 4/2010 |
| JP | 2011-167023 A | 8/2011 |
| JP | 2014-107939 A | 6/2014 |
| JP | 2015-033287 A | 2/2015 |
| JP | 2015-061394 A | 3/2015 |
| JP | 2015-080403 A | 4/2015 |
| JP | 2015-116033 A | 6/2015 |
| WO | 2014/030246 A1 | 2/2014 |
| WO | 2017024409 A1 | 2/2017 |

OTHER PUBLICATIONS

International Search Report & Written Opinion for corresponding PCT Application No. PCT/CA2017/050470, dated Aug. 15, 2017, 10 pages.

Libert, F. et al., "Investigation on pole-slot combinations for permanent-magnet machines with concentrated Nindings", Proc. ICEM, 2004, Dec. 31, 2004, pp. 530-535, https:/lwww.researchgate.net/publication/237458473_investigation_on_Pole-Slot_Combinations for _Permanent-Magnet_Machines_with_Concentrated_Windings.pdf; table 1.

Extended European Search Report for EP application No. 17798434.1, dated Nov. 22, 2019, pp. 15.

JP Notice of Reasons for Refusal for JP Application No. 2019-511900, dated Mar. 17, 2020, pp. 15.

KR Notification of Reason for Refusal for KR Application No. 10-2018-7032027, dated Jan. 30, 2020, pp. 9.

CN First Office action for CN application No. 201780029653, dated Dec. 25, 2019, pp. 12.

Office Action received for Korean application No. 10-2018-7032027, dated Jul. 1, 2019, 9 pages. (5 pages of x English Translation and 4 pages of Official Copy).

International Search Report & Written Opinion for corresponding PCT Application No. PCT/CA2017/050471, dated Nov 23, 2017, 8 pages.

Non-final office action received for U.S. Appl. No. 16/093,092, dated Oct. 21, 2020, 23 pages.

Final Office Action received for U.S. Appl. No. 16/093,092, dated Feb. 25, 2021, 14 Pages.

Non-Final Rejection received for U.S. Appl. No. 16/093,092, dated May 28, 2021, 17 Pages.

\* cited by examiner

ELECTRIC MACHINE

RELATED APPLICATIONS

This application is a continuation of U.S. application Ser. No. 15/487,411, filed on Apr. 13, 2017, which further claims priority to U.S. Provisional Application No. 62/322,217, filed on Apr. 13, 2016, U.S. Provisional Application No. 62/363,202, filed on Jul. 15, 2016, U.S. Provisional Application No. 62/460,086, filed on Feb. 16, 2017, and U.S. application Ser. No. 15/487,411 is Continuation of U.S. application Ser. No. 15/235,088, filed on Aug. 11, 2016 which are incorporated herein by reference in their entirety.

FIELD

Electric machines.

BACKGROUND

In the design of electric machines, it is known to select structural parameters such as slot number depending on the intended application and desired performance characteristics of the machine. However, not all values of the structural parameters are used in practice. There is room for improved performance of electric machines, particularly in robotics.

Electric machines typically use electrically conductive wire turns wrapped around soft magnetic stator posts (teeth) to generate flux. The manufacturing process for this type of motor construction can be time consuming and expensive. As well, such motors typically have a torque to mass ratio that makes them relatively heavy for mobile actuator applications such as in robotics where the weight of a downstream actuator must be supported and accelerated by an upstream actuator.

Common permanent magnet direct drive motors can be difficult to assembly because of high permanent magnet forces between the rotor and stator. These high magnetic forces typically require complex fixtures for assembly to avoid damage to parts and injury to personnel as the rotor and stator are brought together.

Large diameter, low profile bearings that are used in many motion control devices such as robot arm joints, must typically be physically retained in the housings to prevent separation of the bearing assembly. Many low profile bearings also tend to be relatively low tolerance compared to larger profile, smaller diameter bearings. Moreover, bearings typically require an adjustable preload that is typically provided by a threaded or other type of member. This is difficult to fit into a low profile assembly and is especially challenging with thin section bearings.

In a common axial flux actuator, the bearings are located at the inner diameter of the magnetic active section of the rotor. This setup is a common practice because placing a bearing at the outer diameter of the rotor induces more drag and the overall bearing profile increases as the bearing diameter increases. Bearings on the OD of the rotor will also tend to limit the rotational speed of the device.

To make a single inner bearing work with a single rotor/single stator, either the rotor and stator structures must be thickened to provide a stiffer structure to reduce deflection, or the air gap distance must be increased to accommodate the rotor and stator deflection. The first method results in a heavier device and larger envelope which reduces actuator acceleration and torque density. The latter method result in a reduction of torque due to the larger air gap distance.

SUMMARY

The inventor has proposed an electric machine with a novel range of structural parameters particularly suited for robotics, along with additional novel features of an electric machine.

In an embodiment, there is provided an axial flux electric machine comprising a first carrier having an array of electromagnetic elements and a second carrier having electromagnetic elements defining magnetic poles. The first carrier defines a first carrier axis and the second carrier defines a second carrier axis. An airgap is formed between the first carrier and the second carrier when the first carrier and second carrier are in an operational position. An inner thrust bearing connects the first carrier and the second carrier. The inner thrust bearing is arranged to allow relative rotary motion of the first carrier and the second carrier. An outer thrust bearing connects the first carrier and the second carrier. The outer thrust bearing is arranged to allow relative rotary motion of the first carrier and the second carrier. The electromagnetic elements of the first carrier and the electromagnetic elements of the second carrier are arranged radially inward of the outer thrust bearing and radially outward of the inner thrust bearing. The inner thrust bearing and the outer thrust bearing are arranged to maintain the airgap against a magnetic attraction of the electromagnetic elements of the first carrier and the electromagnetic elements of the second carrier.

There may be included one or more of the following or other features. The outer thrust bearing may be a pure thrust bearing. The inner thrust bearing may be a radially locating bearing. The inner thrust bearing may be both radially and axially locating. The inner thrust bearing may be a pure thrust bearing. The outer thrust bearing may be a radially locating bearing. The outer thrust bearing may be both radially and axially locating. The outer thrust bearing may be both radially and axially locating and the inner thrust bearing may be both radially and axially locating. The electromagnetic elements of the first carrier may further comprise a multiphase wiring configuration defining three or more sections, each section corresponding to a respective phase. Each of the three or more sections may further comprise a number of wired posts, and in which the number of wired posts for each of the three or more sections is the same. The three or more sections may further comprise four equally arrayed sections for each of the respective phases. The each of the four equally arrayed sections may further comprise at least four wired posts. The magnetic poles of the second carrier may be formed by permanent magnets. The permanent magnets may be arranged in corresponding slots defined by a backiron of the second carrier. The slots may be open to a face of the second carrier facing away from the first carrier in the operational position. The permanent magnets may be held in place in the corresponding slots by magnetic force when the first and second carriers are in the operational position. The permanent magnets may be designed so that they are not held in place in the corresponding slots by the magnetic force when the second carrier is separated from the first carrier. Each of the permanent magnets and the corresponding slots may have cooperating tapered shapes, and in which the permanent magnets are positionally stabilized within the slots by the respective cooperating tapered shapes. There may be tabs at each of the slots in which the tabs are adjacent to a face of the second carrier facing towards the first carrier in the operational position and in which the permanent magnets are positionally stabilized within the slots by the tabs. The permanent magnets may be positionally stabilized within the slots by glue. The inner thrust bearing may further comprise a first inner bearing groove, a second inner bearing grove and a plurality of inner bearing elements. The outer thrust bearing may further comprise a first outer bearing groove, a second outer bearing groove and a plurality of outer bearing elements. The first carrier may further comprise a homogenous first plate, and the first inner bearing groove and the first outer bearing groove may be homogenous extensions of the homogenous first plate. The second carrier may further comprise a homogenous second plate, and the second inner bearing groove and the second outer bearing groove may be homogenous extensions of the homogenous second plate. The inner bearing elements may further comprise balls. The inner bearing elements may further comprise rollers. The outer bearing elements may further comprise balls. The outer bearing elements may further comprise rollers. The homogenous second plate may further comprise a backiron and the magnetic poles of the second carrier may be formed by permanent magnets. The permanent magnets may be arranged in corresponding slots defined by the backiron in which the slots are open to a face of the second carrier facing away from the first carrier in the operational position. The homogenous second plate may be made from any one of iron, ductile iron and steel alloy. The homogenous second plate may be made from ductile iron with an electrical conductivity inhibitor. The homogenous second plate may be made from cast iron with an electrically conductivity inhibitor. The electrical conductivity inhibitor may be silicon. The homogenous first plate may further comprise posts that form the electromagnetic elements of the first carrier, with slots between the posts, one or more electric conductors in each slot, and in which the posts form part of the homogenous first plate. The homogenous first plate may be made from one of iron, ductile iron and steel alloy. The homogenous first plate may be made from ductile iron with an electrical conductivity inhibitor. The homogenous first plate may be made from cast iron with an electrical conductivity inhibitor. The electrical conductivity inhibitor may be silicon.

In another embodiment there is provided an electric machine comprising a stator having an array of electromagnetic elements and a rotor having electromagnetic elements defining magnetic poles. The stator defines a stator axis and the rotor carrier defines a rotor axis. An airgap is formed between the rotor and the stator when the stator and the rotor are in an operational position. An inner thrust bearing connects the rotor and the stator. The inner thrust bearing is arranged to allow relative rotary motion of the stator and the rotor. An outer thrust bearing connects the rotor and the stator. The outer thrust bearing is arranged to allow relative rotary motion of the stator and the rotor. The electromagnetic elements of the stator and the electromagnetic elements of the rotor have a magnetic attraction between to each other. The rotor and stator are held together by the magnetic attraction between electromagnetic elements of the rotor and the stator during operation of the electric machine.

In various embodiments, there may be included one or more of the following or other features. The electromagnetic elements of the rotor and the electromagnetic elements of the stator may be arranged radially inward of the outer thrust bearing and radially outward of the inner thrust bearing. The inner thrust bearing and the outer thrust bearing may be arranged to maintain the airgap against the magnetic attraction of the electromagnetic elements of the stator and the electromagnetic elements of the rotor. A safety ring may extend from one of the rotor or the stator and comprise a first shoulder and a second shoulder on the other of the stator or the rotor. The first shoulder may protrude in a first radial direction and the second shoulder may protrude in a second radial direction opposed to the first radial direction. The first shoulder is configured to cooperate with the second shoulder to prevent separation of the rotor and the stator beyond a pre-determined distance. The magnetic attraction between the electromagnetic elements of the stator and the rotor may be strong enough to maintain the stator and rotor in an operational position when the electric machine acts on a load. The stator may further comprise N posts and the magnetic poles of the rotor further may further comprise M poles, in which N and M have a greatest common divisor of four or more. The posts may be divided into sections with a common phase of electrical excitation in conductors around the posts in each section and there is an even number of posts in each section. The posts may be divided into at least three sections. Both N and M may be 60 or more. The conductors on the stators further may further comprise multiphase wiring configurations. Each of the three or more sections may further comprise a number of wired posts, and the number of wired posts for each of the three or more sections may be the same. The three or more sections further comprise two or more equally arrayed sections per phase. The three or more sections may further comprise four or more equally arrayed sections per phase. The three or more section may further comprise six or more equally arrayed sections per phase. The three or more sections may further comprise exactly four equally arrayed sections for each of the respective phases. Each of the equally arrayed sections may further comprise eight wired posts. There may be 96 posts and 92 poles. The rotor may further comprise a plurality of posts in which the electromagnetic elements of the rotor are placed between the plurality of posts. The rotor may also comprise a plurality of inner flux restrictors lying radially inward from the plurality of posts and radially outward from the inner thrust bearing. The plurality of inner flux restrictors may further comprise a plurality of holes within the rigid element. The plurality of inner flux restrictors may further comprise a plurality of blind holes or a plurality of through holes. The rotor may further comprise a plurality of outer flux restrictors lying radially outward from the posts and radially inward from the outer thrust bearings. The plurality of outer flux restrictors may further comprise a plurality of holes within the rigid elements. The plurality of outer flux restrictors may further comprise a plurality of blind holes or a plurality of through holes. The rotor may further comprise a plurality of inner flux restrictors lying radially inward from the posts and radially outward from the inner thrust bearing. The plurality of inner flux restrictors may further comprise a plurality of holes within the rigid element and in which the rotor further comprises a plurality of outer flux restrictors lying radially outward from the posts and radially inward from the outer thrust bearing. The plurality of outer flux restrictors comprises a plurality of holes within the rigid elements. Each of the inner and outer flux restrictors may be radially aligned in an alternating pattern relative to the posts on the rotor, so that the inner and outer flux restrictors are adjacent to every second post on the rotor. The inner and outer flux restrictors may be radially aligned with the posts on the rotor, and the inner and outer flux restrictors may be adjacent to each post on the rotor. The plurality of inner flux restrictors and the plurality of outer flux restrictors may each comprise a plurality of holes having the same geometry. The plurality of holes having the same geometry may further comprise a plurality of holes having a circular cross-section.

These and other aspects of the device and method are set out in the claims.

BRIEF DESCRIPTION OF THE DRAWINGS

Reference will now be made to preferred embodiments of the invention, by way of example only, with reference to the following figures in which.

DETAILED DESCRIPTION

Figure 1:
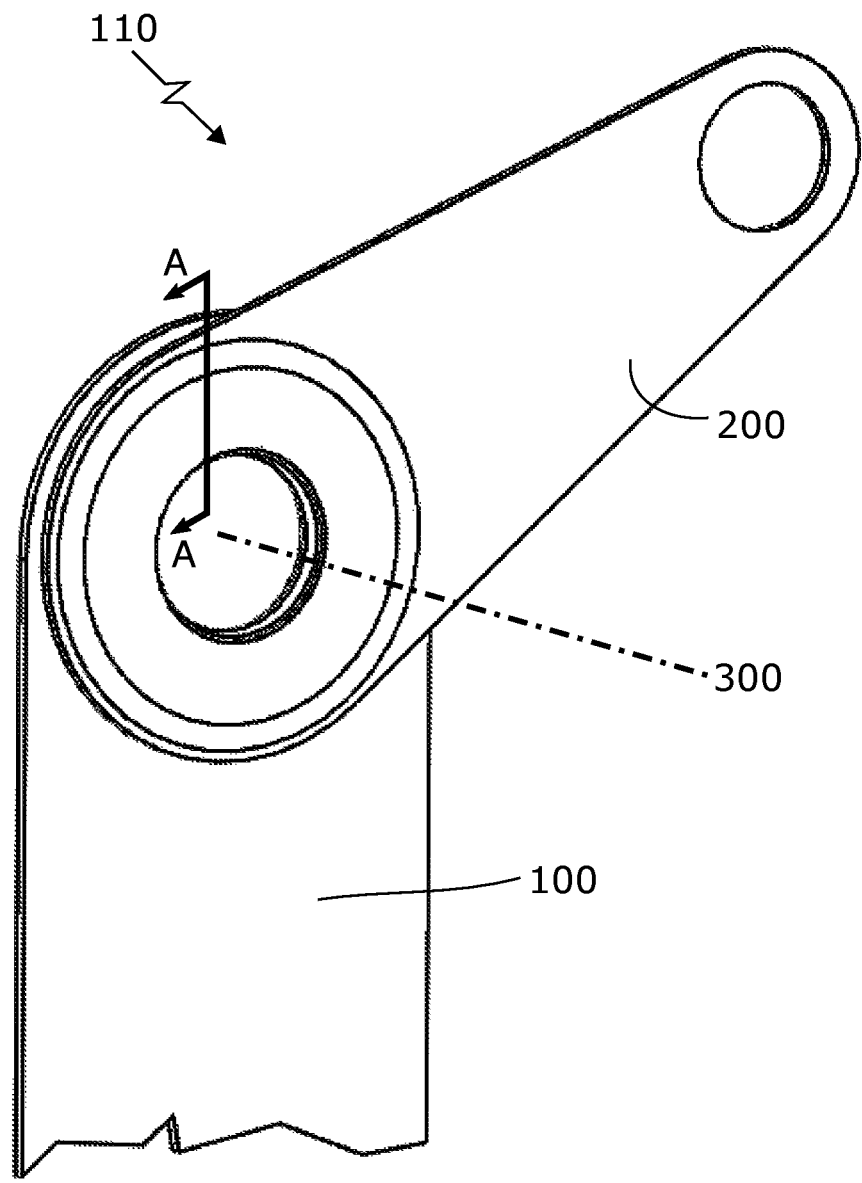
FIG. 1 is an isometric view of an exemplary actuator.

Several terms to be used throughout the text will first be defined.

A carrier, as used here in the context of electric machines, may comprise a stator or a rotor when referring to rotary machines.

A rotor as used herein may be circular. A rotor may also refer the armature or reaction rail of a linear motor. A stator may be circular. It may also refer to the armature or reaction rail of a linear motor.

Teeth may be referred to as posts.

In an electric machine, either a stator or rotor may have a commutated electromagnet array defined by coils wrapped around posts, while the other of the stator or rotor may have magnetic poles defined by permanent magnets or coils or both coils and permanent magnets. An electric machine may be configured as a motor or generator.

Permanent magnets may be used in combinations with electromagnets on the rotor and/or stator to add flux to the system.

PM means permanent magnet. EM means electromagnet. ID means inner diameter. OD means outer diameter.

Electromagnetic elements may comprise permanent magnets, posts, slots defined by magnetic posts, which may be soft magnetic posts, and electrical conductors. In any embodiment where one carrier has slots and posts, the other may have permanent magnets for the electromagnetic elements, and for any such embodiment, the term electromagnetic element may be replaced by the term permanent magnet. Magnetic poles in some cases, for example in a concentrated flux rotor embodiment, may be defined by permanent magnets in conjunction with adjacent posts in which a magnetic field is established by the permanent magnets.

Unless otherwise specified, flux refers to magnetic flux. Soft Magnetic Material is a material that is magnetically susceptible and that can be temporarily magnetised such as but not limited to iron or steel or a cobalt or nickel alloy.

A fractional slot motor is a motor with a fractional number of slots per pole per phase. If the number of slots is divided by the number of magnets, and divided again by the number of phases and the result is not an integer, then the motor is a fractional slot motor.

Thrust bearings include any bearing arranged to support a substantial axial thrust, including angular contact bearings and four-point contact bearings as well as pure thrust bearings. A radially locating bearing is a bearing that, in use, prevents relative displacement of the axes of the elements connected by the bearing.

A bearing can be radial and thrust locating (such as a cross roller bearing) or it can be just radial or just thrust locating.

A carrier may be supported for motion relative to another carrier by a frame or bearings, and the bearings may be sliding, roller, fluid, air or magnetic bearings.

An axial electric machine is an electric machine in which magnetic flux linkage occurs across an axial airgap, and the carriers are in the form of discs mounted coaxially side by side. A first carrier can be arranged to move relative to another carrier by either carrier being supported by a frame, housing or other element, while the other carrier moves relative the first carrier.

A radial electric machine is an electric machine where the airgap is oriented such that magnetic flux is radially oriented, and the carriers are mounted concentrically, one outside the other.

A linear actuator is comparable in construction to a section of an axial flux or radial flux rotary motor where the direction of motion is a straight line rather than a curved path.

A trapezoidal electric machine is an electric machine that is a combination of both an axial and radial flux machines, where the plane of the airgap lies at an angle partway between the planes formed by the airgaps in the axial and radial configurations.

The airgap diameter for a rotary machine is defined as the diameter perpendicular to the axis of rotation at the centre of the airgap surface. In radial flux motors, all of the airgap resides at the same diameter. If the airgap surface is a disc-shaped slice as in axial flux motors, the average airgap diameter is the average of the inner and outer diameter. For other airgap surfaces such as a diagonal or curved surfaces, the average airgap diameter can be found as the average airgap diameter of the cross-sectional airgap view.

For a radial flux motor, the airgap diameter refers to the average of the rotor inner diameter and stator outer diameter for an outer rotor radial flux motor or the average of the rotor airgap outer diameter and stator airgap inner diameter for an inner rotor radial flux motor. Analogues of the airgap diameter of a radial flux motor may be used for other types of rotary motors. For an axial flux machine, the airgap diameter is defined as the average of the PM inner diameter and PM outer diameter and EM inner diameter and EM outer diameter.

The back surface of the stator is defined as the surface on the opposite side of the stator to the surface which is at the magnetically active airgap. In a radial flux motor, this would correspond to either the inner surface of the stator for an outer rotor configuration, or the outer diameter surface of the stator for an inner rotor configuration. In an axial flux motor, the back surface of the stator is the axially outer surface of the stator.

For distributed windings, the number of slots will be N×the number of poles where N is a multiple of the number of phases. So for a 3 phase machine N could be 3, 6, 9, 12, etc. For concentrated windings, the number of slots can vary but must be a multiple of the number of phases. It does not depend on the number of poles, except that certain combinations of slots and poles will yield higher torque and better noise-reduction or cogging-reduction characteristics. The minimum number of slots for a given number of poles should not be below 50% to obtain adequate torque.

Conductor volume may be used to refer to the slot area per length of a single stator. The slot area is the area of a cross-section of a slot in the plane which is orthogonal to the teeth but not parallel to the plane of relative motion of the carriers. In an axial motor, this plane would be perpendicular to a radius passing through the slot. The slot area effectively defines the maximum conductor volume that can be incorporated into a stator design, and it is usually a goal of motor designers to have as high a fill factor as possible to utilize all the available space for conductors.

Since maximum conductor volume in a stator is defined in terms of slot area, any stator referred to as having a maximum conductor volume or slot area must have slots and teeth to define the slots. This parameter is defined for rotary motors as:

$$\text{Slot area per length} = \frac{N_s A_s}{\pi D_{AG}} = \text{slot density} \cdot A_s$$

where $A_S$ is the cross-sectional area of a single slot, or the average area of a single slot for stator designs that have varying slot areas.

As a relatively accurate approximation, $A_S$ may be calculated as the height of the tooth, $h_t$, multiplied by the average width of the slot, $w_s$, such that the equation above becomes:

$$\text{Slot area per length} = \frac{N_s h_t w_s}{\pi D_{AG}} = \text{slot density} \cdot h_t w_s$$

Slot depth or post height may also be used as a proxy for the conductor volume. The post height, also known as the tooth height or slot depth, is a proxy for the amount of cross-sectional area in a slot available for conductors to occupy. Although the slots may have a variety of shapes such as curved or tapered profiles, the slot height is based upon the closest rectangular approximation which best represents the total area of the slot which may be occupied by conductors. This dimension does not include features such as pole shoes which add to the height of the tooth without adding substantially to the slot area. For transverse flux motors, the post height is defined as the portion of the post which is directly adjacent to the conductor coil, perpendicular to the direction of the coil windings.

A concentrated winding comprises individually wound posts or any winding configuration that results in the alternating polarity of adjacent posts when energized. It is understood that not all posts will be the opposite polarity of both adjacent posts at all times. However, a concentrated winding configuration will result in the majority of the posts being the opposite polarity to one or both adjacent posts for the majority of the time when the motor is energized. A concentrated winding is a form of fractional slot winding where the ratio of slots per poles per phase is less than one.

Embodiments of the present device use an integrated bearing race that is preferably machined into the stator and/or rotor where the bearing races and at least the axial surfaces of the stator and rotor posts can be machined in the same set-up. This can provide for very high tolerance manufacturing of the critical geometry relationship between the bearing race axial and radial positions relative to the stator and rotor posts. Consistency of these geometric relationships is important for consistent cogging and other performance characteristics of the device.

Embodiments of the present device can allow for streamlined manufacturing with a rotor configuration that allows the permanent magnets to be installed into the rotor individually after the stator and rotor have been assembled.

Embodiments of the device can provide high torque density, ease of manufacturability, ease of assembly and serviceability due to a very simple assembly with a minimal number of components, and excellent operational safety as a result of high torque-to-inertia which allows very fast emergency stopping.

As shown in FIG. 1, a non-limiting exemplary embodiment of an axial flux motor 110 is housed in an upper arm member 100 and a lower arm member 200. The upper and lower arm members 100, 200 rotate around a rotational axis 300.

Figure 2:
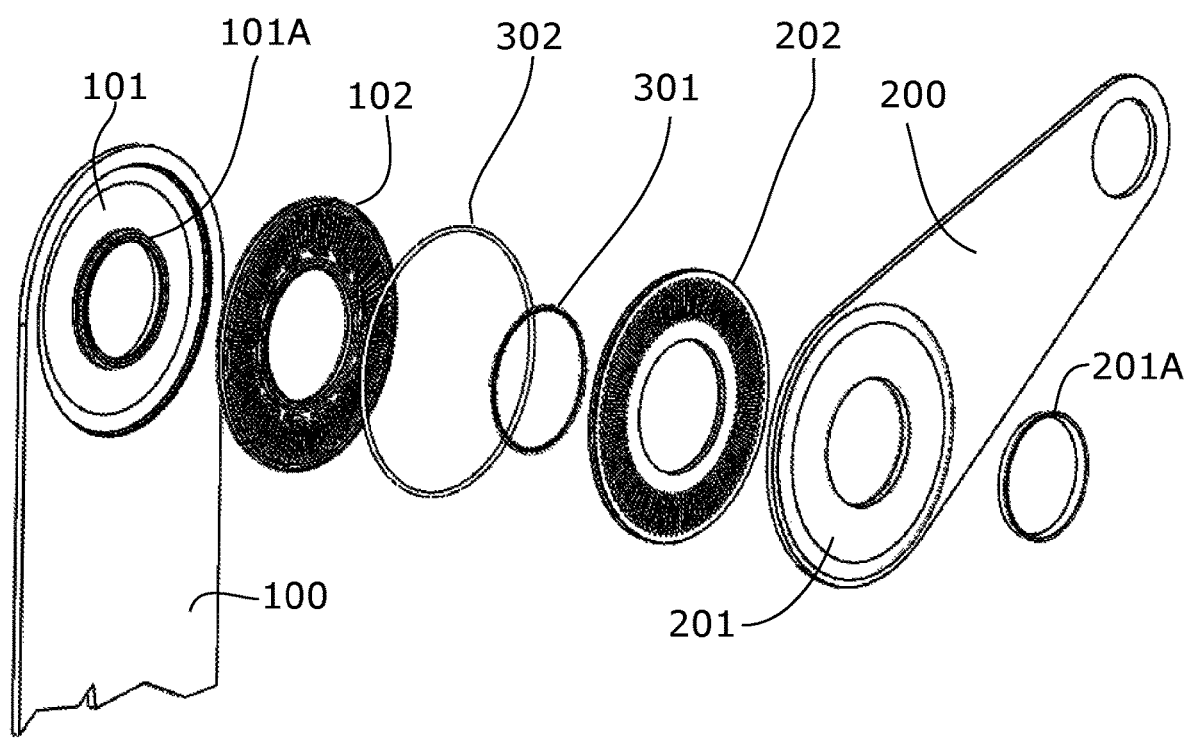
FIG. 2 is an exploded view of the exemplary actuator of FIG. 1.

A non-limiting exemplary embodiment of the device in a robotic arm assembly is shown in FIG. 2. The upper arm member 100 includes a support housing 101. The lower arm member 200 includes an arm housing 201. The support housing 101 and the arm housing 201 are preferably made of a light weight material such as, but not limited to, aluminum, magnesium or carbon fiber composite.

Figure 3:
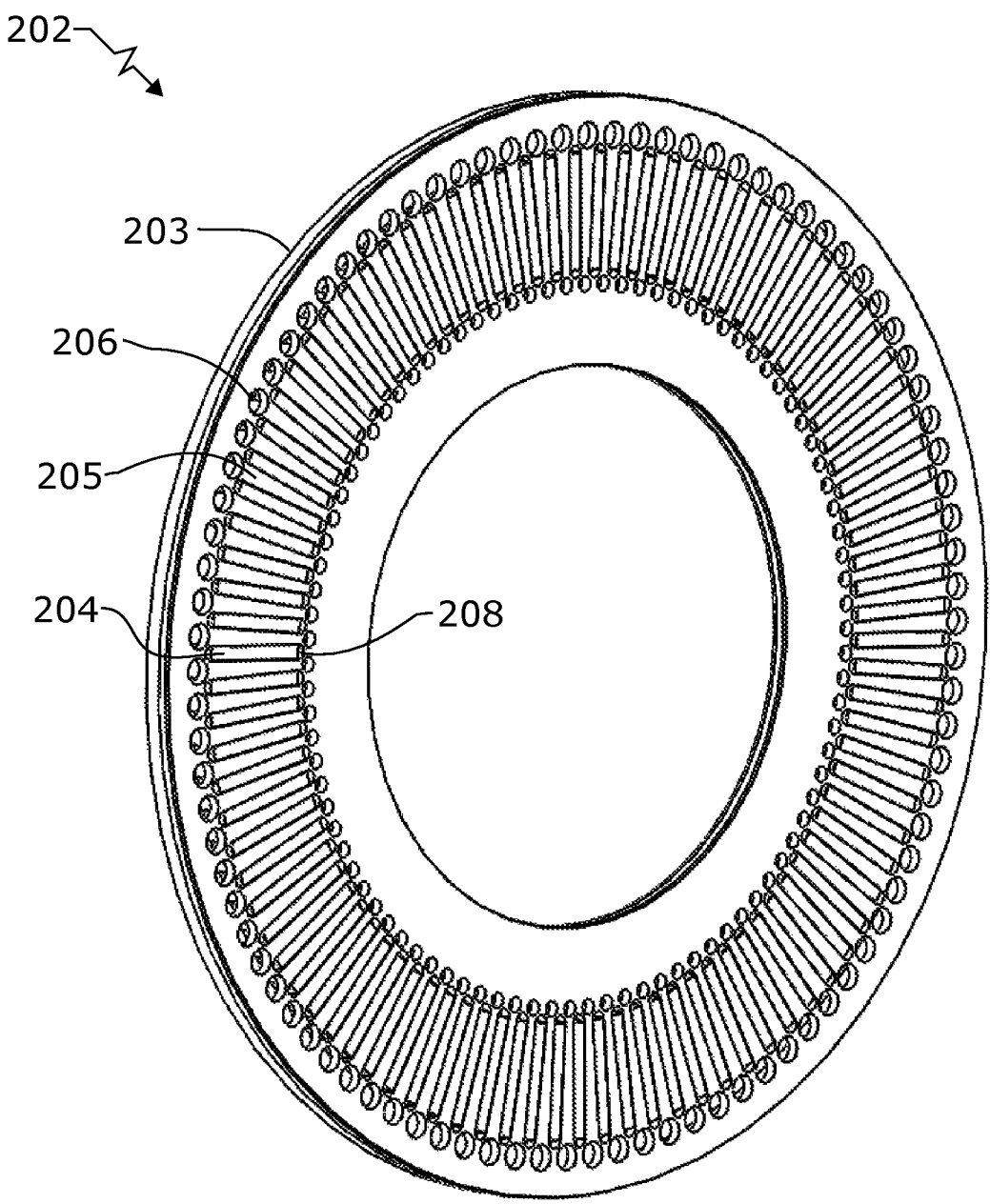
FIG. 3 is an isometric view of a rotor of the exemplary actuator of FIG. 1.

As shown in FIG. 2 to FIG. 5 the stator 102 is attached to the upper arm 100 such as with bolts and/or adhesive and/or thermal fit or by being formed integrally with the arm. In FIG. 2, the stator 102 is connected to the upper arm 100 using a press fit with a ring 101A. An outer bearing 302 and an inner bearing 301 allow relative rotation of the stator 102 and rotor 202 and provide precise relative axial location of the stator 102 and rotor 202 to maintain an airgap between stator posts 105 (FIG. 4) and rotor posts 205 (FIG. 3). As shown in FIG. 3, the rotor may have flux restriction holes 206 and permanent magnets 204. The permanent magnets are seated in slots 208.

The placement of the inner bearing 301 inside the ID of the airgap and the outer bearing 302 outside the OD of the airgap distributes the attractive forces between the stator 102 and rotor 202 between two bearings 301, 302 for longer service life and/or lighter bearings. The use of ID and OD bearings also reduces the mechanical stress on the stator 102 and rotor 202 to allow a thinner cross section and lighter weight, for example as is possible with the high pole count of embodiments of the device.

Figure 4:
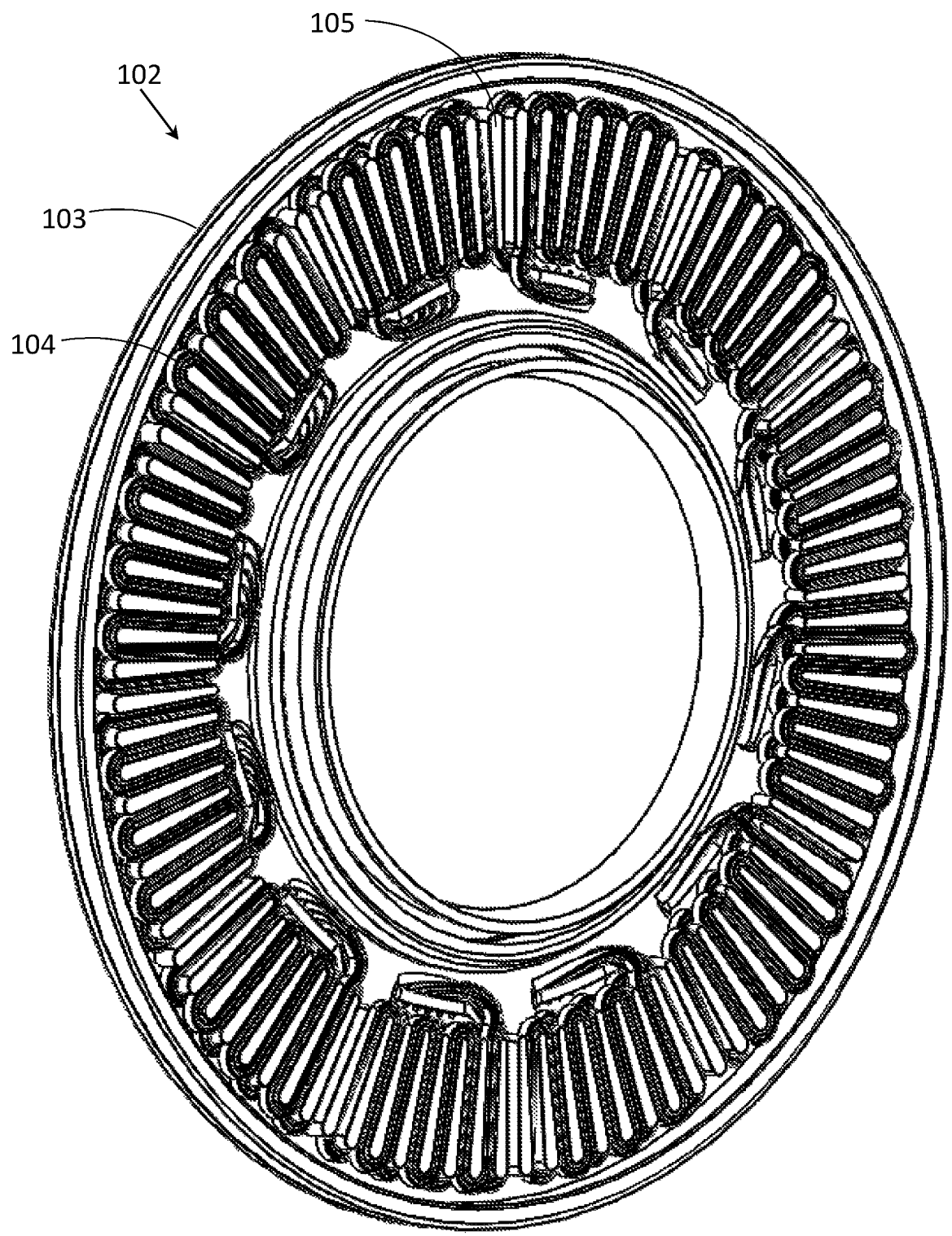
FIG. 4 is an isometric view of a stator of the exemplary actuator of FIG. 1.

As shown in FIGS. 3 and 4, the rotor 202 includes a rotor plate 203 (FIG. 3) and the stator 102 includes a stator plate 103 (FIG. 4). The stator plate 103, as shown in FIG. 4, and the rotor plate 203, as shown in FIG. 3, can be made of ductile iron. The permanent magnets 204 can be Neodymium—N52H. Many other materials can be used for the various components. These materials are given by way of example.

The rotor 202 is housed in the lower arm 200 and attached such as with bolts and/or adhesive and/or thermal fit or by being formed integrally with the arm. As shown in FIG. 2, the rotor 202 is connected to the lower arm 200 using a press fit with a ring 201A. The axial magnetic attraction between the stator 102 and rotor 202 which results from the permanent magnet flux in the rotor 202 provides axial preload on the bearings 301 and 302. It has been shown by analysis and experimentation that with high strength magnets such as but not limited to neodymium N52 magnets, that this axial force is adequate to keep the bearings 301, 302 preloaded in the stator 102 and rotor 202 and to provide adequate axial force to allow the lower arm 200 to support useful loads in all directions. This load may be a combination of the arm weight and acceleration forces and payload in any direction.

The use of the magnetic forces to provide the bearing seating force and axial preload on the bearings allows for the use of thrust load and/or angular contact bearings which can be preloaded by the magnetic attraction of the stator and rotor to remove bearing play in the axial direction. By using a combination of bearings that are radially and axially locating, it is possible to preload the bearings with magnetic force, in radial and axial directions and to eliminate the need for additional mechanical retention of the bearing races to prevent movement of the races in the opposite direction of the magnetic force. This preload can significantly reduce bearing play and increases bearing rigidity such that the assembly becomes very precise in its movement. This may have advantages for precision applications such as robotics. It also may have the advantage of reducing the inconsistent cogging effect that could result from radial displacement of the rotor. This may be especially important when the device has a high number of very small cogging steps such as with embodiments of the device.

A non-limiting example of axially preloaded races with no need for mechanical retention of both races on both bearings is shown in FIGS. 5 to 8. The stator includes a stator plate 103. The stator plate 103 includes an inner bearing race 111 that defines an inner bearing groove and an outer bearing race 112 that defines an outer bearing groove. The rotor includes a rotor plate 203. The rotor plate 203 includes an inner bearing race 211 that defines an inner bearing groove and an outer bearing race 212 that defines an outer bearing groove. The rotor plate 203 may be connected to a rotor housing 201 using a press fit between cooperating pieces 231 and 232. Similarly, the stator plate 103 may be connected to a stator housing 101 using a press fit between cooperating pieces 131 and 132. An outer bearing element 322 (in this non-limiting example, a cross roller bearing) is sandwiched between the two outer bearing grooves 112, 212 such that the axial magnetic attraction between the stator 102 and rotor 202 eliminates axial and radial play in the bearing 301. An inner bearing element 321 (FIG. 6) is sandwiched between the two inner bearing grooves 111, 211. The bearing 301 is, in this non-limiting exemplary embodiment, a cross roller bearing with axial and radial locating stiffness. As a result, the axial preloading of the rotor and stator provided by the magnets 204 in the rotor 202 results in a precise relative location of the stator 102 and rotor 202 in the axial and radial directions. This precise location is accomplished without the need for mechanical or adhesive bearing race retention in the opposite axial direction of the magnetic attraction force between the stator and rotor.

Figure 6:
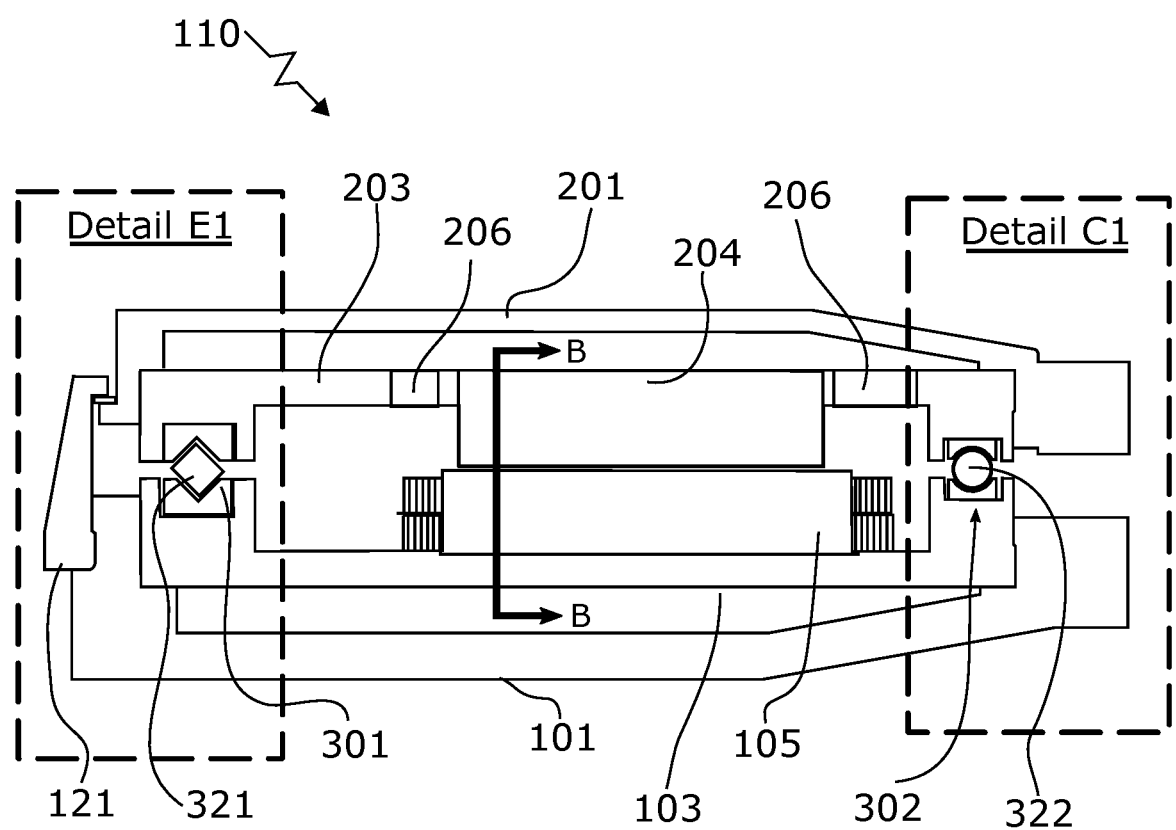
FIG. 6 is a view of the body of the exemplary actuator along the section A-A in FIG. 1.

Referring to FIG. 6, the axial flux motor 110 may have the design shown. An outer bearing 302 and an inner bearing 301 allow relative rotation of the stator and rotor and provide precise relative axial location of the stator and rotor to maintain the desired airgap between the stator posts 105 and the rotor posts that hold magnets 204 and that provide a flux path for the magnetic fields provided by the magnets. The rotor may have flux restriction holes 206 and magnets 204. The use of a bearing inside the ID of the airgap and a second bearing outside the OD of the airgap distributes the attractive forces between the stator and rotor between two bearings for longer service life and/or lighter bearings. The use of ID and OD bearings can reduce the mechanical stress on the stator and rotor to allow a thinner cross section and lighter weight, for example as is possible with the high pole count of embodiments of the device.

In the non-limiting exemplary embodiment shown in FIG. 3 and FIG. 4, there are 96 stator posts (corresponding to 96 slots) and 92 rotor posts with three phase wiring and each phase on the stator being divided into 4 equally array sections of eight posts each, though there may be four or more. The number of rotor posts in this example is 92 resulting in four equally arrayed angular positions where the rotor and stator posts are aligned. This, in-turn, results in a peak axial attraction force between the stator and rotor in four positions.

Note that many other combinations of stator post numbers and rotor post numbers may be used. Other numbers of phases may also be used. The examples here have been found to provide beneficial performance but do not limit the various construction principles to these exemplary geometries. For example features of embodiments of the device such as, but not limited to, the magnetically preloaded bearings or the wiring constructions can be used with rotors and stators with much lower or much higher numbers of poles.

It has been shown by simulation and experimentation that the total axial preload between the stator and rotor, for embodiments of the device, remains relatively constant such as within 10% in a multiphase wiring configuration such as, but not limited to, a three phase configuration, regardless of the current supplied to the windings and the torque developed by the motor. This is because the electromagnetic forces are reasonably equally in repelling and attraction. But although the total axial force on the stator and rotor remains reasonably constant, the axial attraction force on an individual post on the stator or rotor will vary quite a bit more (such as 14% or more). For this reason, in some embodiments, it is beneficial to distribute the number of phase sections into more than two sections per phase so the peak axial load from the permanent magnets occurs at more than one angular position (for example, at four equally arrayed angular positions). This can be beneficial to provide a more consistent axial preload on the bearings around the circumference of especially the OD bearing so any cantilevered external loads that would pull the stator from the rotor (such as a cantilevered load on a SCARA arm that is pulling the stator and rotor apart primarily at one angular position) are opposed by one or more peak axial force areas at all times, regardless of angular position of the arm. The greater the number of sections per phase, the greater the manufacturing complexity, in some respects, so four peak axial force positions (as a result of four sections per phase) is considered a good balance of manufacturability and peak axial force consistency. Four peak axial force positions can be accomplished with many different numbers of stator and rotor posts with the important characteristics being that there is a four post difference between the number of posts on the rotor and the number of posts on the stator.

Furthermore, it is beneficial for embodiments of the device that use embodiments of the wiring configuration shown that the number of posts on the stator be a multiple of three sections such as 3, 6, 9, 12, 14, 16 etc with each section having an even number of posts such as 2, 4, 6, 8, 10, 12 etc on the stator.

Another consideration when deciding how many peak axial force positions to choose in the design of an embodiment of the device, is the number of cogging steps that will result. A high number of cogging steps is beneficial to reduce cogging (because a higher number of steps generally results in a lower force variation between the maximum and minimum torque of each cogging step) so a two post difference (corresponding with two sections per phase) between the stator and rotor would seem to be preferable to reduce cogging because, in a non-limiting exemplary embodiment of 96 stator posts and 94 rotor posts, the number of cogging steps is 4512, which is a very high, resulting in a theoretical cogging torque that is very low. However, a two magnet difference between stator and rotor results in only two peak axial attraction force position at any given time resulting in a less stable support of a cantilevered load on the output of the actuator such as in a SCARA arm configuration when lifting a payload. For this reason, a rotor/stator post difference of four is considered to be a good choice in terms of payload lifting stability even though it has a lower number of cogging steps and theoretically higher cogging forces. A 96 stator-post to 92 rotor-post configuration results in only 2208 cogging steps which would be expected to result in about two times greater cogging force variation. A post difference of four, would, therefore, not seem to be beneficial in terms of cogging reduction because the cogging steps would be fewer and, as a result, larger in magnitude. However, there can be another benefit of fewer cogging steps (which results from a larger post number difference between the stator and the rotor—such as, for example, a four post difference as shown in FIG. 3 and FIG. 4 of four, as opposed to a one or two post difference). This advantage is related to a correlation between the size of the cogging steps and the required accuracy of the stator and rotor axis alignment during manufacturing/assembly and in operation under various loads. Specifically, if the cogging steps are smaller (measured circumferentially at the average airgap diameter) than the radial displacement of the rotor axis relative to the stator axis (due to lack of manufacturing accuracy) the stator and rotor will not be aligned sufficiently to achieve consistent cogging steps. This will result in inconsistent cogging forces during rotation. Any radial displacement of the rotor relative to the stator will have a misaligning effect, in the same radial direction, on posts that are diametrically opposed, resulting in less than ideal cogging cancellation. Some combinations of rotor/stator axis misalignment and relative angular position of the stator with very high cogging step embodiments (such as with a two post difference between stator and rotor) may even result in greater cogging force variation in some conditions than if a larger rotor/stator post difference is used (assuming similar radial misalignment in each exemplary case).

The effect of bearing stiffness in the radial direction can be an important consideration because the cogging forces or the payload forces will, at times, displace the rotor more, radially, relative to the stator, with bearings which are less radially stiff. If this radial displacement is a significant percentage of a cogging step size (cogging step size measured tangentially at the average airgap diameter and at 90 degrees to the direction of radial displacement) then the cogging steps and cogging force will be inconsistent and cogging force could possibly, in some cases and angular positions, be larger in magnitude ("magnitude" here, referring to the difference between max and min torque during a cogging step) than if the stator/rotor post difference is smaller and the number of cogging steps is higher (resulting in theoretically lower cogging torque if stator and rotor). It is believed possible that very high cogging step numbers on a ~10" OD actuator will result in inconsistent cogging if there is a radial displacement of the rotor relative to the stator (as a result of manufacturing inaccuracy or radial displacement due to loading of the actuator in service) of ~0.001" to 0.002". This is considered to be high tolerance for high volume manufacturing of stator, rotor and bearings. Achieving these high tolerances during manufacturing is time consuming and expensive, so it has been determined that more consistent cogging torque (and possibly even lower peak cogging torque) can be achieved if more than a one or two post difference is used. A four (4) post difference between the rotor and stator has the advantage of providing at least two peak axial attraction force positions on the load side of the actuator in a robotics application (such as when supporting a cantilevered load) at all times. The allowable radial displacement of the rotor relative to the stator can be higher because the cogging steps are larger. This is expected to allow for consistent cogging torque to be achieved with lower manufacturing tolerances and bearing stiffness than if a higher number of cogging steps is used. Where there are N posts on a stator and M poles on a rotor, the number of each of N and M may be selected so that N and M have the property that the greatest common divisor of N and M is four or more.

Figure 5:
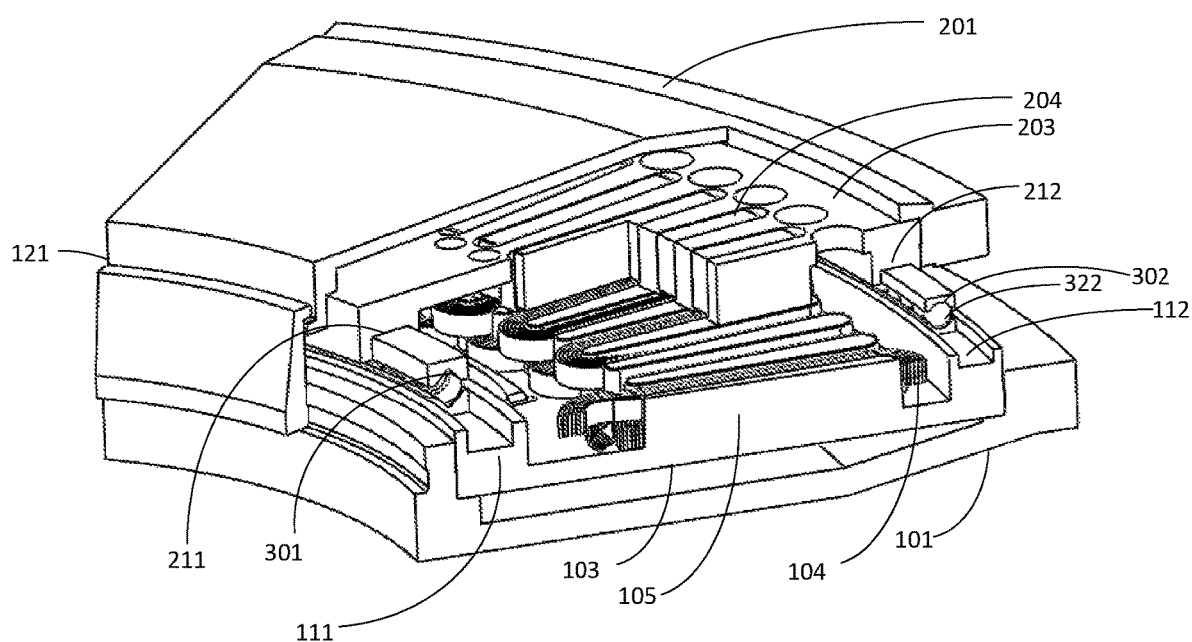
FIG. 5 is an isometric view of a section of the exemplary actuator of FIG. 1.

It is common with many typical three phase motors to have wires from two or three phases in a single slot. Embodiments of the present device use a wiring configuration where two or more adjacent slots in a row contain conductors from only one phase. Many different winding methods may be used with this device but the advantages of a winding configuration 104 as shown in FIGS. 4 and 5 includes the ability to use axially aligned (circumferentially layered in each slot) non-overlapping flat wire (overlapping the wire—as is typically done in three phase distributed winding machines, is problematic with flat wire). To take advantage of the simplicity of assembly of this winding configuration and method, it can be beneficial to have as few sections per phase as possible (such as one section per phase EG: 32 slots per phase for a 96 slot stator, or two sections per phase EG: 16 slots per phase for a 96 slot stator). The number of rotor posts for this winding configuration is preferably equal to the number of stator slots plus or minus the number of sections per phase EG 94 or 98 rotor posts for a 96 stator slots having two equally arrayed sections per phase.

FIG. 5 to FIG. 8 shows the exemplary actuator with a safety ring 121 that attached to the stator housing 101 and FIG. 9 to FIG. 12 shows an alternative exemplary actuator with the safety ring 121 attached to stator plate 103.

Figure 8:
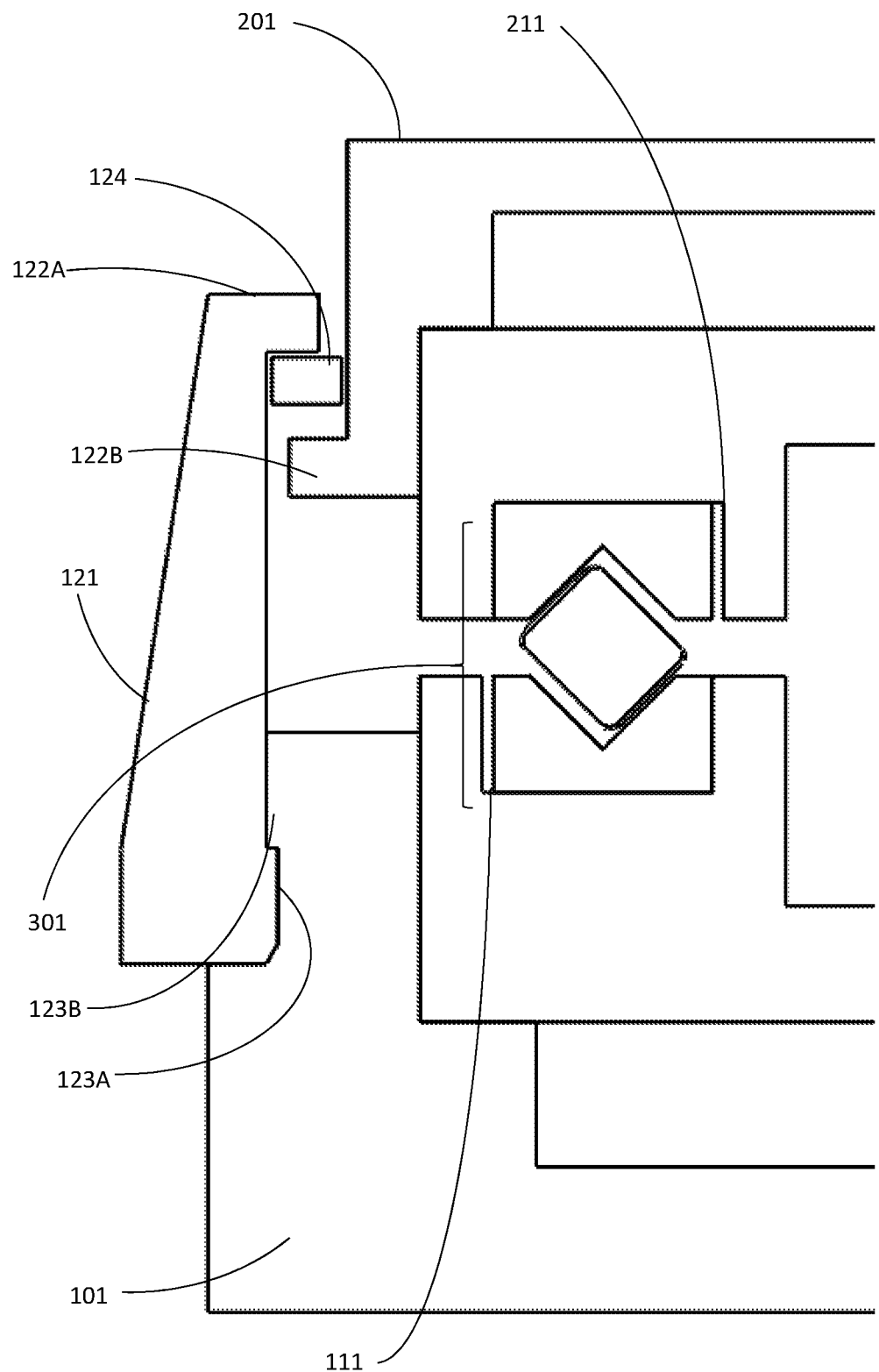
FIG. 8 is an enlarged detail view of an inner bearing and safety ring showing the detail E1 in FIG. 6.

The safety ring 121 is installed on the stator 102 to keep the stator and rotor from separating in the case of a force being applied to the end of an arm attached to the rotor, along the rotational axis of the actuator, which is greater than the axial attracting force from the PM magnetic attraction across the airgap. A section of the actuator in FIG. 8 shows that the safety ring 121 is located at the inner diameter of the stator. Section view in FIG. 8 shows that a lip (first shoulder) 122A of the safety ring overlaps the lip (second shoulder 122B) of the arm housing. Between the lip 122A and the arm housing 200, a thin plain bearing ring 124 is in place to provide low resistance gliding contact in event of rotor and stator separation. The first shoulder 122A protrudes in a first radial direction, the second shoulder protrudes 122B in a second radial direction opposed to the first radial direction, and the first shoulder 122A is configured to cooperate with the second shoulder 122B to prevent separation of the rotor and the stator beyond a pre-determined distance. The safety ring 121 is attached to the stator housing 101 using a press fit between cooperating pieces 123A and 123B.

Figure 12:
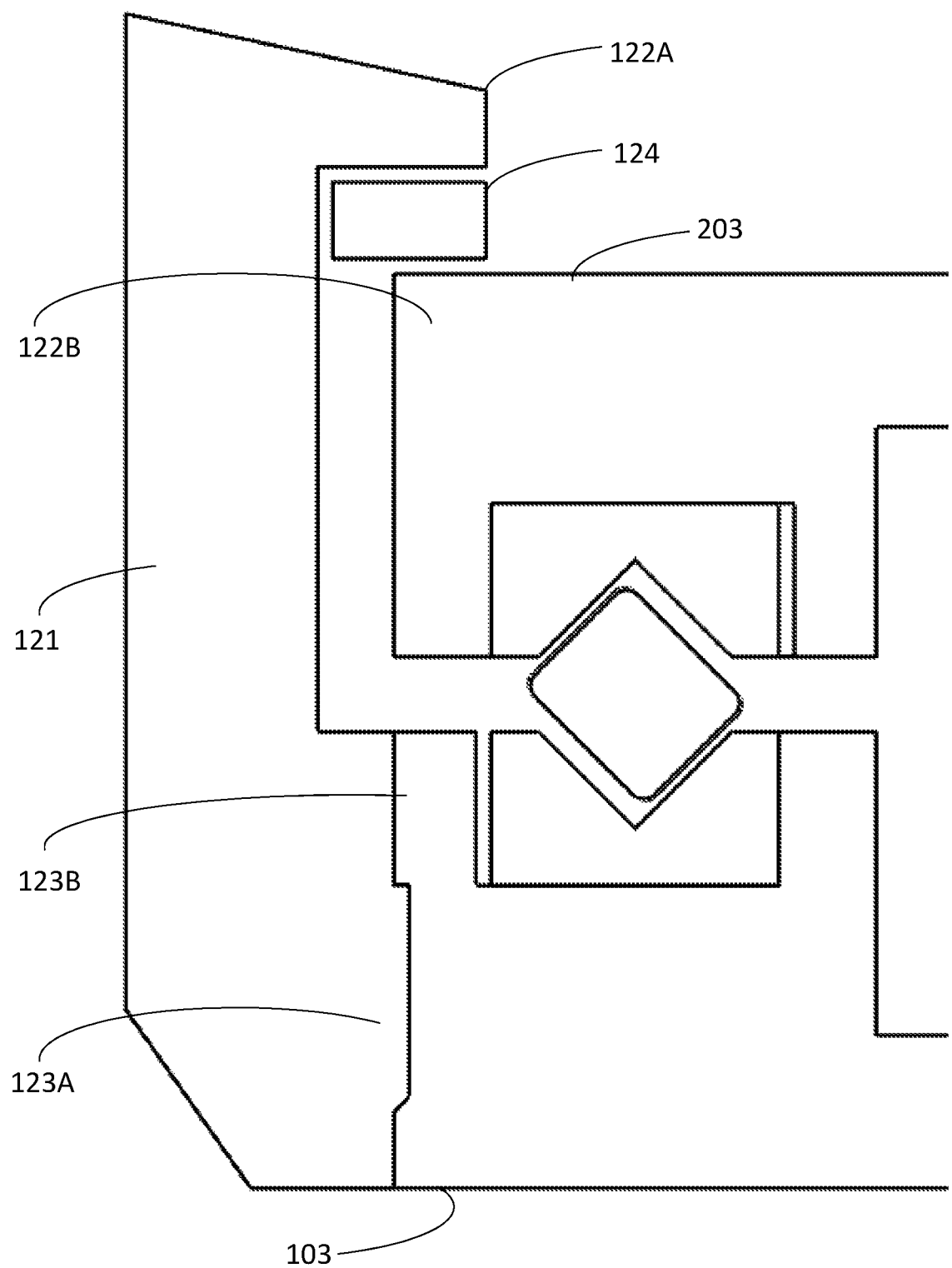
FIG. 12 is an enlarged detail view of an inner bearing and safety ring showing the detail E2 in FIG. 10.

In both exemplary actuators, as shown in FIG. 8 and FIG. 12, an overlapping feature forming a first shoulder 122A, which has a larger OD than the ID of the rotor housing, in this example, is located around the ID of the stator and rotor. The safety ring and first shoulder 122A do not need to contact the rotor during normal operation, and serve to prevent complete separation of the rotor and stator in the axial direction if the separating load on the rotor 202 and stator 102 exceeds the axial preload on the bearings provided by the permanent magnets. As shown in FIG. 8, a counter bearing or bushing 124 is attached to the stator or rotor or other member, after assembly of the stator and rotor. In the case where axial overload causes a separating force and displacement on the bearings, there will be contact between the first shoulder 122A and the bushing 124 and the rotor, so the material combination of the first shoulder 122A and the bushing 124 and the rotor is preferably suitable for sliding contact.

Figure 18:
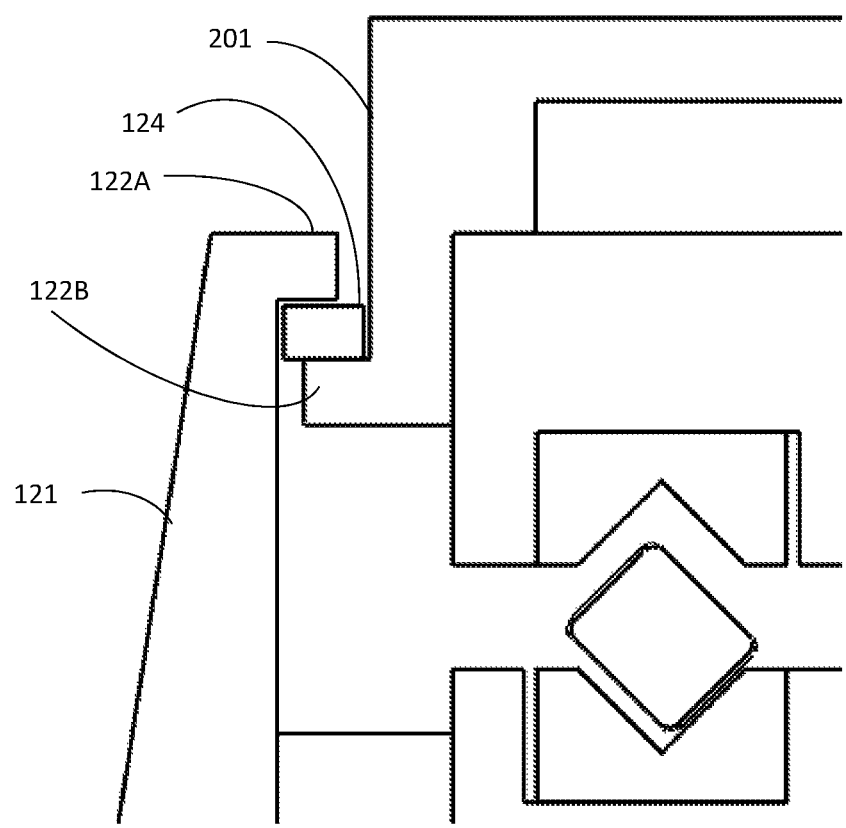
FIG. 18 is a detail view of a safety ring with a plain bearing.
Figure 19:
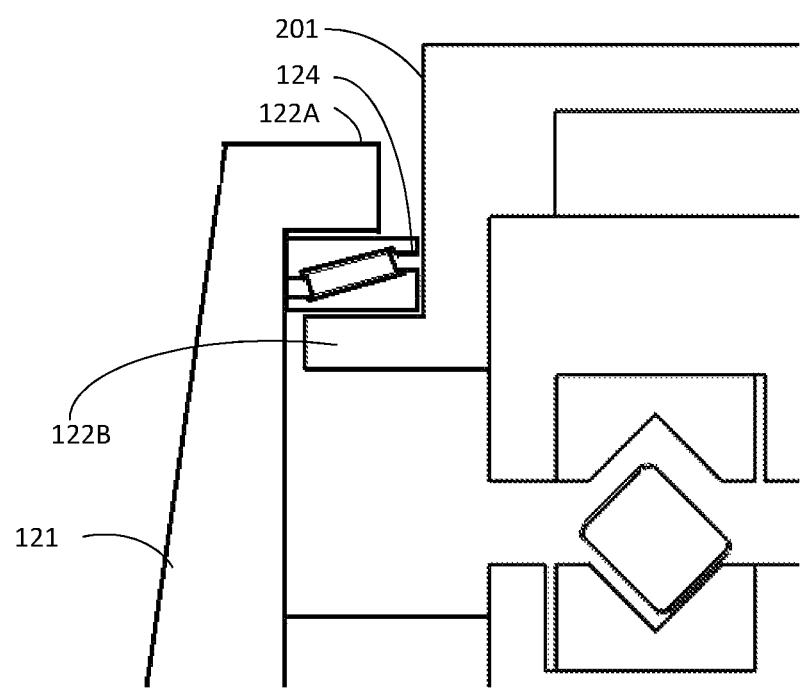
FIG. 19 is a detail view of a safety ring with a thrust bearing.

A plain bushing material 124 can also be used between these two surfaces as shown in FIG. 18. In FIG. 19, a thin section thrust bearing 124 is used to allow rotation without damage if the magnetic preload is exceeded during actuator rotation. The first shoulder can also be used on the OD of the actuator with similar effects. If a rolling element bearing is used as a counter bearing, and if it is desired to have a small amount of separation of the stator and rotor in case of an emergency to reduce the force of the robot arm on an unintended object, it may be desirable to use a preload spring to keep the counter bearing lightly preloaded in order to prevent the bearing balls from spinning. A wave washer could, as a non-limiting example, be used for this purpose.

Figure 11:
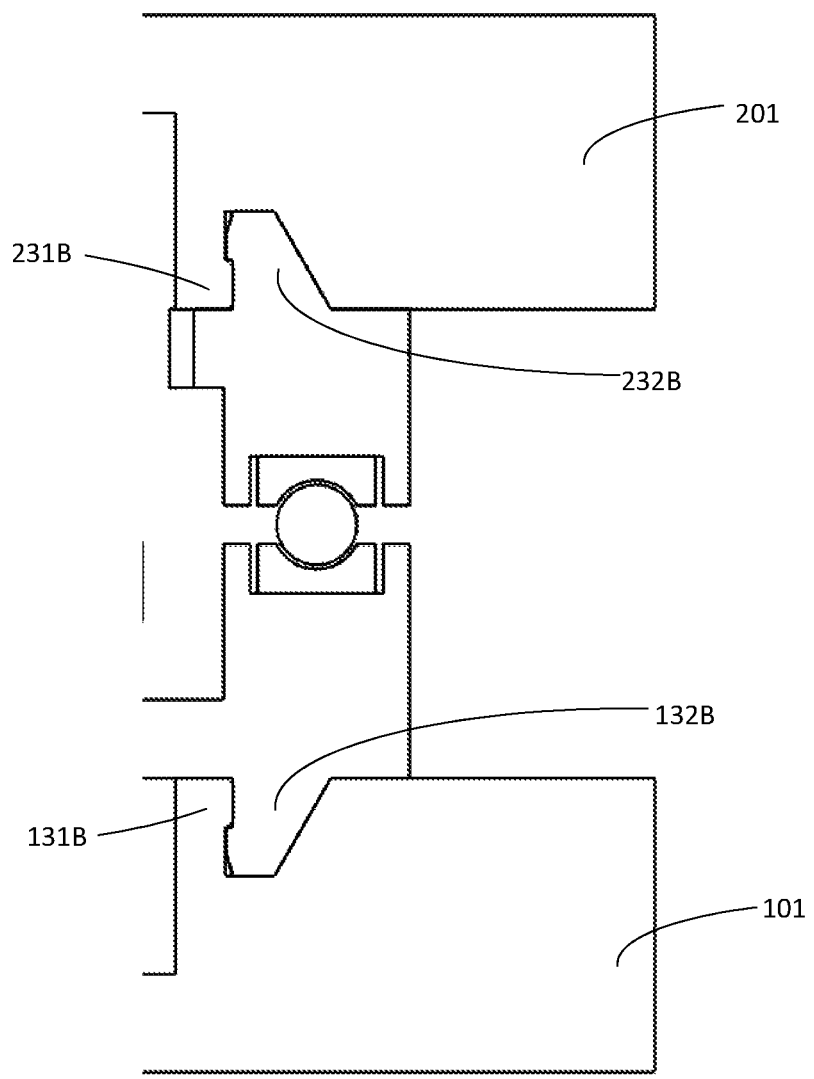
FIG. 11 is an enlarged detail view of an outer bearing and an thermal interference fit showing the detail C2 in FIG. 10.

As shown in FIG. 11, the rotor housing 201 and the rotor plate 203 (FIG. 10) are connected by a press fit using cooperating pieces 231B and 232B. The stator housing 101 and stator plate 103 (FIG. 10) are connected by a press fit using cooperating pieces 131B and 132B.

Figure 13:
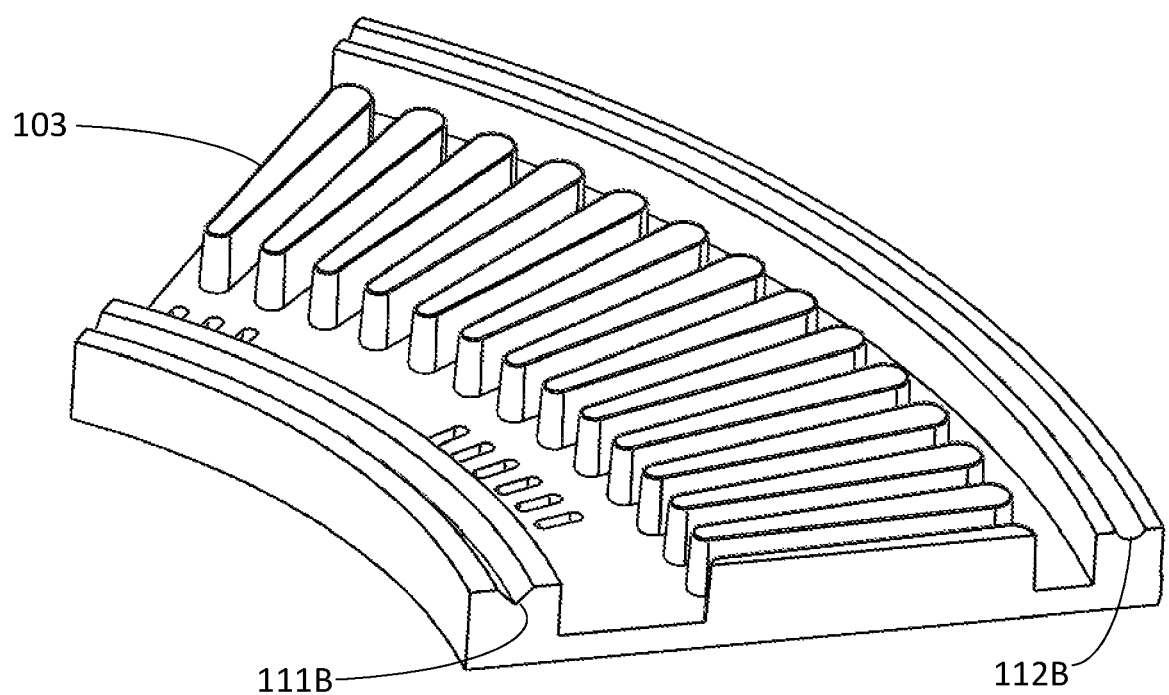
FIG. 13 is an isometric view of a section of an exemplary stator plate with integrated bearing races.
Figure 14:
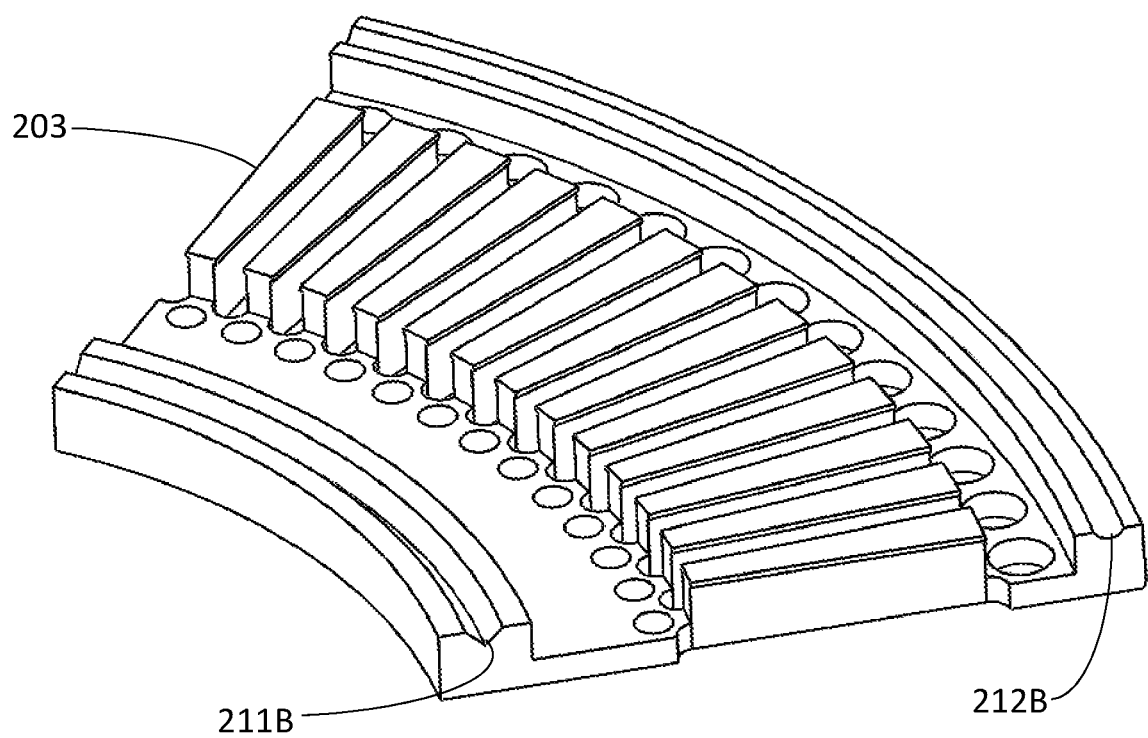
FIG. 14 is an isometric view of a section of an exemplary rotor plate with integrated bearing races.
Figure 15:
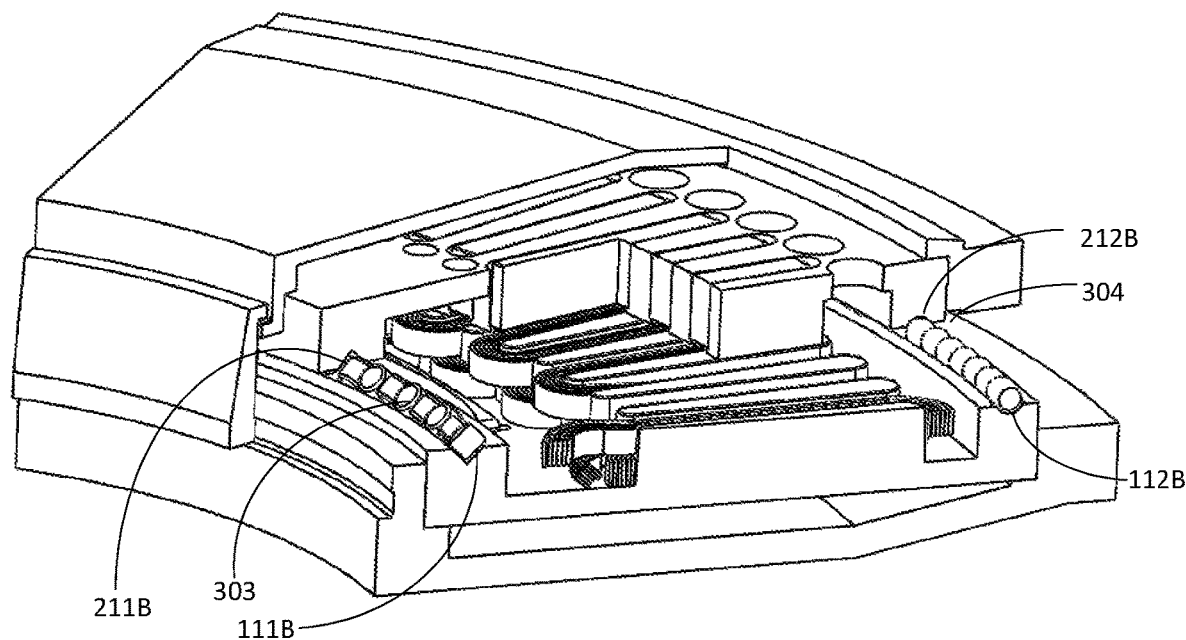
FIG. 15 is an isometric view of a section of exemplary actuator with integrated bearing races.

A monolithic material from post to post on the stator and/or rotor can used to provide a housing structure. The rotor and/or stator have the structural rigidity to eliminate the need for an additional housing on one or both members. Integrating the stator and rotor as a homogenous plate may reduce weight, as well as manufacturing cost and complexity. An integrated bearing race that is formed as part of each homogenous plate may allow the structural load path from the stator posts to the bearing race in contact with the rolling elements to be formed from a single piece of magnetic metal such as shown in FIGS. 13 to 15. ID and OD bearings are used to reduce rotor and stator material stress with axially thin components and to maintain a small airgap. An uninterrupted soft magnetic homogeneous material may be used such as, but not limited to iron or steel alloy between two or more of: a stator or rotor post and a bearing, a stator or rotor post and an adjacent post, a stator or rotor post and an OD bearing or bearing seat, a stator or rotor post and an ID bearing or bearing seat, and a stator or rotor post and a structural member in the load path between the post and a bearing.

For example, the homogenous material for the stator and/or rotor could include ductile iron or other type of iron construction. The homogenous material for the stator and/or rotor could also include from one of iron, ductile iron and steel alloy and may also include a electrical conductivity inhibitor, such as silicone Referring to FIGS. 13 to 15, the stator plate 103 has a bearing groove 111B at the inner diameter and a bearing groove 112B at the outer diameter. The stator may be formed as a homogenous plate having both the inner bearing groove 111B and the outer bearing groove 112B as homogenous extensions of the homogenous plate. Referring to FIG. 14, the rotor plate 203 also has a groove 211B at the inner diameter and a groove 212B at the outer diameter. The rotor may be formed from a homogenous plate having both the inner bearing groove 211B and the outer bearing groove 212B as homogenous extensions of the homogenous plate. Another way to define an integrated stator bearing is a stator or rotor post and an adjacent post and a bearing race are all made of the same electrically and magnetically connected unified piece of electrically conductive soft magnetic material.

As shown in FIG. 15, these grooves are for the steel balls 304 and the steel rollers 303. Materials of the rotor plate and the stator plate may be of many materials such as but not limited to a high strength metallic material that has soft magnetic properties to provide electromagnetic functionality as well as high enough structural strength to provide the strength to maintain a small and consistent airgap between the stator and rotor posts, and high enough mechanical hardness to provide bearing race functionality. Ductile iron has been found to posses these and other qualities for certain applications and especially when combined with the claimed range. The bearing grooves 111B, 112B, 211B, and 212B may also be hardened for increased load capacity and service life. The combined cost of purchasing the steel balls and rollers and machining and hardening the grooves is expected to be lower than the cost of purchasing separate modular bearings with races and installing them into the actuator. In mass production, this integrated bearing design may have advantages over the use of pre-manufactured bearing including lower cost and potentially higher precision because there is a reduced stack-up of tolerances that results from a reduced number of components.

Integrating the bearing races into the stator 102 and/or rotor 202 as shown, for example, with bearing races 111B, 211B, 112B, and 212B in FIG. 15 is made practical by the use of a solid stator and/or rotor material such as but not limited to steel or cast iron. Ductile iron, such as but not limited to 60-45-15 or 100-70-03 can be hardened, if necessary such as by nitriding or other method, to provide adequate bearing race hardness for higher load configurations of the present device. For lower load configurations or lower service life configurations, it is believed to be possible to use unhardened ductile iron in some embodiments. For high service life it is possible to use two or more rows of bearings on the ID and/or OD bearings to reduce the hertzian stress between the balls or rollers and races, thereby allowing a softer bearing race than is used for typical bearing races (which are typically made of hardened steel). Ductile iron or other cast iron products are not usually used for bearing races, but iron is used in railway car wheels and rails so it is expected that this integrated bearing can be configured for adequate service life for robotics and other motion control applications if made of ductile iron or other suitable materials preferably with high magnetic saturation density so the bearing races on the stator can be of the same monolithic material as the stator posts (on the stator) and the rotor bearing races can be of the same monolithic material as the rotor posts (on the rotor). The advantages of an integrated bearing race may include lower cost, and the potential for increased precision due to the elimination of tolerance stack up of the bearing races and bearing race seats in the rotor and/or stator. The use of an integrated bearing race can also reduce the volume and mass of the stator and rotor because the bearing race becomes an integral part of the load bearing structure, thus eliminating the need for additional material to support separate component bearing races.

The use of ductile iron for the stator and/or rotor allows a combination of characteristics that may be uniquely suited to the unusual requirements of embodiments of the device. Some of the features of ductile iron that may be beneficial in some embodiments include poor electrical conductivity due to the high carbon content which results in reduced eddy current losses, excellent machinability for low cost manufacturing, excellent castibility for net or near-net shape casting of stator and/or rotor, high fatigue strength for long service life, self lubricating properties which may allow an integrated bearing to operate with minimal or no additional lubricant, excellent wear properties between certain seal materials in the dry condition to provide bearing and actuator sealing with no need for lubricant in some applications, and good damping qualities to reduce noise and vibration from cogging and other high frequency effects As mentioned above, embodiments of the device include a set of bearing elements at or near the inner diameter (ID) and a set of bearing elements at or near the outer diameter (OD). This combination of bearings provide axial and radial support between the rotor and stator when combined with the claimed geometry range may allow the rotor and stator to be light weight. The ID and OD bearings also maintain a fixed air gap distance.

It has been shown that, even though it is detrimental to torque, due to the drag from the bearing on the OD of the rotor, placing a bearing set on the OD of the rotor in an axial flux machine enables a more precisely controlled, and therefore smaller air gap distance between the rotor and stator with the benefit of generating more torque with the device. Air gap distance between the rotor and stator can be limited by machining tolerance and deflection of the rotor during operation due to permanent magnet (PM) attraction. The rotor in an axial machine will deflect due to magnetic flux in the air gap, so the air gap needs to be larger than the operational deflection of the rotor to avoid contact between the stator and rotor. Comparing the deflection between an actuator with only an ID bearing with an actuator with ID and OD bearings, the rotor and stator in an ID-only actuator deflect significantly more than the rotor in the ID/OD bearing actuator. The reduction in deflection in the ID/OD actuator may allow a smaller air gap distance to be maintained which result in greater torque for a given input power. It has been shown by analysis and experimentation that the torque gained by air gap distance reduction may be larger than the drag induced by the OD bearing in some embodiments. It has also been shown that the increase in torque-to-weight that results from the use of an OD bearing, due to the reduction of structural material needed to maintain the airgap, may be more significant than the weight of the additional bearing and material needed to support the additional bearing.

In a non-limiting exemplary embodiment of the present device, the outer diameter of the stator is 200 mm and the axial air gap is approximately 0.010".

Figure 7:
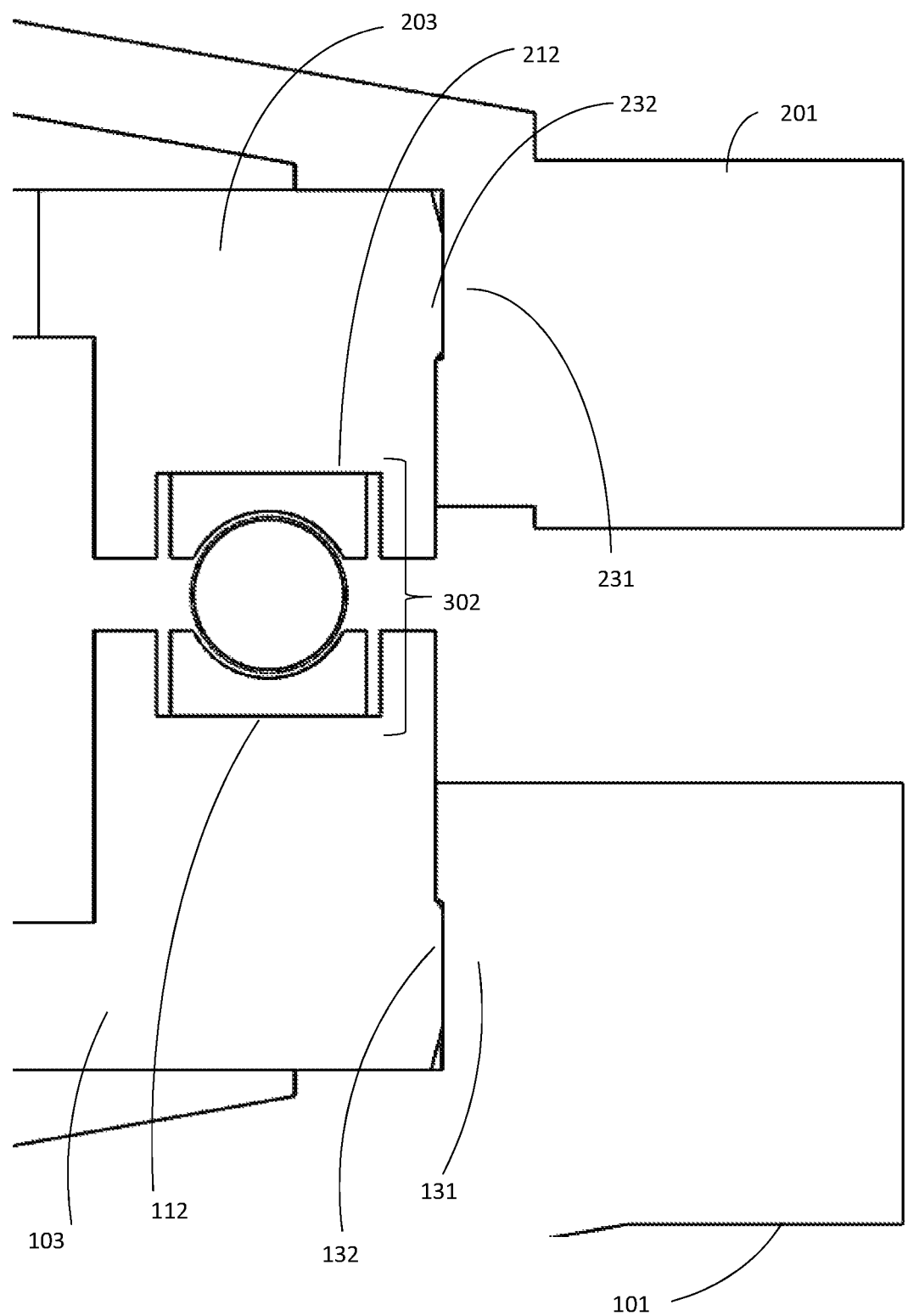
FIG. 7 is an enlarged detail view of an outer bearing and thermal interference fit showing the detail C1 in FIG. 6.
Figure 9:
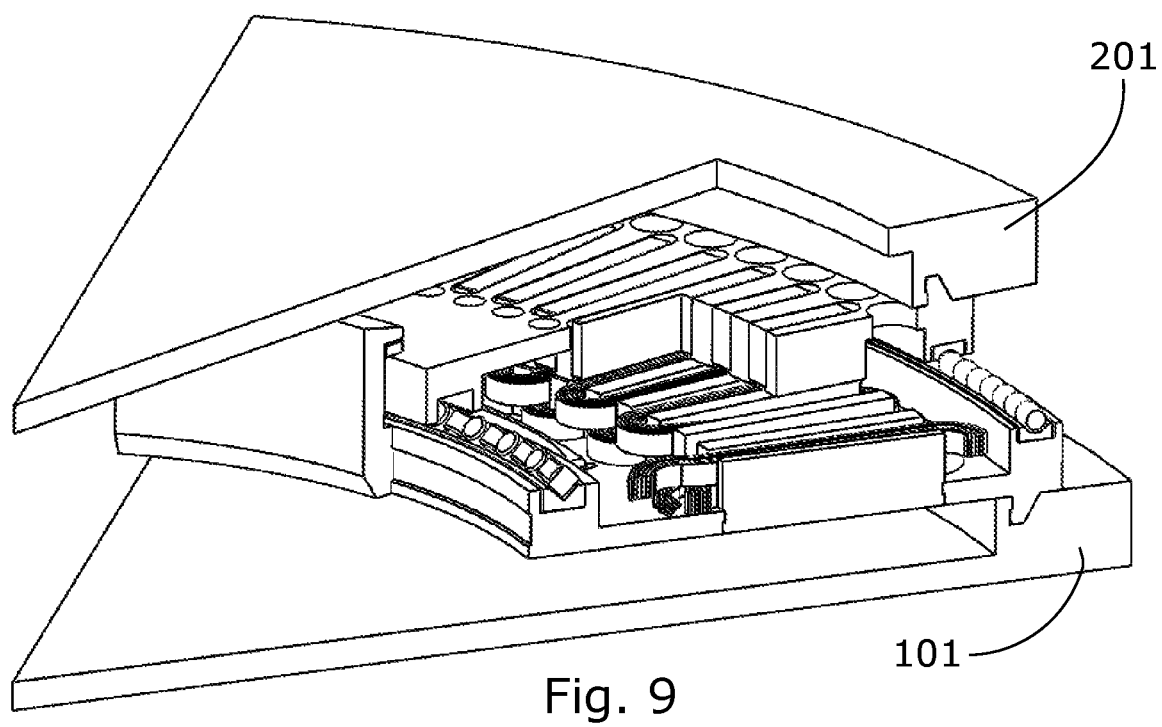
FIG. 9 is an isometric view of a section of an exemplary actuator having an alternative thermal interference fit.
Figure 10:
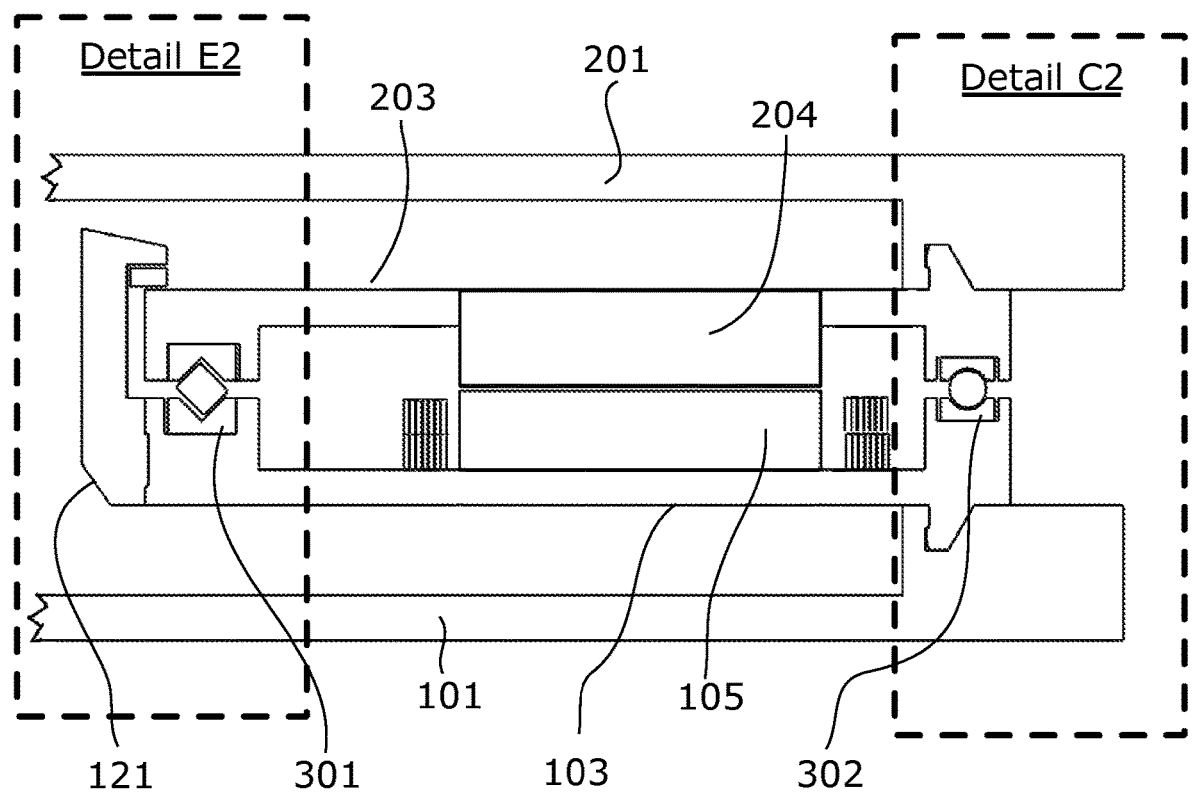
FIG. 10 is an section view of the exemplary actuator in FIG. 9.
Figure 16:
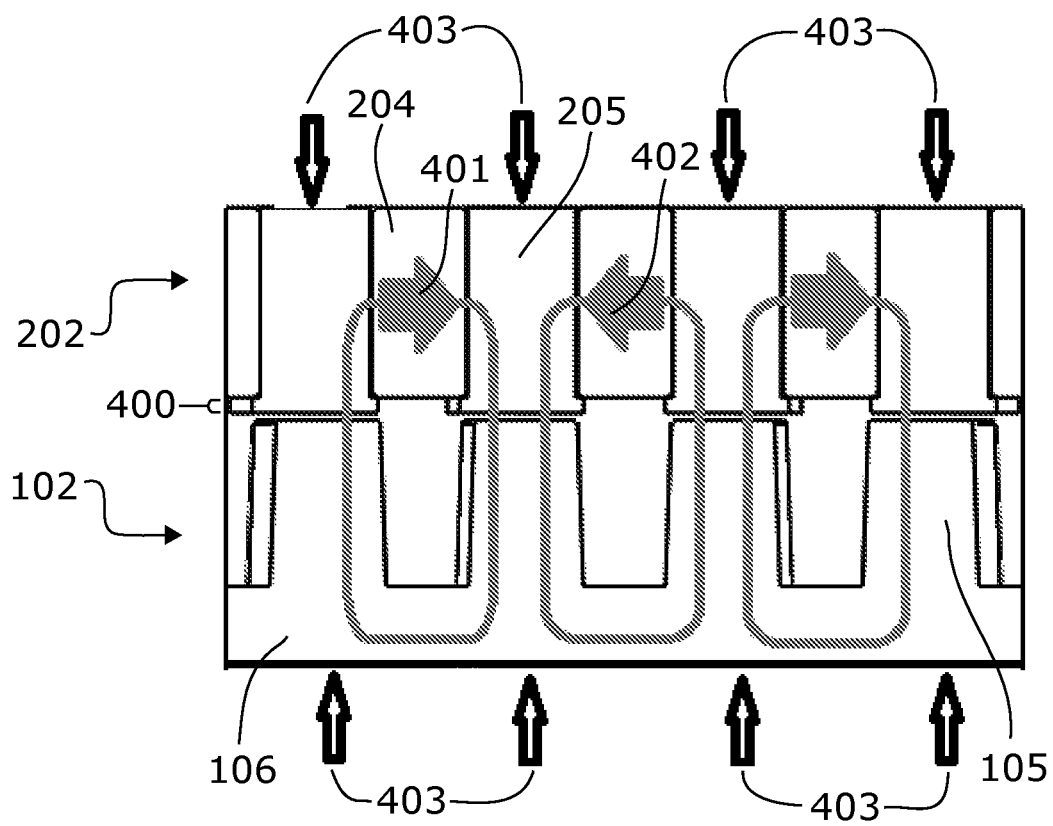
FIG. 16 is a section view of a rotor and stator including representations of magnetic flux and forces along the section B-B in FIG. 6.

A non-limiting exemplary embodiment of the device has one stator and one rotor as shown in FIGS. 7 to 9. The single stator/single rotor setup enables the rotor to preload the ID and OD bearings by constantly attracting the stator in the axial direction. As illustrated in FIG. 16, permanent magnets 204 generate magnetic flux represented by the arrow 401. Meanwhile, an adjacent magnet also generates the same polarity magnetic flux 402 into the pole 205. Both flux 401 and 402 travel through the rotor pole 205, pass through the airgap 400, into stator post 105, and generate magnetic attractive forces 403 on both the stator 102 and the rotor 202. The magnetic forces 403 are so strong that they are able to hold the stator and the rotor together during passive and active operation under usable operating conditions for many applications. The posts are connected to a back iron 106.

Figure 17:
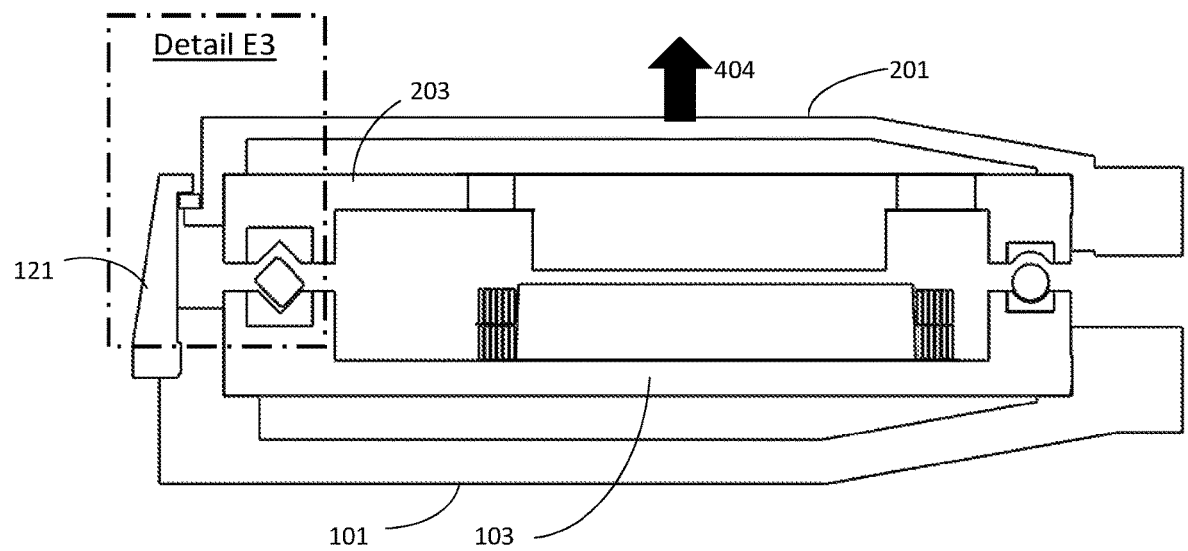
FIG. 17 is a view of the body of an exemplary actuator with a safety ring.

FIGS. 17 to 19 shows an example of the operation of the safety ring 121. When there is a dislocating force 404 exerted on the rotor and the force is higher than the magnetic attractive forces 403 (FIG. 16), the rotor including the rotor plate 203 will start separating from the stator including the stator plate 103. When the rotor begins to detach from the stator, the lip of the safety ring will contact the arm housing 201 of the rotor and keep the arm assembly 200 from separating. During normal operation, the bearing ring 124 (FIG. 18) will be free spinning in the gap between the lip 122A and arm housing 201 and does not create drag and friction. When the coils are engaged or powered, the coils generate attracting and repelling forces which are very similar resulting in primarily tangential forces along the rotational plane. Any axial repelling force under power is, therefore, very small relative to the permanent magnet attractive forces, so the permanent magnet attractive forces are available at all times to prevent separation of the stator and rotor and to maintain adequate preload on the bearings under predetermined maximum load conditions. In some embodiment, the bearing 124 may form a shoulder by being or having some part of the bearing secured to or integral with the rotor plate 203.

This design provides room for the rotor joint to provide a limited break-away effect for a small displacement before the safety ring contacts. This break-away effect would be beneficial, for example, if a robot arm makes unwanted contact with a human, pinning them between the arm and an immovable object. In this case, the arm may have a very short stopping time, but there may still be a small amount of movement before the actuator comes to a full stop. The partial separation of the rotor from the stator of one or more actuators in the arm, before the safety ring comes into contact, can be used to provide a maximum axial load on one or more actuators in the arm which are loaded from the impact, in such a way as to cause the rotor and stator of these actuators to partially separate. With a small amount of separation and very fast acting and fast decelerating actuators, such as embodiments of the present device, this partial separation is believed to provide a level of increased safety by reducing the impact or pinning force of a robot arm.

For a 10" OD actuator of the present device, attractive forces have been demonstrated in the range of ~2000 lbs. This force is high enough to make assembly and disassembly of the device extremely difficult for small devices, and prohibitively difficult and unsafe for larger versions of the device.

Assembly and disassembly safety concerns may be reduced with embodiments of the device, and the cost and complexity of assembly fixtures may be reduced.

Figure 20:
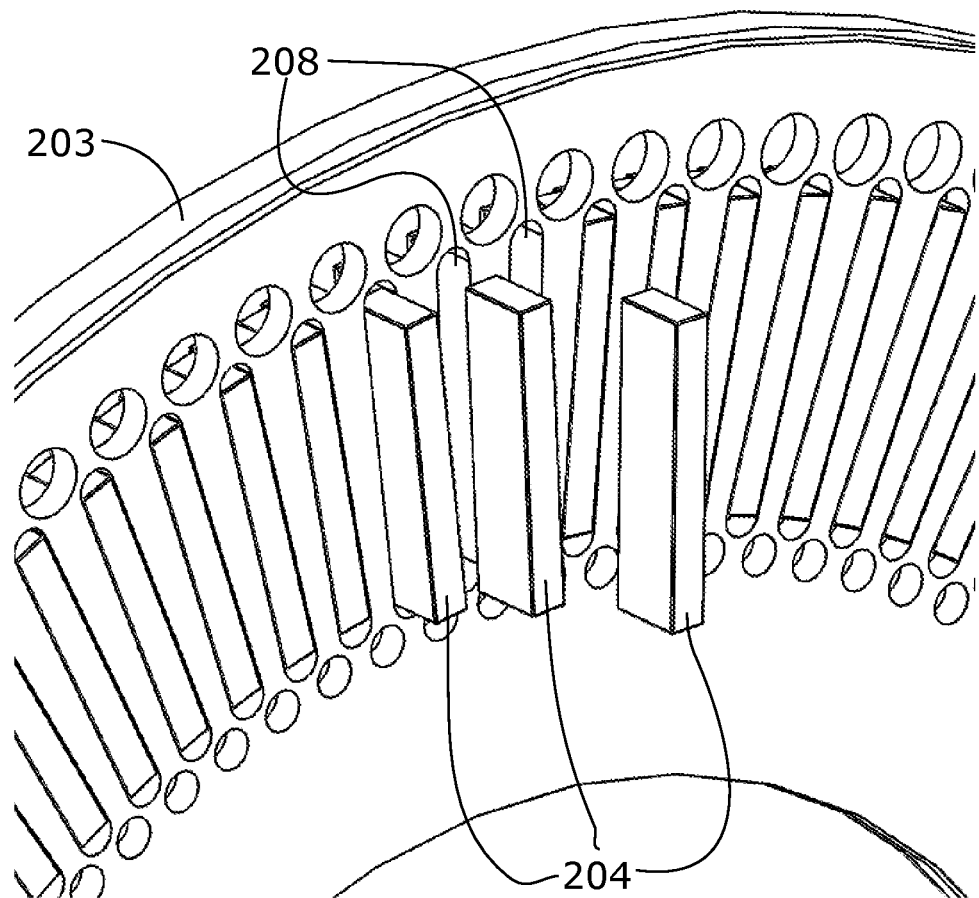
FIG. 20 is a close up view of a rotor during installation and removal of the magnets.

The rotor plate shown in FIG. 3 has no back iron immediately axially outward from the permanent magnets (corresponding to radially outward from the permanent magnets in a radial flux embodiment of the device etc.). As a result, magnet slots 208 are open on the back face of the rotor so magnets can be assembled into the slots after the stator and rotor are assembled. FIG. 20 shows that the magnets 204 can be accessed from the back of the rotor which allows each of those magnets to be removed or installed individually without removing the rotor from the stator.

The magnets 204 may be installed into the slots as follows. Align the magnet to the slot with the same polarity magnetic flux contacting the rotor post as the adjacent magnet contacting the same post. Every second magnet will be in the same circumferential polarity alignment. Every first magnet will be the opposite of every second magnet so the posts are alternating polarity. Slide the magnet into the slot until it is secured against the tabs (if parallel sided) or, if tapered magnets are used, until the tapered magnet seats into the tapered slot. Repeat the above steps until all the magnets are installed. Apply bonding agent (eg, wax, epoxy, glue) to fill the clearance gap. This step may not be necessary in all cases, such as with a precision tapered magnet in a precision tapered slot.

To remove the rotor and access the stator coils and ball bearings, the rotor can be easily demagnetized by removing the magnets individually.

As shown in FIG. 16, each of the permanent magnets 204 in the rotor generates the same polarity flux as its immediately adjacent permanent magnet which means every magnet will be repelling the adjacent magnets on both sides of it. This would cause the magnets to repel each other, except it has been shown that certain geometries are able to prevent these repelling forces from causing the magnets to dislodge themselves form the slots. The smaller the airgap, for example, the stronger the force, in many cases, which will cause the magnets to lodge themselves into, instead of out of, the slots. The use of tapered magnets is also beneficial in this sense, because a tapered magnet, with the large dimension of the taper toward the back face of the rotor, will generally be more apt to pull itself axially toward the rotor posts and therefore toward the airgap.

Figure 21:
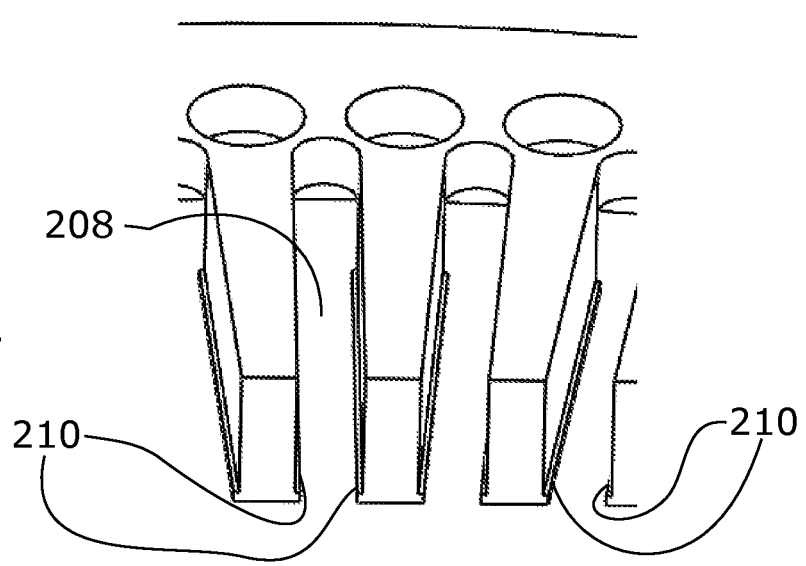
FIG. 21 is a partial cross section of a rotor plate section.

As shown in FIG. 21, a physical stop is used to stop the magnet from moving into the airgap. In this embodiment, the stops are tabs 210 on each side of the slot generate attractive forces as the magnet slides into the slot. Their combined force pull the magnet into the slot. Since the repelling forces partially or completely cancelled out, the combined force from the poles and tabs becomes the resultant force acting on the magnet. The magnets sit on the tabs and the magnetic attractive forces secure the magnets to the poles. When configured correctly, as described in an earlier disclosure, the net force on the magnets can be tailored to use the magnetic forces to magnetically retain the magnets in the slots. Adhesive or mechanical mechanism is not required in this case except to prevent side-to-side movement of a magnet in a slot.

Figure 22A:
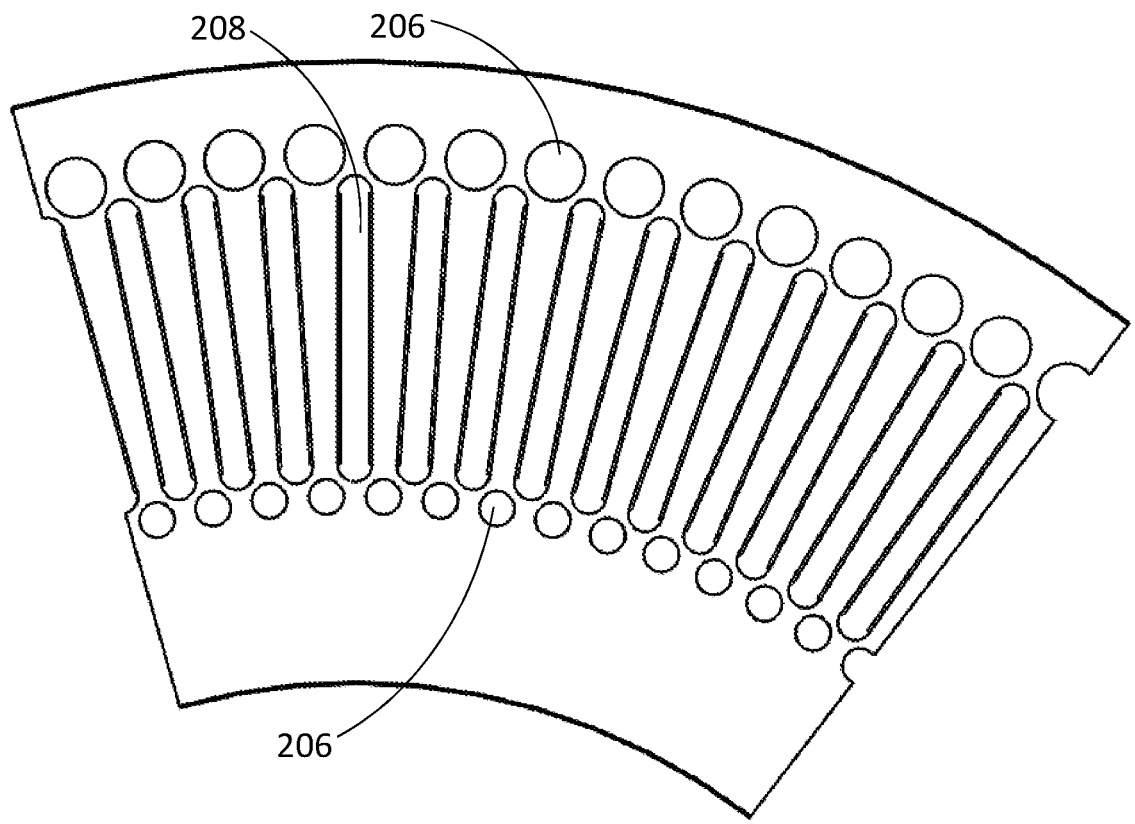
FIG. 22A is a partial view of a rotor plate section having flux restricting holes.

A non-limiting exemplary embodiment of the actuator is shown in FIG. 22A with flux restriction holes 206 placed between magnet slots 208, and along the outside and inside radius of the magnet slots 208 on the rotor to reduce flux leakage between the opposite polarity faces of a magnet and between adjacent rotor poles. Magnetic simulation was done to verify if those holes reduce flux leakage and it has been shown that the flux leakage between rotor poles can be substantially reduced while still maintaining the necessary structural strength and stiffness to achieve a small and consistent airgap.

Figure 22B:
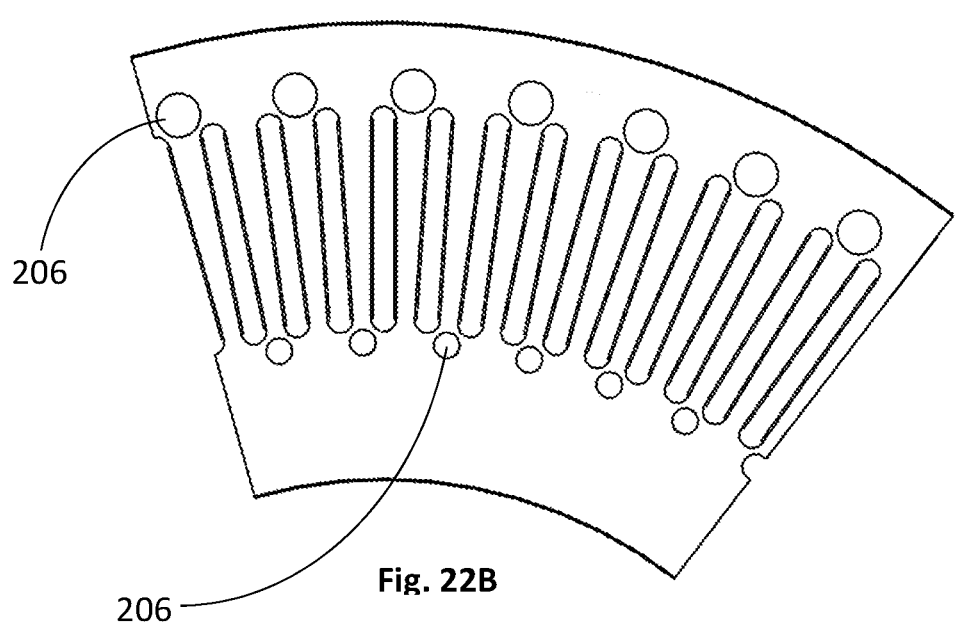
FIG. 22B is a partial view of a rotor plate section having another arrangement of flux restriction holes.

The flux restriction holes can, alternatively, be located between every second post on the OD and between every second post on the ID as shown in FIG. 22B. As shown in FIG. 22B, the inner and outer flux restriction holes are staggered so that each post is adjacent to only one of the inner or outer flux restriction holes. This provides an unrestricted flux linkage between only the N posts around the OD and only the S posts around the ID as well as increased structural integrity for every first post around the OD and every second post around the ID. These holes can be thru-holes or blind holes, as long as they provide the necessary structural strength and stiffness as well as the desired flux path reluctance.

Figure 23:
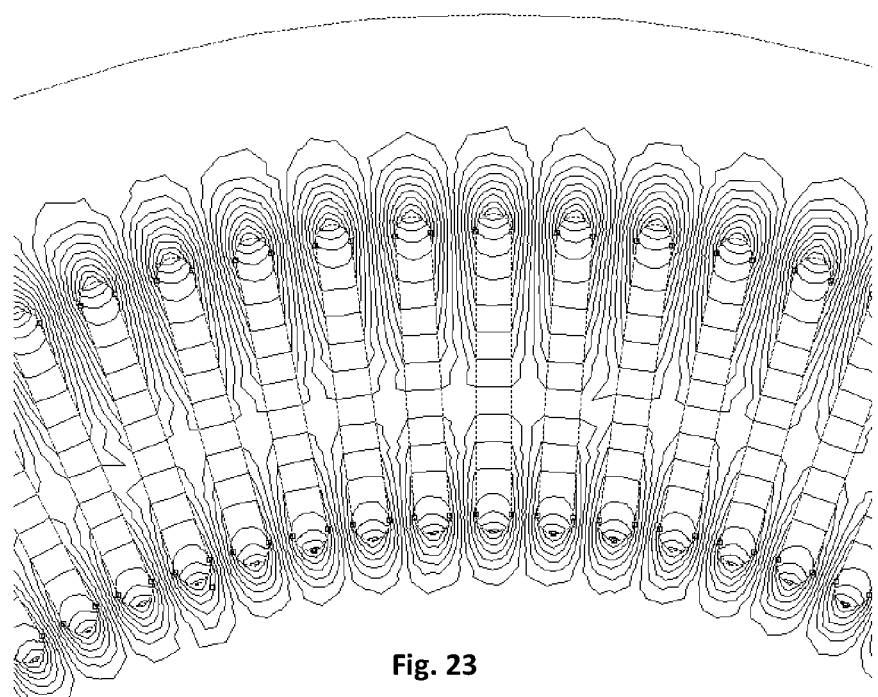
FIG. 23 is a FEMM simulation result on a rotor plate without flux restricting holes.
Figure 24:
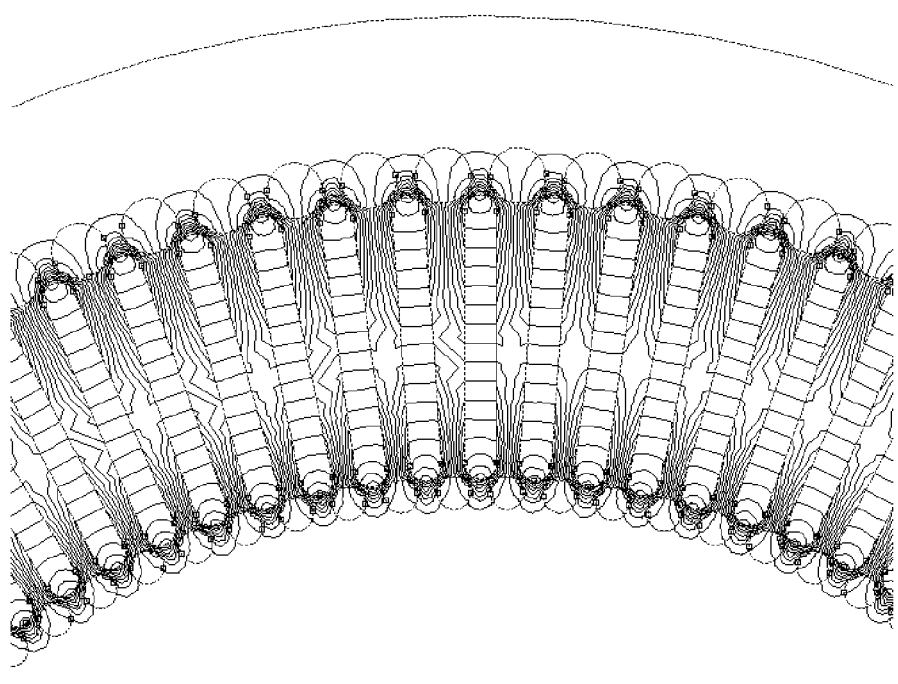
FIG. 24 is a FEMM simulation result on rotor plate with flux restricting holes.

FIG. 23 shows the flux path from the magnetic simulations without flux restriction holes and FIG. 24 shows the flux path from the magnetic simulations with flux restriction holes. From the figures, it is shown that flux restriction holes reduce flux leakage between adjacent rotor poles. For example, when flux restriction holes are used, the flux density increased at the air gap surfaces of the rotor poles and more flux is directed to pass through the stator. As a result, electromagnetic force increases when the coils are engaged and torque generated by the stator and rotor increases.

MagNet simulations on the rotor plate with and without flux restriction holes also led to the same conclusions. More flux is directed from the posts into the airgap.

Figure 25:
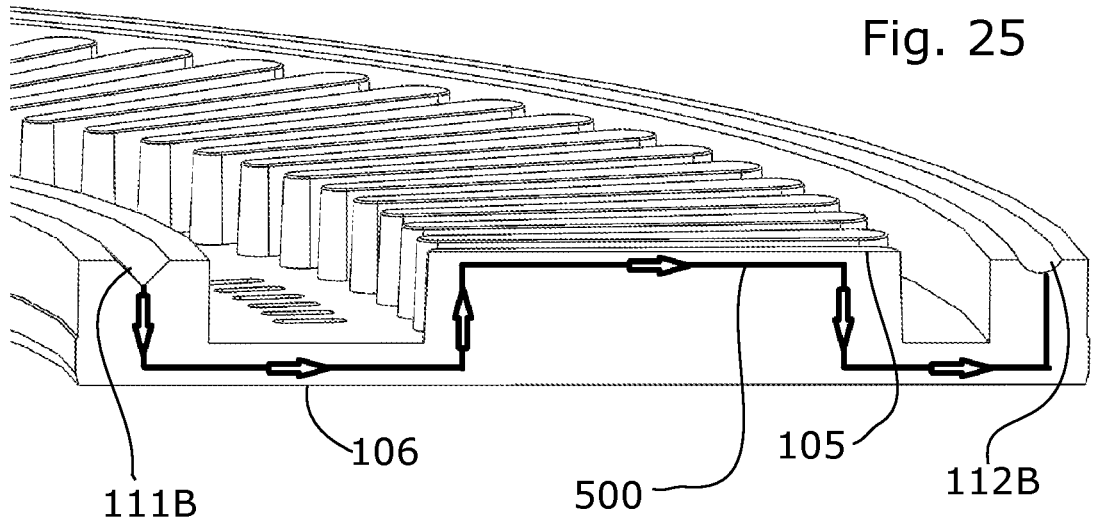
FIG. 25 is a cross section of a stator plate section with uninterrupted path between ID bearing and OD bearing.

In an embodiment shown in FIG. 25, the stator is formed of unitary material (instead of a common laminated structure) and comprises a stator post 105, a stator back iron 106, inner bearing race 111B, and outer bearing race 112B. Looking at the cross section of the stator in FIG. 25, there is no interruption along the stator material path 500 between the tip of a stator post and the inner bearing race, the tip of said stator post and the outer bearing race.

The stator plate, which is held inside the integrated housing, is machined from a solid piece of material. A typical stator is often made using laminated steel layers. In an exemplary embodiment, as shown in FIG. 25, material path between the inner bearing race 111B, stator post 105 and outer bearing race 112B is uninterrupted and comprises a homogeneous material such as, but not limited to, ductile iron or magnetic steel such as M19. The stator core can be cast or machined from a solid piece of steel. The benefit of this construction may include lower cost and complexity due to a single part rather than an assembly of many small laminated parts, and much higher strength, stiffness and creep resistance because there is no adhesives in the load path as there would be in typical laminated stator constructions. This allows the use of much thinner stator cross sections which is beneficial for reduced weight.

The uninterrupted radial path corresponds to an uninterrupted axial path in a radial flux device. The path 500 in FIG. 25 terminates at the ID and OD at an integrated bearing race. The uninterrupted path may also terminate at a bearing race seat if a separate bearing race is used. It may also terminate at an intermediate component or layer between the stator and the bearing race seat.

Figure 26:
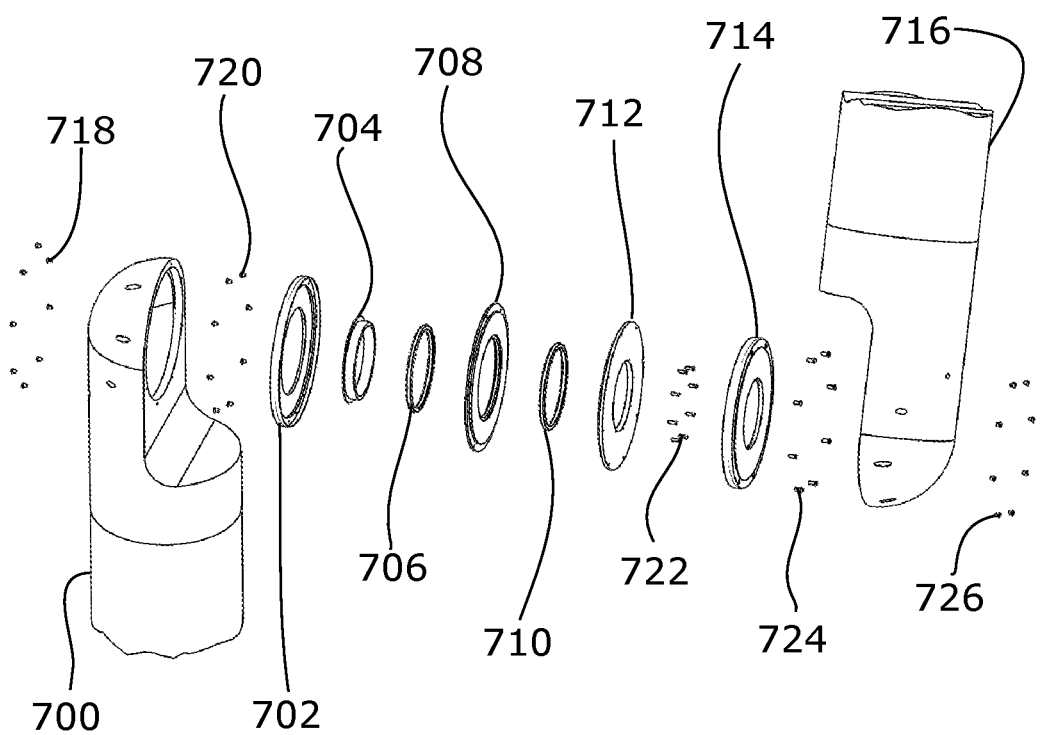
FIG. 26 is an exploded view of an exemplary actuator.

Referring to FIG. 26, an exploded view of exemplary rotor and stator is shown that is connected to a pair of robot arms using bolts. A first arm 700 is connected to a rotor housing 702 using bolts 718. The rotor housing 702 is connected to a rotor 708 using bolts 720. A first bearing element 706 connects between the rotor 708 and a stator 712 and is connected by a press fit ring 704. A second bearing element 710 also connects between the rotor 708 and the stator 712 using bolts 722. The stator 712 is connected to a stator housing 714 using bolts 724. A second arm 716 is connected to the stator housing 714 using bolts 726.

Figure 27:
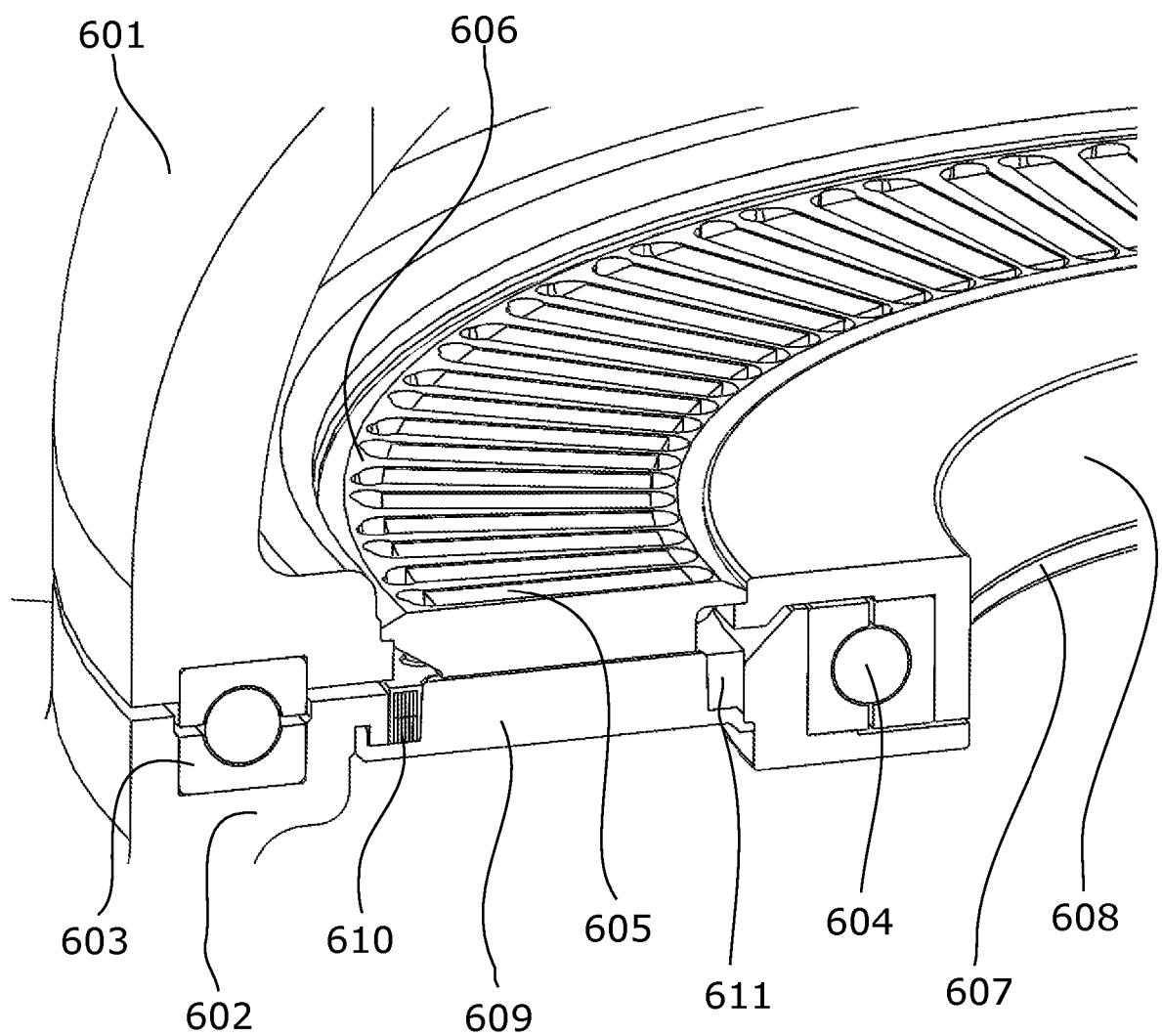
FIG. 27 is a cross section of an embodiment showing an exemplary actuator connected to an upper and lower housing.
Figure 28:
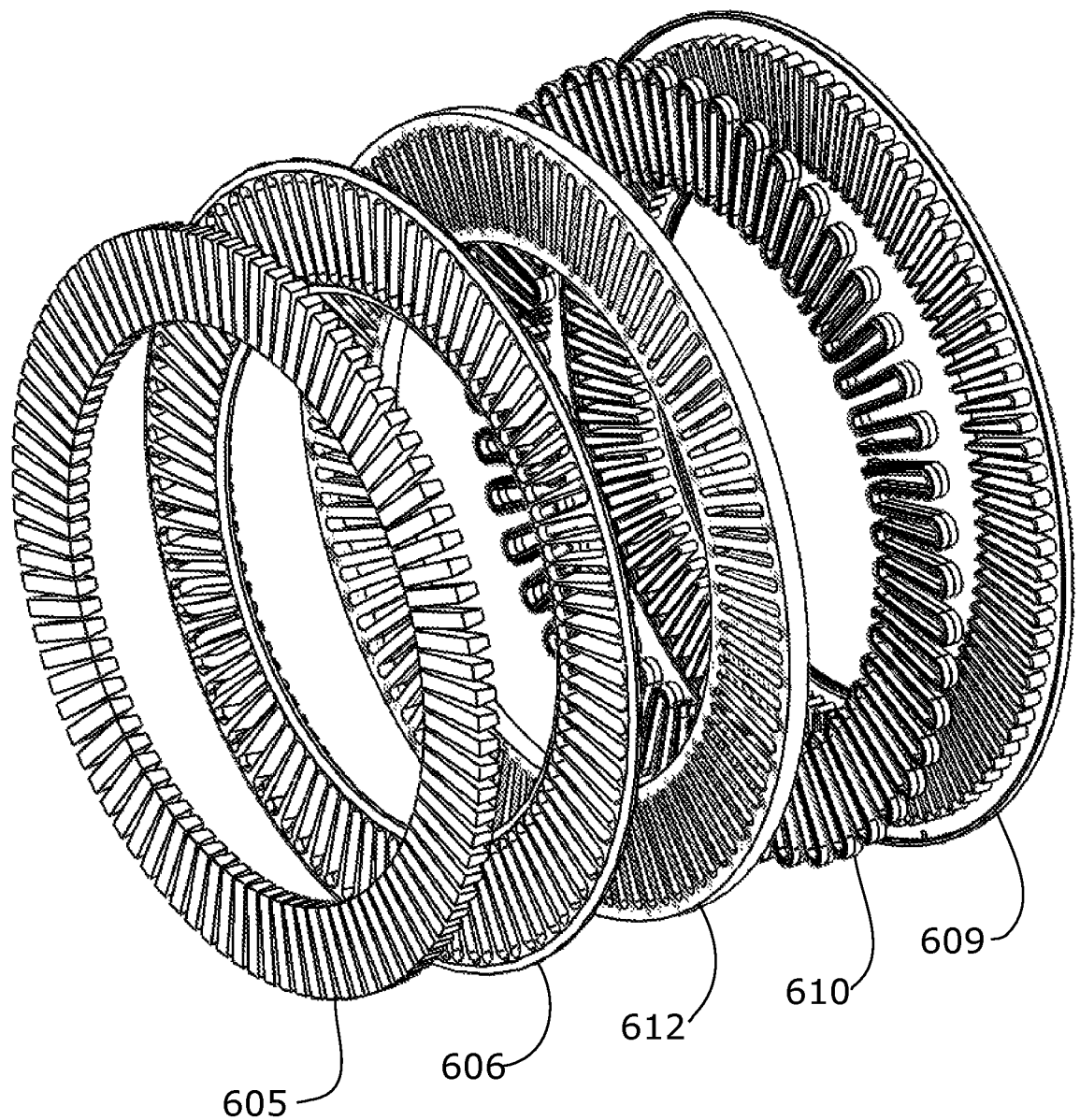
FIG. 28 is an exploded isometric view of the exemplary actuator in FIG. 27.
Figure 29:
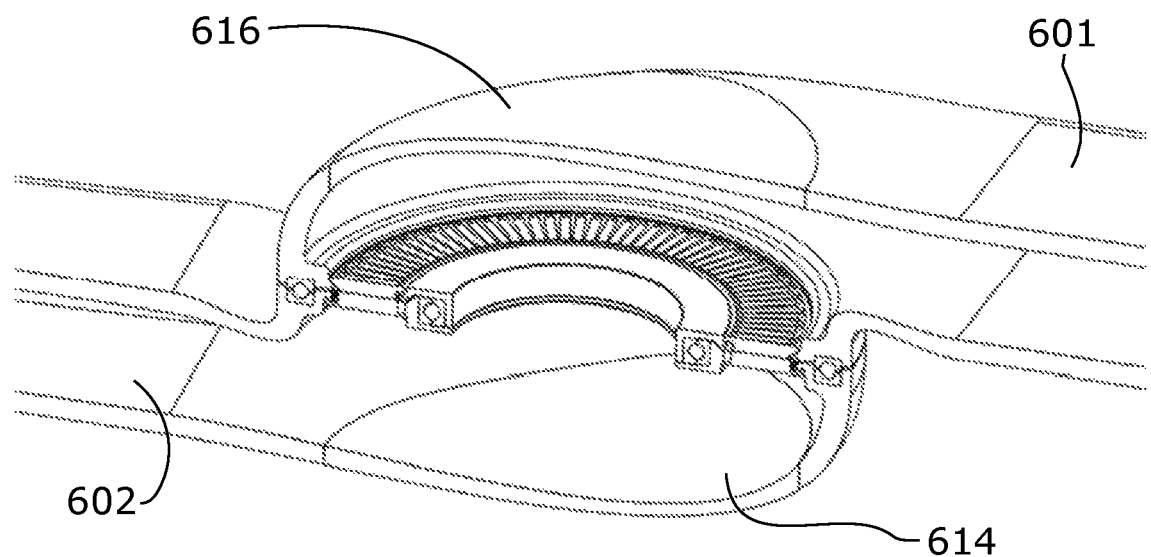
FIG. 29 is an isometric cut away view of the exemplary actuator in FIG. 27.

Referring to FIGS. 27 to 29, a rotor 606 is made from a ferrous material, such as Ductile Iron, and holds an equi-spaced array of magnets 605 that are polarised in a circumferential direction. The polarity of the magnets 605 is alternated in order to generate alternating north and south poles in the radial webs of the rotor 606. The stator 609 is made from a ferrous material, such as Ductile Iron, and includes an equi-spaced array of axial posts around which a set of stator windings 610 are wrapped. Applying commutated power to the stator windings 610 polarises the posts of the stator 609 in a pattern and sequence such that circumferential attraction and repulsion forces are generated between the posts of the stator 609 and the radial webs of the rotor 606, thereby generating torque. The stator windings 610 are encapsulated by the stator potting compound 611, which serves to prevent movement of the wires and helps to transfer heat from the wires to the stator 609. As shown in FIG. 28, a stator cap 612 may be placed over the stator 609 and hold the wires 610 in place.

The magnets 605 also cause attraction between the stator 609 and the rotor 606. The bearings 603 and 604 counteract the attraction force between the stator 609 and the rotor 606 via the housings 601, 602, 607 & 608 and act to accurately control the gap between them. The axial attraction force between the stator 609 and the rotor 606 is adequate, in most applications, to prevent the upper housing 601 from separating from the lower housing 602, thereby eliminating the need for additional retention between them. Diametral fits at the interfaces between the housings 601, 602, 607 & 608 and the rotor 606 and the stator 609 carry radial loads between the two assemblies via the inner 4-point contact bearing 604. External moments applied to the assembly are carried primarily through the outer thrust bearing 603.

The flow of current through the stator windings 610 tends to increase the temperature of the stator 609 relative to the other components. Conduction of the generated heat to the adjacent housings helps to reduce the increase to its temperature.

The example shown includes light alloy housings which have a higher coefficient of thermal expansion than the stator 609. To maintain an interference fit at the interface between the outer diameter of the stator 609 and the inner diameter of the lower housing 602 as the temperature increases the primary diametral location occurs at the inner diameter of the locating hook of the stator 609.

In FIG. 29, removeable caps 614 and 616 sit in the arms which allow the stator and rotor to be inserted, and for the magnets to be inserted last.

It is also possible to provide force to retain the magnetics in the rotor slots using a combination of mechanical and magnetic force. Tapered magnets can provide a structure in which a significant percentage of magnetic flux goes through the airgap while retaining the magnets in the rotor slots.

Magnets which taper tangentially such that they are thinner toward the air gap, can provide high performance in a concentrated flux rotor configuration. Referring to FIGS. 30 to 35, there is shown a rotor 3300 in an axial flux configuration with magnets 3302 having tapered ends 3316 and rotor posts 3304 with tapered ends 3318. The magnets and rotor posts taper in opposite directions to form an interlocking arrangement. Permanent magnets taper in the direction of the stator 3330 while rotor posts 3304 taper away from the stator. In this embodiment two substantially mirrored rotors 3300 can be assembled between a pair of stators, with tapered posts of each rotor meeting back to back and tapered magnets of each rotor meeting back to back. Tapering the magnets 3302 in this way, allows for greater rotor post width at the air gap. It also allows for greater magnet width at the wide end of the magnet taper to provide more flux to the rotor post 3304 away from the air gap, where if the sides were parallel the posts 3304 would tend to be less saturated. In this way, the active permanent magnet 3302 and soft magnetic materials are used more effectively to provide more flux at the airgap. The two rotors parts can be secured together for example by an adhesive, but in some preferred variations a mechanical feature such as bolts (not shown) or a securing ring (not shown) may be used.

The interlocking arrangement of tapered posts 3304 and magnets 3302 operate as stops that prevent the permanent magnets from dislodging, which reduces the need for magnetic force to retain the magnets in the rotor, and therefore reduces the need for magnetic flux to leak through the end iron 3314.

In some embodiments an array of flux path restrictions 3328 can be formed in the end iron 3314, for example, as holes in the end iron 3314 at the base of each rotor posts 3304 where they connect with the end iron 3314. These flux path restrictions 3328 reduce the available flux path between rotors posts 3304 and end iron 3314.

Figure 30:
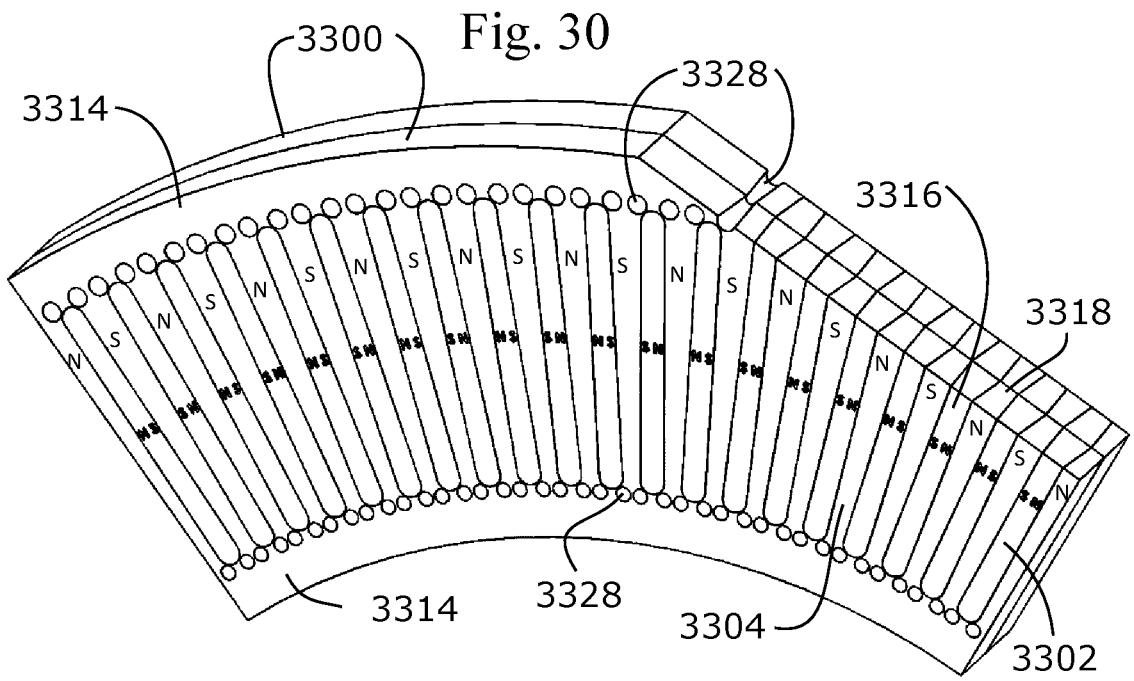
FIG. 30 is a cross-section through a segment of an axial flux concentrated flux rotor with tapered magnets and flux path restrictions.

FIG. 30 shows an axial flux configuration of a tapered slot rotor, but the tapered slot rotor can be equivalently constructed in a radial flux configuration. Tapered magnets may narrow towards or away from the opposing carrier.

A second effect of tapering the magnets in this way is to bias a high percentage of the flux from a permanent magnet toward the air gap. This is beneficial in at least two ways. A first is that the tapered permanent magnet will be drawn toward the air gap where they will close the airgap between the permanent and the rotor slot wall for lower reluctance flux linkage and where they will be mechanically prevented from further movement and therefore securely retained by the tapered rotor posts. Secondly, the narrower rotor posts at the back surface results in a greater distance from post to post along the center plane of the rotor. This reduces the amount of leakage through the air from post to post along the center plane of the rotor. By assembling two substantially mirrored rotor halves with tapered posts and tapered magnets back-to-back a large percentage of the flux from the permanent magnets can be forced to link across the air gap.

In this way, very high flux density can be achieved in the air gap while magnetically and mechanically retaining the magnets. A cost effective way to manufacture a tapered rotor post rotor is to use two symmetrical rotors 3300 back to back. This construction does not allow for the use of a back iron to stiffen the rotor, so a soft magnetic end iron 3314 is used instead. The end iron 3314 has sections that are preferably as thin as possible to create a high reluctance flux path between rotor posts through the end iron, and as thick as necessary to provide the mechanical strength and rigidity to maintain a small and consistent air gap.

Figure 31:
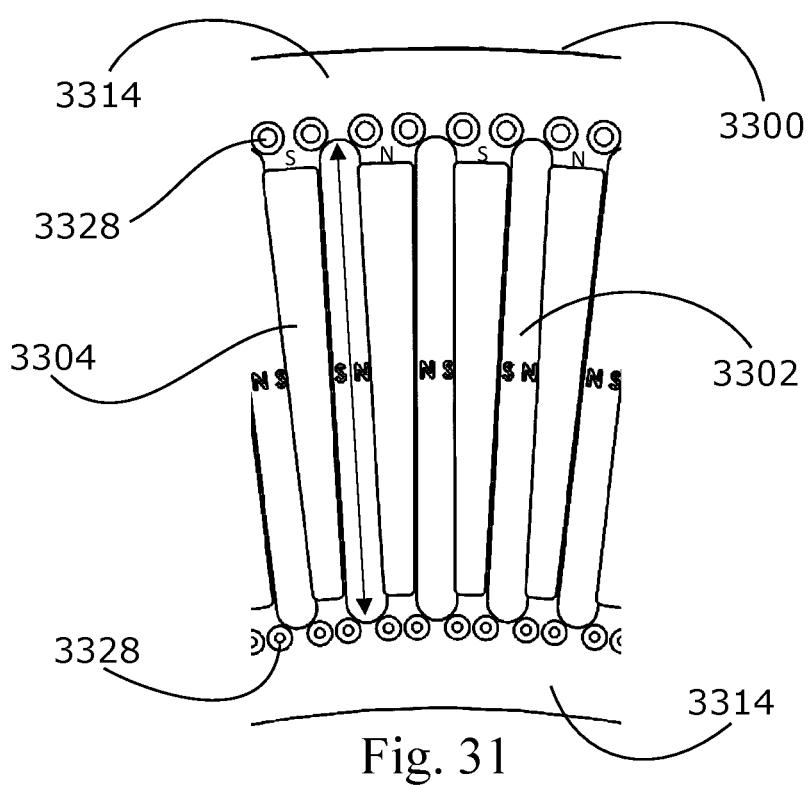
FIG. 31 is a close-up section view of a portion of an axial flux concentrated flux rotor with extended length magnets.
Figure 32:
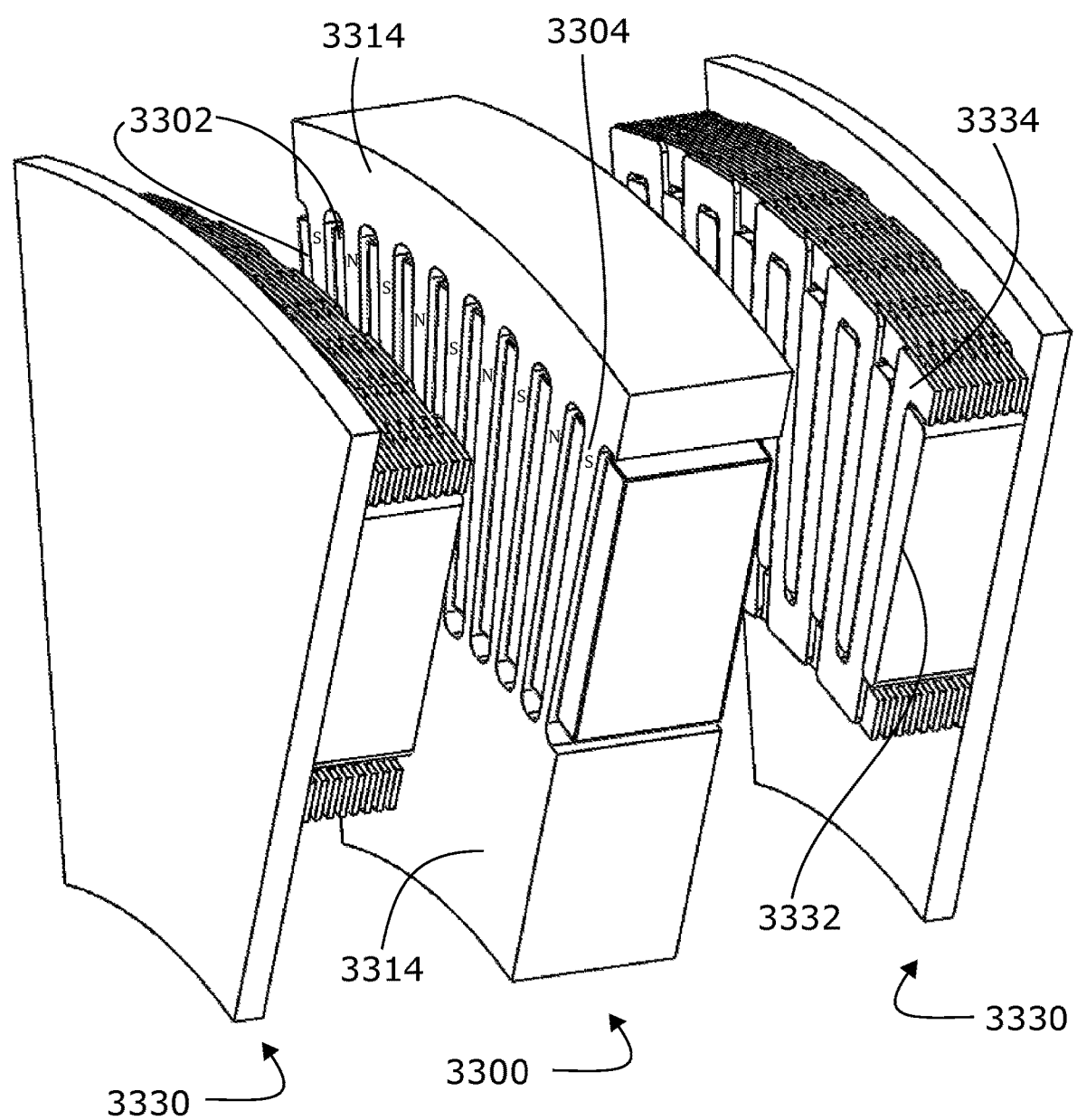
FIG. 32 is a simplified exploded section view of an embodiment of an axial flux stator-rotor-stator configuration of a concentrated flux rotor with end iron.

To compensate for the loss of flux from post to adjacent post through the end iron connection, an embodiment uses permanent magnets 3302 that are longer than the soft magnetic stator posts 3332 at the air gap. This is shown in FIG. 31 where the permanent magnet 3302 are longer than rotor posts 3304 which would have the same or nearly the same length as the stator posts 3332. As shown in FIG. 32, a winding configuration 3334 extends around the stator post 3332. By increasing the permanent magnet depth beyond what would be necessary to achieve high flux density in the rotor posts if there was no soft magnetic connection between adjacent posts, the permanent magnets 3302 will be adequate to saturate the end iron 3314 while still maintaining high flux density in the rotor posts at the airgap. As shown in FIG. 31, there are two flux restrictors 3328 adjacent to each end of each rotor post 3304. The rotor posts 3304 have a larger width at the axial outer end of the rotor. The flux restrictors 3328 are larger adjacent to the outer end of the rotor posts and smaller at the inner end of the rotor posts.

The flux restriction holes described for example in the embodiments disclosed in FIG. 3, FIG. 14, FIG. 22A, FIG. 22B, and FIGS. 34-38 are designed to meet an acceptable trade-off between power and structural strength. The cross-sectional area above the magnets provides the strength to maintain the airgap and the flux restrictors prevent flux from excessively connecting between adjacent magnets. The flux restrictors can be placed with holes adjacent to every second post, rather than adjacent to every post, which will provide for a stronger structure but does not have a significant impact on the flux linkage between adjacent posts. The flux restrictors could be blind or through-holes of any shape, so long as there is a cross-sectional area reduction in the flux path. In a preferred embodiment, the flux restrictors will lie on either end of the posts, between the array of posts and each set of bearings. The flux restrictors will preferably lie parallel with the length of each post. The flux restrictors can be designed so that there is a greater cross-sectional area in a structural load path than in a magnetic flux path. The flux restrictors could also be used in a radial flux machine in an equivalent manner as those described for the axial and linear flux machines described herein. An embodiment of the machines described herein with flux restrictors may have a solid material made for example with ductile iron which is strong enough to support magnetic forces, but thin enough to be lightweight. The flux restrictors may be placed adjacent to every post on the rotor or stator or adjacent to every second post on the rotor or stator. The flux restrictors will generally be placed on both ends of each post, or each second post. The flux restrictors may be placed adjacent to every post on one end of each post and adjacent to every second post on the other end of each post. The flux restrictors may be placed in an alternating pattern so that each post is adjacent to only one flux restrictor, and for each adjacent post, the corresponding flux restrictor is adjacent to an opposite end of the adjacent posts. The flux restrictors may have different sizes while maintaining the same geometry. The cross-sectional flux path may be consistent between every second post, but the cross-sectional flux path may be selected so that it alternates between adjacent posts so that each post has a different cross-section flux path than the post directly adjacent to it. Where the flux restrictors are placed in an alternating pattern so that each second post is adjacent to flux restrictors, then the cross-section of each post that is adjacent to the flux restrictors may be smaller than the cross-section of each post that is not adjacent to the flux restrictors. In such an embodiment, every second post will have a larger cross-section than each of the adjacent posts that are adjacent to the flux restrictors. As shown in FIG. 31, there may be multiple flux restrictors adjacent to each end of the posts.

Manufacturing methods for the rotor can include casting or forming or powdered metal construction, additive manufacturing, machining etc. Manufacturing of the magnets can be done by forming or additive or subtractive manufacturing. Magnets can also be magnetised after insertion into slots. It may be possible with present or future processes to press powdered hard magnetic material into the rotor slots and then magnetizing the PM material after pressing, or a slurry of PM magnet material in an epoxy or other polymer can be used to fill the slots and then magnetized after hardening. Magnetizing of the hard magnetic material can be done by applying very high flux density to two or more posts at a time.

Back irons, side irons and end irons serve as retaining elements and form a rigid connection with the rotor posts. Features of one embodiment may be combined with features of other embodiments.

Referring to FIG. 32, there is shown a stator-rotor-stator configuration with an end iron 3314. The end iron 3314 and rotor posts 3304 can be formed from a single piece of isometric soft metallic material, with a single array of permanent magnets 3302 fitting between rotor posts 3304. End iron 3314 is formed at both ends of the rotors 3300. In this embodiment, flux path restrictions 3328 can be included as shown in FIG. 33.

Figure 33:
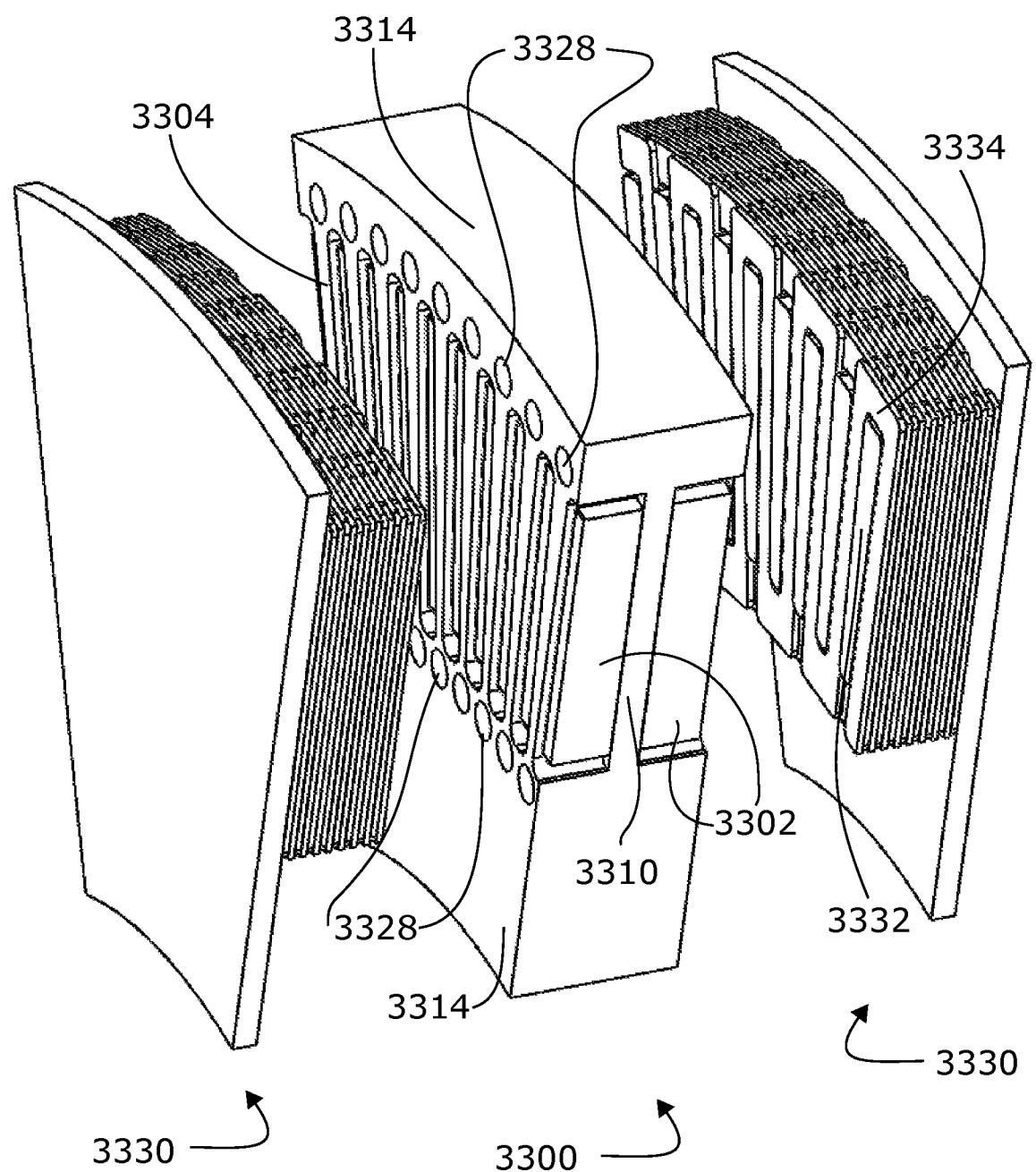
FIG. 33 is a simplified exploded section view of an embodiment of an axial flux stator-rotor-stator configuration of a concentrated flux rotor with back iron, end iron and flux path restrictions.

FIG. 33 shows an embodiment of a stator-rotor-stator configuration with a back iron 3310, end iron 3314 and flux path restrictions 3328. In this embodiment the two array of permanent magnets 3302 are separated by back iron 3310. Flux path restrictions 3328 are formed as bores at the ends of the permanent magnets 3302 to reduce the flux leakage in the end iron 3314.

Figure 34:
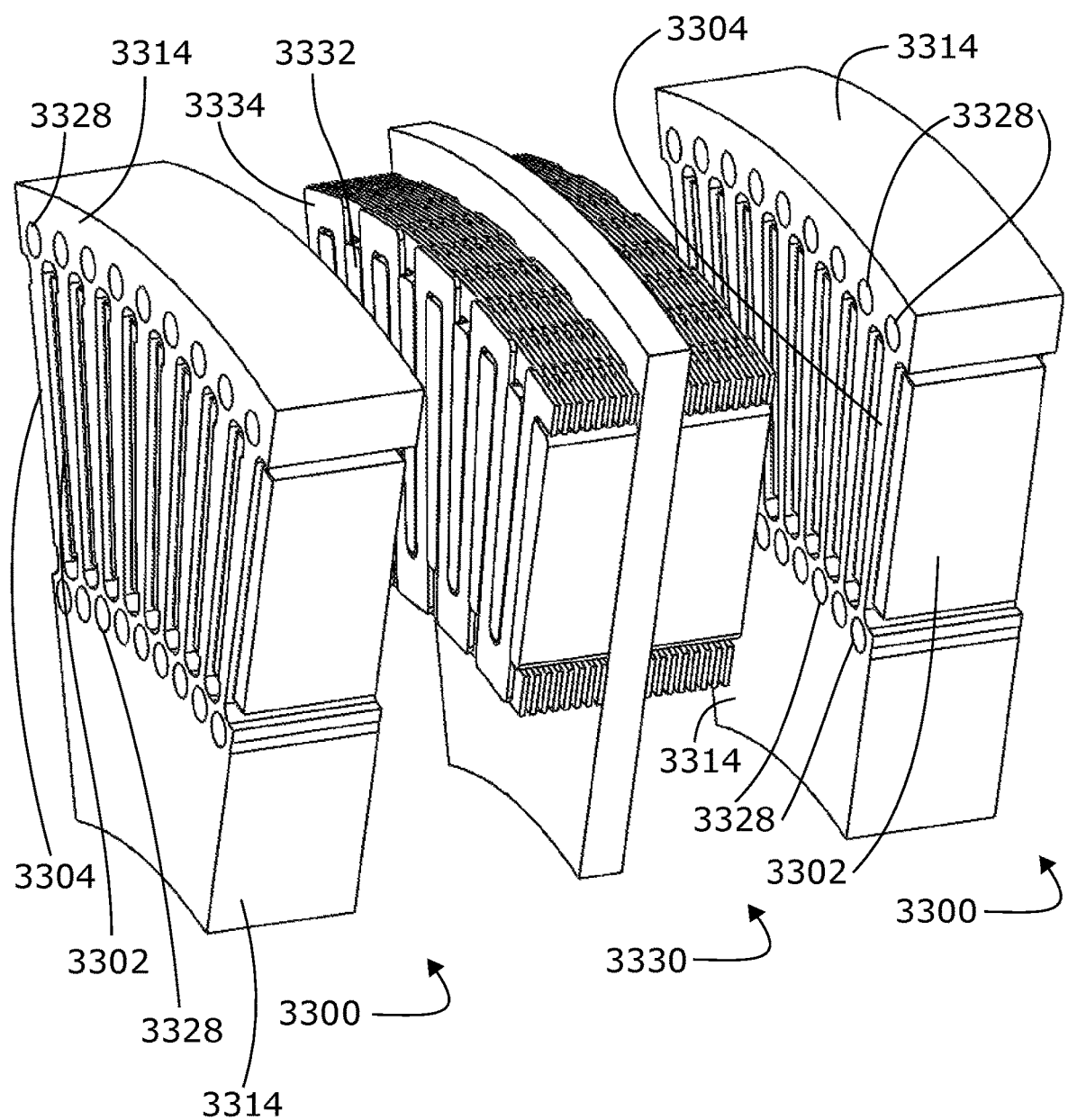
FIG. 34 is a simplified exploded section view of an embodiment of an axial flux rotor-stator-rotor configuration of a concentrated flux rotor with end irons and flux path restrictions.

FIG. 34 shows an embodiment of a rotor-stator-rotor configuration. Two concentrated flux rotors 3300 engage a central stator 3330. The rotors 3300 each include end iron 3314 and flux path restriction 3328. In many applications end iron only or back iron only will be sufficient to provide adequate rigidity to the concentrated flux rotor 3300.

Figure 35:
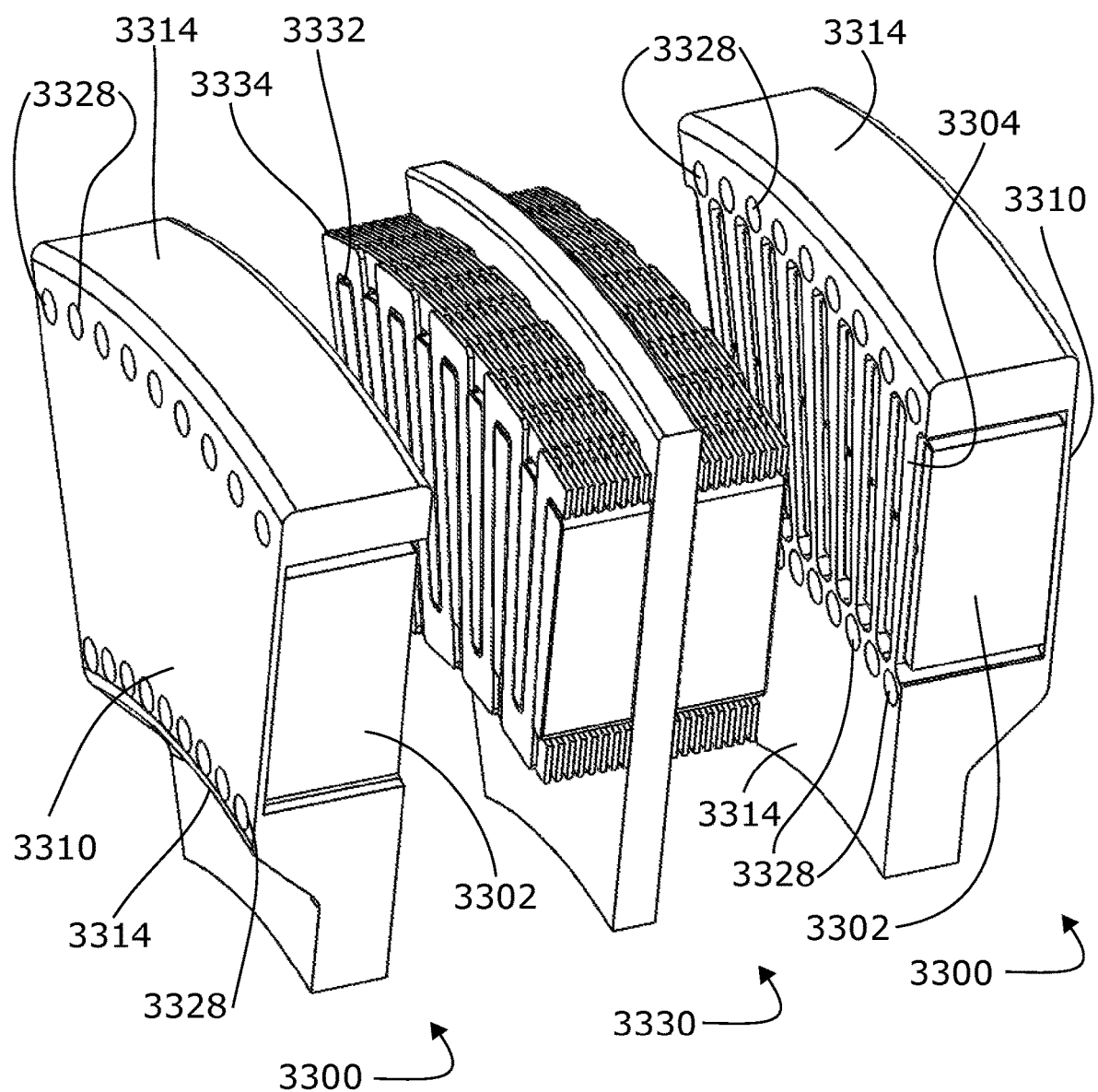
FIG. 35 is a simplified exploded section view of an embodiment of an axial flux rotor-stator-rotor configuration of a concentrated flux rotor with end irons, flux path restrictions and back irons.

FIG. 35 shows an embodiment of a rotor-stator-rotor configuration. The embodiment is essentially the same as that shown in FIG. 34 with the addition of a think back iron 3310 on each rotor 3300.

Figure 36:
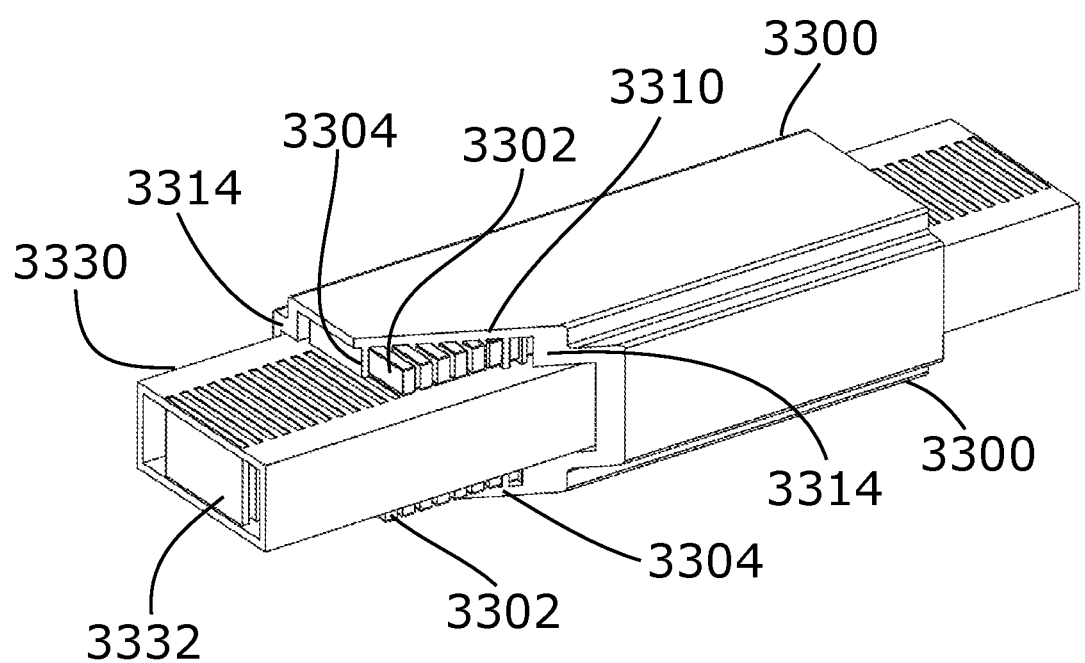
FIG. 36 is a simplified perspective view of a linear flux machine with back irons and flux restrictors.
Figure 37:
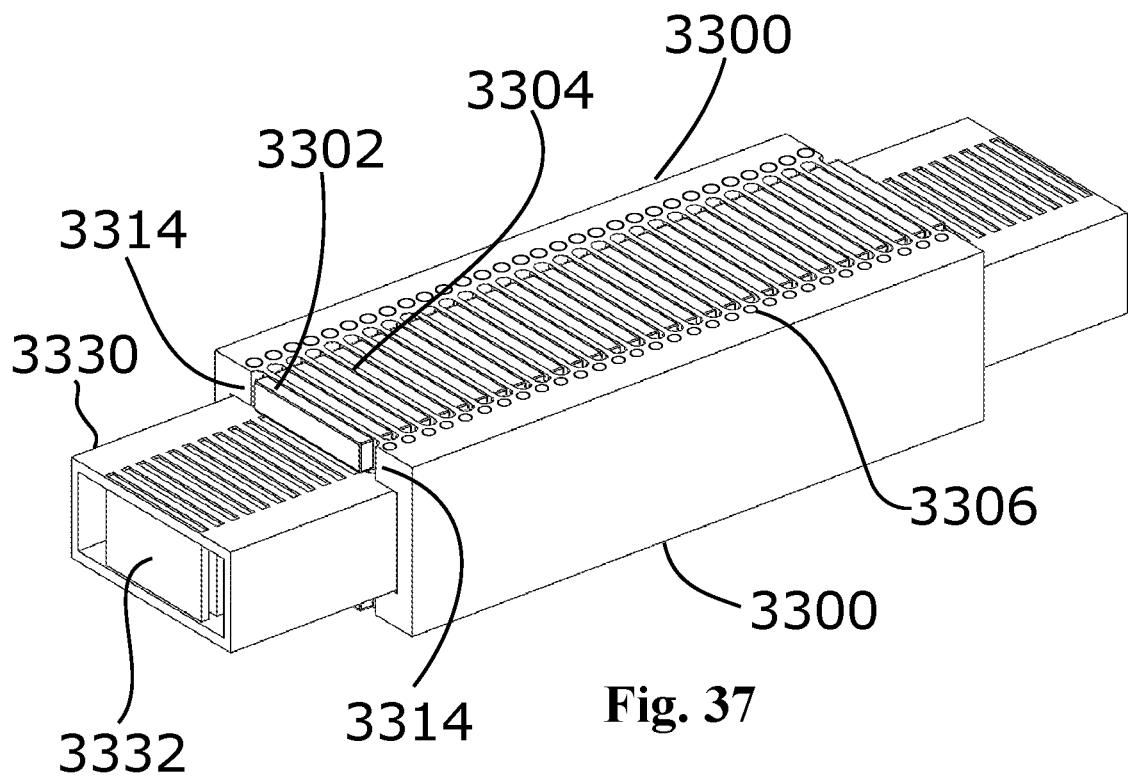
FIG. 37 is a simplified perspective view of a linear flux machine without back irons and with flux restrictors.
Figure 38:
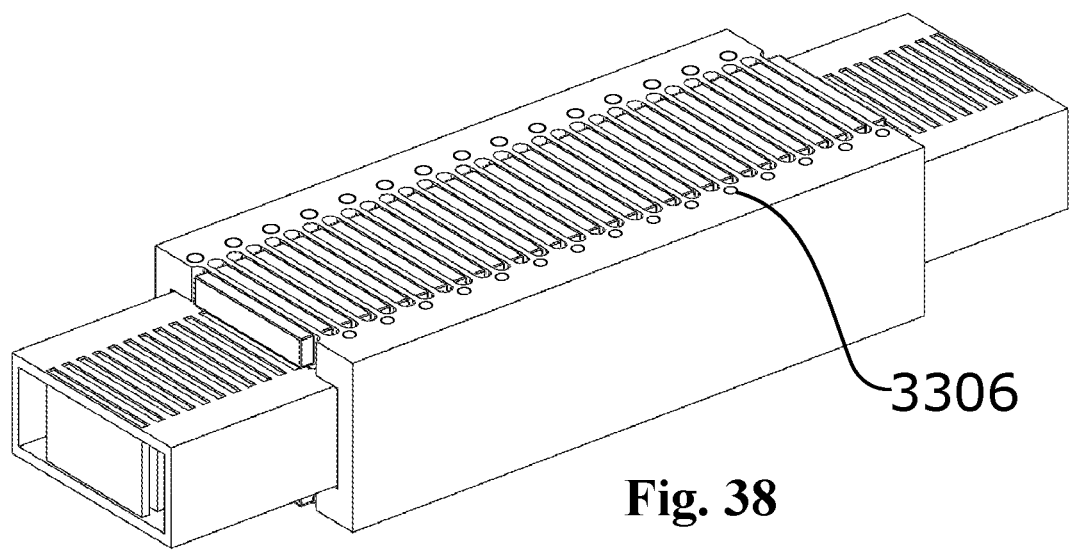
FIG. 38 is a simplified perspective view of a linear flux machine with an alternating pattern of flux restrictors.

FIG. 36 shows an embodiment of a rotor-stator-rotor configuration of a linear flux machine. The stator 3330 has an array of posts 3332. The rotor surrounds the stator and is made of one or more pieces of material, for example, a soft magnetic isotropic material. Receiving slots for the permanent magnets 3302 on the internal structure of the rotor 3300 act as rotor posts 3304, rotor back iron 3310 and rotor end iron 3314. Many constructions of a linear motor are contemplated herein. The side section of the rotor, for example, may be of a different material than the upper and lower rotor portions. FIG. 37 shows an embodiment of the rotor-stator-rotor configuration of a linear flux machine without a back iron 3310 on the rotor 3300 and having a number of flux restrictors 3306 adjacent to each of the permanent magnets 3302 on either side of the slots. FIG. 38 shows a rotor-stator-rotor configuration with an alternating pattern of flux restrictors 3306 that are adjacent to every second permanent magnet.

An embodiment of an electric machine will now be described the configuration of which may utilize the design elements disclosed in this patent document, for example the inner and outer bearing configuration.

Any of the disclosed structures may be used with an electric machine that has electromagnetic elements including posts and slots between the posts, where the posts are wound to create poles, at least on either of a stator or rotor, where the pole density is within a range of pole density defined by the equations specified in this patent document and the post height is within a range of post height defined by the equations specified in this patent document. These equations each define a bounded area. The bounded areas are dependent on the size of the electric machine, where the size is defined by the radius of the machine. The bounded areas together define a bounded surface in a space defined by pole density, post height and size of machine. This bounded region is disclosed in copending WO2017024409 published Feb. 16, 2017, and repeated here.

Based on modelling studies and FEMM analysis, it is believed that the following conclusions follow: at least beyond a specific pole density and for a specified conductor volume or post height for a given diameter of motor: 1) an electric machine having pole density and conductor volume or post height as disclosed has increased heat production (and thus lower efficiency) for a given torque or force as compared with an otherwise equivalent machine having lower pole density and/or higher conductor volume but has corresponding effective heat dissipation; and 2) the increased pole density and lower conductor volume or post height also has the effect of decreasing mass as compared with an otherwise equivalent machine having lower pole density and/or higher conductor volume, with an overall increased torque to mass ratio (torque density).

An electric machine with increased torque to mass ratio is particularly useful when several of the electric machines are spaced along an arm, such as a robotic arm, since efficiency is less important relative to the need for one electric machine to lift or accelerate one or more other electric machines. It is believed that improved performance of an electric machine having pole density and conductor volume or post height as disclosed results at least in part from 1) a narrower slot having a shorter heat flow path from the hottest conductor to a post and 2) a shorter heat flow path from the top of a post to a heat dissipation surface.

For example, each electric machine embodiment disclosed is shown as having a pole density and post height that is within the definition of pole density and post height that is believed to provide a benefit in terms of $K_R$.

With a pole density in the range of 0.5 and higher, for example, and considering that it is not unusual for a slot to be about as wide as a tooth, tooth width can be in the order of 1 mm for a 25 mm wide machine. Narrower teeth can be used. An advantage of thinner teeth is that solid materials such as, but not limited to steel or iron or a magnetic metal alloy, may can be used with minimal eddy currents due to the teeth being closer to the thickness of normal motor laminations. A common motor lamination for this size of motor can be in the range of 0.015" to 0.025". The proposed pole density and tooth geometry (many short posts) also helps avoid eddy currents in the first carrier (stator). For example, for an electric machine with 144 slots, eddy current loss was found to be only 7% of the total resistive losses in the windings at 200 rpm and 70 A/mm². Use of solid (non-laminated) materials may provide advantages in strength, stiffness and reliability.

Embodiments of the disclosed machines may use fractional windings. Some embodiments may use distributed windings; others may use concentrated windings. Distributed windings are heavier due to more copper in the end turns and lower power (requiring a bigger motor). They also require thicker backiron because the flux has to travel at least three posts, rather than to the next post as with a fractional winding. Distributed windings produce more heat because of the longer conductors (the result of longer distance the end turns have to connect between).

An embodiment of an electric machine with the proposed pole density may have any suitable number of posts. A minimum number of posts may be 100 posts. A high number of posts allows fewer windings per post. In a non-limiting exemplary embodiment, the windings on each posts are only one layer thick (measured circumferentially, outward from the post). This reduces the number of airgaps and/or potting compound gaps and/or wire insulation layers that heat from the conductors conduct through for the conductors to dissipate heat conductively to the stator posts. This has benefits for heat capacity (for momentary high current events) and for continuous operation cooling. When direct cooling of the coils by means of gas or liquid coolant in direct contact with the conductors, a low number of circumferential layers, and for example a single circumferential layer of wire on a post, combined with high pole density, results in a very high surface area of the conductors (relative to the volume of the conductors) exposed to the cooling fluid. This is beneficial for cooling the conductors and is one of many exemplary ways to take advantage of the low conductor volume as disclosed. A single row (or low number of rows) of coils per posts also reduces manufacturing complexity allowing for lower cost production. In another embodiment, the windings of each post are two layers thick.

For a 175 mm or more average airgap electric machine, the number of slots may be 60 or more, or 100 or more for an axial flux electric machine, for example 108 slots in an exemplary 175 mm diameter embodiment. In addition, for such an electric machine, the average radial length-to-circumferential width of the posts may be above 4:1, such as about 8:1 but may go to 10:1 and higher. For the exemplary 108 slot embodiment, the ratio is about 8:1. With such a configuration, the heat dissipation is improved. A lower aspect ratio would be a lot of material for very little torque, so the aspect ratio helps achieve torque useful for high $K_R$ and robotics while at the same time taking advantage of the heat dissipation effects.

In some embodiments there is a reduced rigidity requirement by coating the airgap with a low friction surface that maintains the airgap. In an embodiment of a linear motor a low friction surface is applied in the airgap which maintains a 0.008" airgap. Coatings, such as DLC (diamond-like coating), can be deposited at 0.0025" on both the rotor and the stator and the gap will be maintained.

Ranges of pole pitch (or density) and conductor volume have been found which give a significant benefit either in terms of $K_R$, or in terms of a weighting function combining torque, torque-to-weight, and Km (as described further). The amount of benefit in terms of the weighting function is dependent on the amount of cooling and other factors, but the equations define novel structures of electric machines that provide benefits as indicated. Equations are given which define bounded regions determined by the ranges of pole density and conductor volume which yield these benefits.

In an embodiment, advantages are obtained by operating within a region of a phase space defined by machine size, pole density and post height. A series of graphs shown in FIG. 39A to FIG. 39F, show torque density (z axis) v slot density (x axis) and post height (y axis) for an exemplary series of linear motor section geometries, created and analysed using FEMM software using an automated solver generated in OCTAVE™ (which is a program for solving numerical computations). Slot density was used in this example because it is the same as pole density.

The following rules and assumptions were applied to all of the motors in the series. Each section consisted of 144 electromagnets and 146 permanent magnets. The rotor comprised sections of NdFeB 52 magnets and M-19 silicon steel. Every permanent magnet was placed tangentially to the rotor and oriented so that its magnetic field direction was aligned tangentially to the rotor and are opposite to its adjacent permanent magnets. M-19 silicon steel sections were placed between permanent magnets. The stator was made from M-19 silicon steel. The electromagnets used concentrated winding coils in a 3-phase configuration. A 75% fill factor of the coils was assumed, consisting of 75% of the slot area. The two variables that were investigated were the post height and slot density. The remainder of the geometry variables were scaled according to the following relationships: 1.25 inches constant model thickness across all simulations, Rotor permanent magnet width is set at 50% of permanent magnet pitch, Rotor permanent magnet height is set at 2.3 times of permanent magnet width, Stator slot width is 50% of stator electromagnet pitch (equal width of posts and slots), Stator back iron height is set at 50% of stator post width, Airgap axial height of 0.005 inches.

The bounded region which represents the unique geometry disclosed is modeled for the preferred embodiment, namely the embodiment which will yield the highest torque-to-weight and KR. Certain design choices have been made in this embodiment such as the selection of grade N52 NdFeB magnets in the rotor, a rotor pole to stator post ratio of 146:144, and a flux concentrating rotor with back iron. It is believed that this configuration may provide one of the highest practical torque-to-weight configurations for sizes of actuators in the disclosed diameters while still retaining a reasonable level of manufacturability and structural stability. Many other configurations are possible such as different rotor types (surface permanent magnet, buried permanent magnet, etc), different magnet materials and grades including but not limited to ceramic, samarium cobalt, and high-temperature NdFeB, different rotor pole to stator post ratios, different stator winding configurations, different stator materials, etc. In many cases, different design choices for these parameters will not have as great a KR benefit as compared to the preferred embodiment by either resulting in reduced torque or increased weight for the same pole pitch and post height as the preferred embodiment. However, for the majority of designs, there is a benefit to KR by using the pole pitch and post height of inside the disclosed region over geometry outside the disclosed region when all other design variables and geometrical relationships are held constant. This principle holds true for both concentrated and distributed winding designs, for linear motors, axial flux rotary motors, radial flux rotary motors, trapezoidal/toroidal rotary motors, and transverse flux linear and rotary motors.

For each of those motor section geometries, magnetic simulation and heat simulation were performed. For every magnetic simulation, the program yielded values for mass, horizontal force, and power consumption. Geometrical extrapolations of the coil cross sections were used to find the mass and power consumption of the end windings in order to more accurately predict the mass and power consumption of the entire system. For calculating stall torque and torque at low speed, the square root of resistive losses is the dominant part of the power consumption, with a multiplier based on the slot geometry to account for the resistive losses of the end windings. These values were used to calculate the mass force density (force per unit mass) and the area-normalized force (force per unit area of the airgap) of each simulation. For every heat simulation, the program yielded values for coil temperature, rotor temperature and stator temperature. A set cooling rate was applied to the stator inner surface using water as the coolant and a convection coefficient of 700 W/m$^2$K. The temperature of the water was set at 15° C. and it had a flow rate between 6-20 mm/s. Steady state conditions were assumed.

For constant current density simulations, a fixed current density was applied to the conductor and the resulting force, mass, power consumption, and maximum stator temperature were calculated by the program.

For constant temperature, force per area, or force density simulations, the current density was adjusted at each geometry point until the parameter of interest reached the target value, and the other parameters were recorded at that point. The target error for constant temperature, force per area, and force density simulations are 1 degrees, 0.002 N/mm$^2$, and 1 N/kg respectively. This data can be directly applied to any size of rotary motor by multiplying the area-normalized force by the circumferential area of the airgap in the rotary motor, and multiplying the force by the diameter to yield the resulting torque. There will be some small deviations due to the radius of curvature of the motor, and the errors associated with approximating a curved structure with a linear one, however our simulations have shown the rotary simulated torque typically to be within 10% of that predicted by the linear model.

High torque-to-weight is of benefit in some applications, but a minimum level of torque may be necessary for applications such as robotics where the arm, no matter how light it may be as a result of high torque-to-weight actuators, must still have enough torque to lift and move a payload. Electric machines having a pole density and conductor volume within the ranges disclosed in this patent document provide high torque and torque-to-weight at acceptable power consumption levels.

Figure 39A:
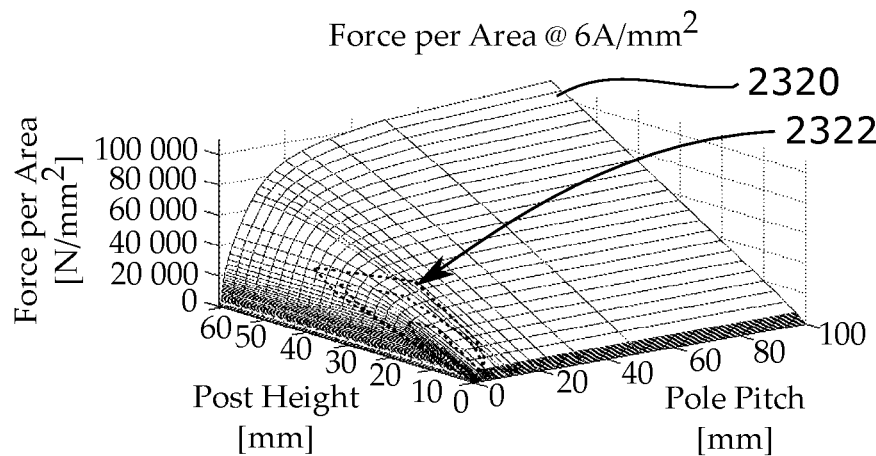
FIG. 39A shows a graph of torque at constant current density for a simulated series of machines differing in slot pitch and post height.

The force per area at a constant current density 2320 is plotted in FIG. 39A as a function of slot pitch and post height. The same current applied to all motors in the virtual series results in dramatically lower force per area in the disclosed ranges 2322 (indicated schematically by the dashed lines). The dashed lines correspond to the middle boundary from each size (25 mm, 50 m, 100 mm and 200 mm as discussed in relation to the equations below) projected onto the 3D surface. The middle boundaries correspond to the sets of equations A2, B2, C2 and D2. In this graph, the force per area at constant current density 2320 is shown for a series of motors that were analyzed in FEMM using a script in OCTAVE to find the highest torque rotary position for a given 3 phase input power. These motors are identical in every way apart from the conductor volume and slot density, which are varied as shown.

Figure 39B:
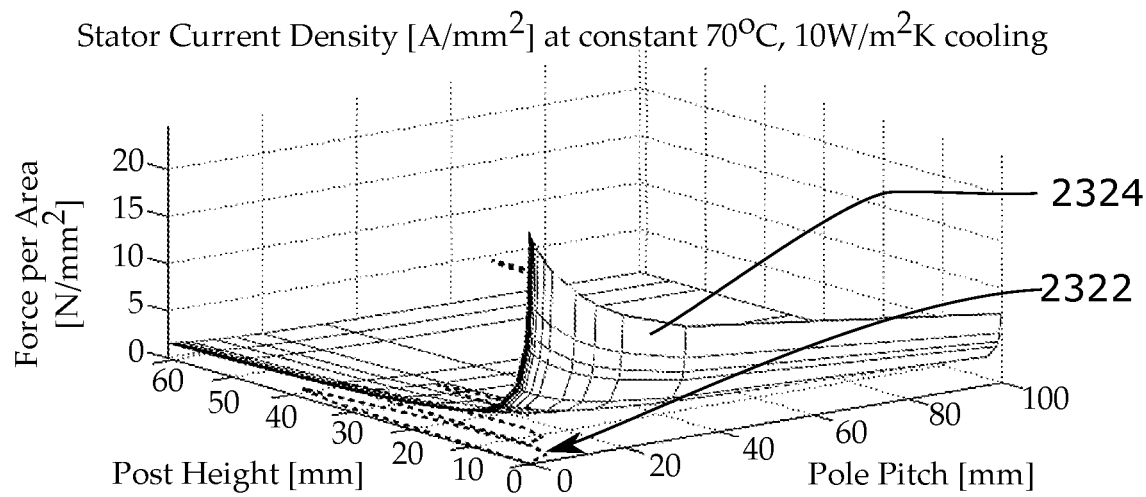
FIG. 39B shows the highest stator current density possible at a given temperature for a simulated series of machines differing in slot pitch and post height.

The highest current density possible at a given temperature 2324 is plotted in FIG. 39B as a function of slot pitch and post height. The exponentially higher heat dissipation characteristic in the disclosed ranges 2322 allows much higher current density at a given temperature. Low conductor volume tends to reduce the actuator weight, but low conductor volume also tends to reduce the actuator torque. When the conductor volume and slot density is in the disclosed ranges, however, there is a dramatic reduction in the heat flow resistance from the conductors to the back of the stator or to any other surface where cooling can be applied, thus allowing very high current densities to be applied to the conductors without overheating the actuator.

In FIG. 39B, the same series of motors is used as in FIG. 39A, but instead of constant current density applied to each motor, the current density was varied until the steady state temperature of the conductors was ~70° C. A reasonable representation of a typical water cooling effect was applied to the outer axial surface of the stators at a convection coefficient of 700 W/m$^2$K. The temperature of the water was set at 15° C. Ambient temperature was set at 15° C. No air convective cooling was applied to the rotor for simplicity because the water cooled surface was highly dominant in terms of cooling and because the rotor was not producing heat of its own. Steady state conditions were assumed. For each point on the 3D graph, the current density of the motor was increased from zero until the temperature of the coils reached ~70 deg C.

Figure 39C:
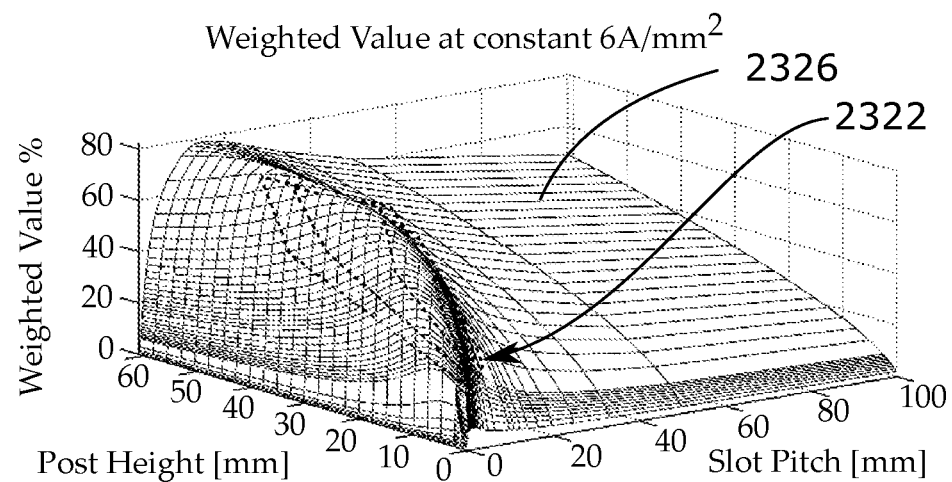
FIG. 39C shows constant temperature torque as a function of slot pitch and post height for a series of electric machines.
Figure 39D:
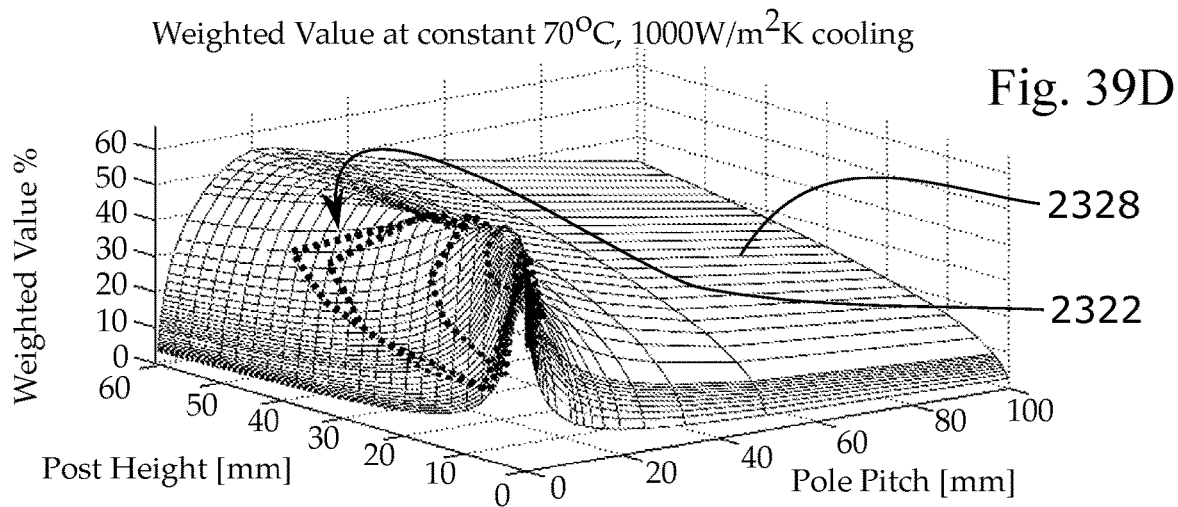
FIG. 39D shows the value of a weighting function for at the highest stator current density possible at a given temperature for a simulated series of motors differing in slot pitch and post height.
Figure 39E:
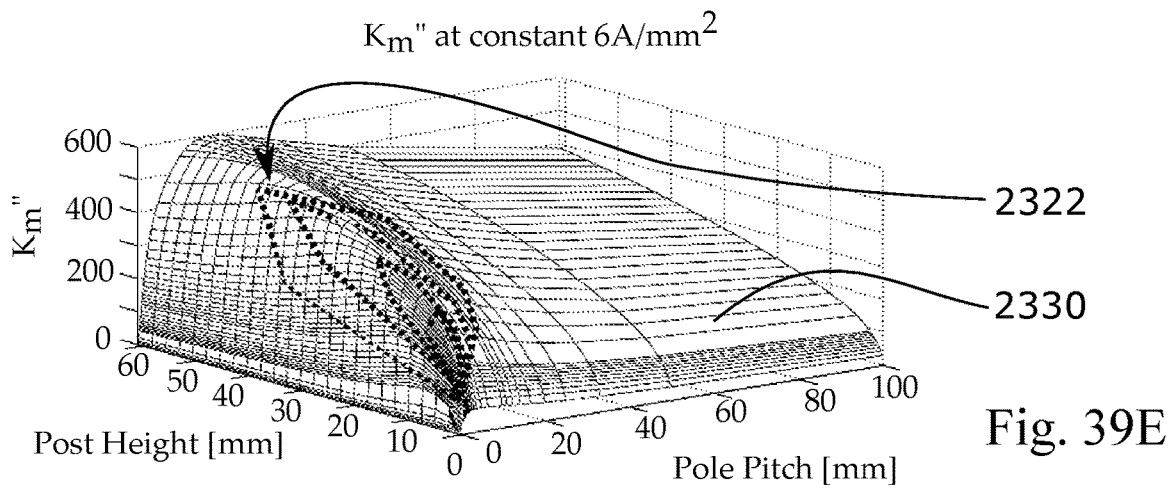
FIG. 39E shows Km" for a simulated series of motors differing in slot pitch and post height, for a fixed current density.

FIG. 39C is the same as FIG. 39D except that it has constant current at 6 A/mm2 as apposed to constant temperature of 70 deg C. Thus demonstrating how the heat dissipation benefit of short posts give unexpected benefit disclosed range, FIG. 39C was developed using the following weighting convention, Torque—weighting of 1, Torque-to-weight—weighting of 3, Power consumption—weighting of 2. Torque-to-weight was the most highly weighted because the weight of the arm is determined by the weight of the actuator and because the weight of the arm will typically be significantly higher than the weight of the payload. Torque was weighted at 1 to include it as an important consideration but recognizing that the payload may be quite a bit lower than the weight of the arm. Power consumption was given a moderate weighting because it is an important consideration, but power consumption is known to benefit from lower arm weight, as is accomplished by a higher weighting on torque-to-weight, so a higher weighting on power consumption was deemed to be potentially counter-productive.

By applying a constant current density to the series of motors, and combining the results with the above weighting, the surface 2328 in FIG. 39D shows a trend toward lower overall performance toward and continuing through the disclosed ranges 2322 of slot (or pole) density and conductor volume. FIG. 39D shows a benefit in the disclosed range when the constant temperature current density is applied from FIG. 39B.

An industry standard metric for motor capability is the KM which is basically torque-to-power consumption. KM assumes sufficient cooling for a given electrical power. It only considers the amount of power required to produce a certain level of torque. The $K''_m$ surface 2330 as a function of slot pitch and post height is plotted in FIG. 39E.

Figure 39F:
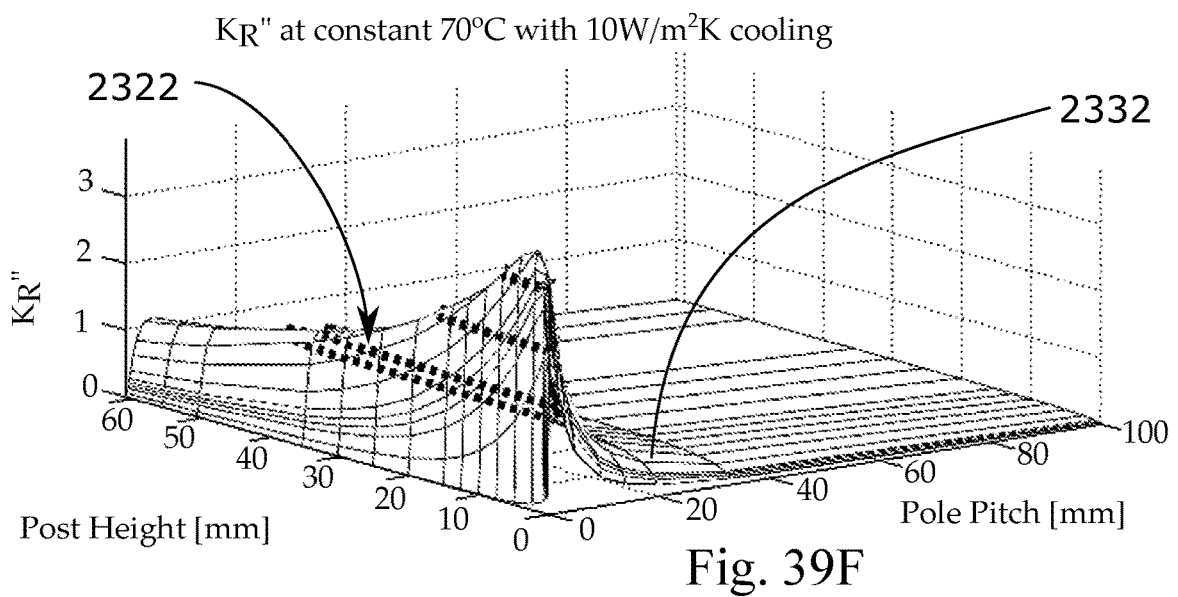
FIG. 39F shows KR" for a simulated series of motors differing in slot pitch and post height, for a fixed current density.

The torque to weight to power consumption shows the most unexpected and dramatic benefit in the disclosed ranges 2322 as seen from the graph of the $K''_R$ surface 2332 as a function of slot pitch and post height in FIG. 39F. High $K_R$ may not be of great benefit in stationary applications, but in applications such as robotics, $K_R$ indicates that power consumption benefits can be achieved by reducing the weight of the entire system.

A method of producing a graph showing how $K''_R$ varies with pole density and post height is as follows. Consider a motor section with geometry A having low conductor volume (low post height) and low pole density. The motor section with geometry A is simulated; a set cooling rate is applied to the stator inner surface using water as the coolant and a convection coefficient of 700 W/m²K. The temperature of the water is set at 15° C. and it has a flow rate between 6-20 mm/s. Steady state conditions are assumed. The current passing through the conductor of geometry A is then increased until the maximum temperature of the conductors reaches 70° C. The torque density of geometry A at this point is then recorded and plotted in the graph for the corresponding values of post height and pole density. The process is repeated for other geometries, obtained, by example, through varying the post height and pole density and scaling the remaining parameters as described above. For instance, a geometry B may be is obtained from geometry A by increasing the post height, with all other parameters scaled as described above. A geometry C may have the same post height as geometry A but greater pole density. A geometry D may have increased post height and increased pole density as compared to geometry A. Plotting the torque densities results in a surface in a graph.

It is found that the torque density increases as pole density increases and post height decreases. No such increase in torque density is shown to occur with geometries having either a low post height or a high pole density; the benefit in torque density is only observed for geometries combining these two factors. Yet, in this region, efficiency is decreasing. While the graph was produced based on the assumptions indicated, it is believed that, based on the disclosed cooling effect and reduction of flux losses of increasing pole density and decreasing conductor volume or post height, that the same geometry will have a benefit at other values of the parameters that were used in the simulations. Changes in motor design elements which do not affect post height or pole density are not expected to result in a loss of the benefits. For instance, an electric machine comprising a rotor with tangentially oriented permanent magnets and an analogous electric machine comprising a rotor with surface-mounted permanent magnets may possess somewhat different $K''_R$ surfaces; nonetheless, the principles described above will still apply and a benefit would still be predicted within the region of geometries of low post height and high pole density described previously. As currently understood, the principles apply only to electric machines with posts, such as axial flux and radial flux machines.

In the disclosed equations and graphs, the parameter $K''_R$ is size-independent and has been converted from a conventional $K_R$ to use force instead of torque, and to be independent of both circumferential length and axial length. Therefore, the conventional $K_R$ of any size motor can be found from the $K''_R$ value. And for two motors of identical size (diameter at the airgap and axial length) but different geometry (i.e. pole density and/or post height), the multiplying factor will be the same, so the motor with higher $K_R$ will have a higher conventional $K_R$.

$K''_R$ as a function of pole density and post height greatly resembles the surface of a graph showing conventional KR. However, this particular surface, corresponding to the torque density, may change considerably when different temperatures are used as the constraint in the analysis. $K''_R$, by contrast, does not change substantially (provided the current doesn't get sufficiently high for the motors in the series start to saturate; then the 3D curve shape will change.) It is the $K''_R$, therefore, that is used to define the specific range of pole density and post height which result in the previously-discussed benefits.

The ranges of benefit disclosed depend on the resultant motor diameter at the airgap. Smaller motors are more constrained because the physical size of the motor prevents lower slot densities from being used. We have defined 4 discrete motor diameter ranges corresponding to 200 mm and above, 100 mm and above, 50 mm and above, and 25 mm and above. For each diameter range, we describe three levels of $K''_R$. The first corresponds to where a small benefit to $K''_R$ begins, the second to a moderate $K''_R$ benefit, and the third to a high $K''_R$ benefit for that specific diameter range. Higher $K''_R$ values generally correspond to lower overall torque values for that motor size range.

These motor sizes disclosed (25 mm and up to 200 mm diameter and above) represent small to large motors. The airgap of 0.005 inches used in the simulation is believed to be the smallest reasonable airgap size for this range of motors. Smaller airgaps are not practical for this motor range due to manufacturing tolerances, bearing precision, component deflection, and thermal expansion.

The coefficients in the equations above were chosen in a manner to bound the region of interest and make the resulting relation nearly continuous.

A 50:50 ratio of post:slot width was chosen for these simulations, as analysis had shown that highest benefits are obtained when the ratio is between 40:60 and 60:40. A 50:50 ratio represents a typical best-case scenario; at fixed post height, using a 10:90 slot:post width ratio will have a significantly degraded performance by comparison. Analysis shows that at constant post height, an embodiment exhibits the maximum of torque and torque density at a 50% slot width, and the maximum of Km and Kr at 40% slot width. However, the maximum values of Km and Kr are within 5% of the values given at a 50:50 geometry; consequently a 50:50 ratio was viewed as a reasonable choice of scaling parameter for the simulations. Other ratios of post: slot width would give a portion of the benefits disclosed.

Equations and graphs are discussed below which show the ranges of pole density and conductor volume which give a significant benefit either in terms of KR, or in terms of a weighting function combining torque, torque-to-weight, and Km, for different embodiments. As with the previously-described equations, the region of benefit in terms of the weighting function is dependent on the amount of cooling.

Size of an electric machine means the airgap diameter of an axial flux machine or radial flux machine as defined herein or the length in the direction of translation of the carriers of a linear machine.

The first bounded region corresponds to regions where a significant $K_R$ benefit is found with respect to the rest of the geometries in the domain. For a given device size, $K_R$ has a higher value in the disclosed range of geometry than anywhere outside of the range, indicating potential benefits to overall system efficiency for certain applications using devices of these geometries. The graph of $K''_R$ is used to define the boundary by placing a horizontal plane through at a specified $K''_R$ value. Four values of $K''_R$ are used to define areas of benefit for four different actuator size ranges corresponding to sizes of 200 mm and larger, 100 mm and larger, 50 mm and larger, and 25 mm and larger.

In the following tables, pole pitch is represented by the variable S, in mm. Post height is also represented in millimetres.

Figure 49:
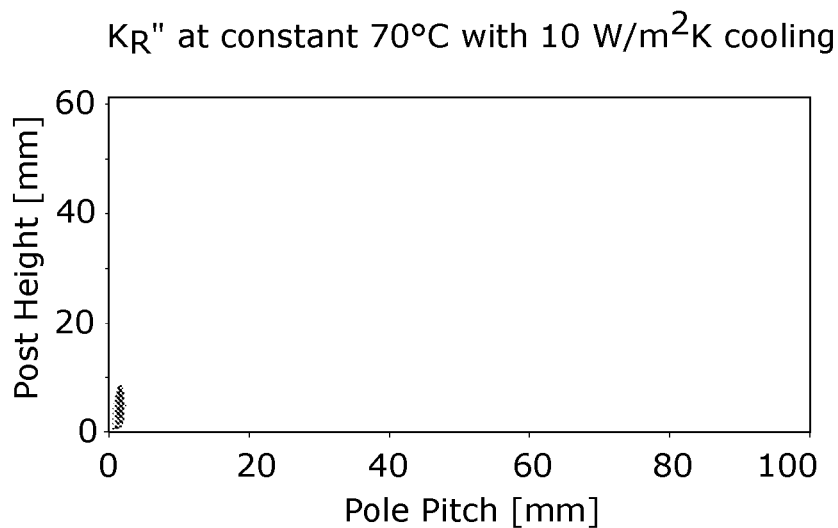
FIG. 49 shows the region of benefit for KR", with respect to the rest of the geometries in the domain, for a machine with 25 mm size and a boundary line for KR">3.3.

In a machine with 25 mm size, the boundary line for $K''_R>3.3$ is defined by the values shown in Table 1 and the corresponding graph is FIG. 49.

TABLE 1

Set A1

| Post Height > | | | Points Pole Pitch | Post Height |
|---|---|---|---|---|
| −1.070*S + 2.002 | for | 0.572 < S < 1.189 | 0.572 | 1.390 |
| 1.175*S + −0.667 | for | 1.189 < S < 2.269 | 1.189 | 0.730 |
| 13.502*S − 28.637 | for | 2.269 < S < 2.500 | 2.269 | 1.999 |
| Post Height < | | | 2.500 | 5.118 |
| −5.898*S + 19.863 | for | 1.970 < S < 2.500 | 1.970 | 8.244 |
| 0.229*S + 7.794 | for | 1.349 < S < 1.970 | 1.349 | 8.102 |
| 7.607*S − 2.160 | for | 0.723 < S < 1.349 | 0.723 | 3.340 |
| 11.430*S − 4.924 | for | 0.572 < S < 0.723 | 0.572 | 1.614 |
| | | | 0.572 | 1.390 |

Figure 50:
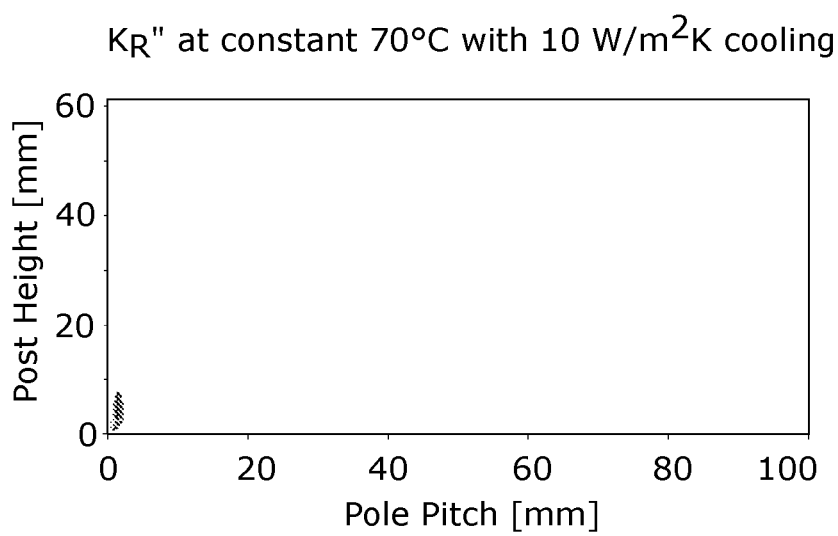
FIG. 50 shows the region of benefit for KR", with respect to the rest of the geometries in the domain, for a machine with 25 mm size and a boundary line for KR">3.4.

In a machine with 25 mm size, the boundary line for $K''_R>3.4$ is defined by the values shown in Table 2 and the corresponding graph is FIG. 50.

TABLE 2

Set A2

| Post Height > | | | Points Pole Pitch | Post Height |
|---|---|---|---|---|
| −1.340*S + 2.305 | for | 0.619 < S < 1.120 | 0.619 | 1.475 |
| 1.100*S − 0.429 | for | 1.120 < S < 2.074 | 1.120 | 0.803 |
| 3.830*S − 6.082 | for | 2.074 < S < 2.269 | 2.074 | 1.852 |

TABLE 2-continued

Set A2

| Post Height > | | | Points Pole Pitch | Post Height |
|---|---|---|---|---|
| Post Height < | | | 2.269 | 2.598 |
| −69.510*S + 160.318 | for | 2.222 < S < 2.269 | 2.222 | 5.865 |
| −3.430*S + 13.492 | for | 1.667 < S < 2.222 | 1.667 | 7.770 |
| 2.830*S + 3.056 | for | 1.133 < S < 1.667 | 1.133 | 6.260 |
| 8.650*S − 3.545 | for | 0.619 < S < 1.133 | 0.619 | 1.812 |
| | | | 0.619 | 1.475 |

Figure 51:
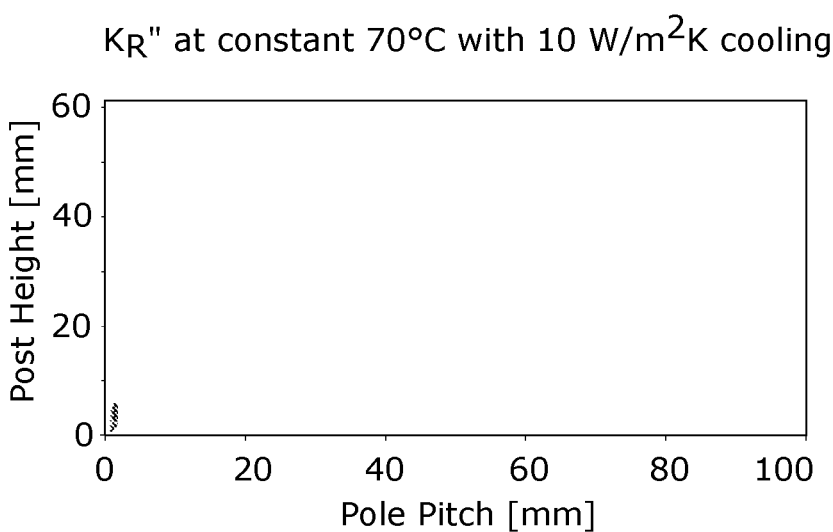
FIG. 51 shows the region of benefit for KR", with respect to the rest of the geometries in the domain, for a machine with 25 mm size and a boundary line for KR">3.6.
Figure 52:
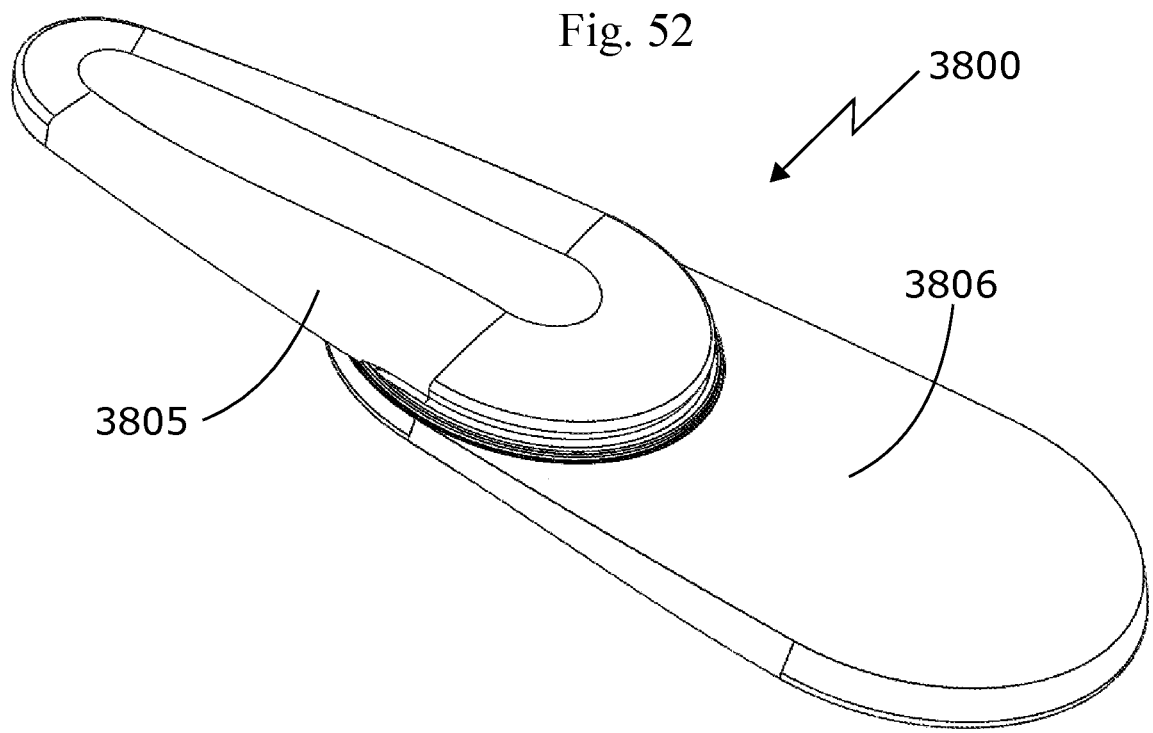
FIG. 52 shows the joint of a robot arm using a frameless motor/actuator.
Figure 53:
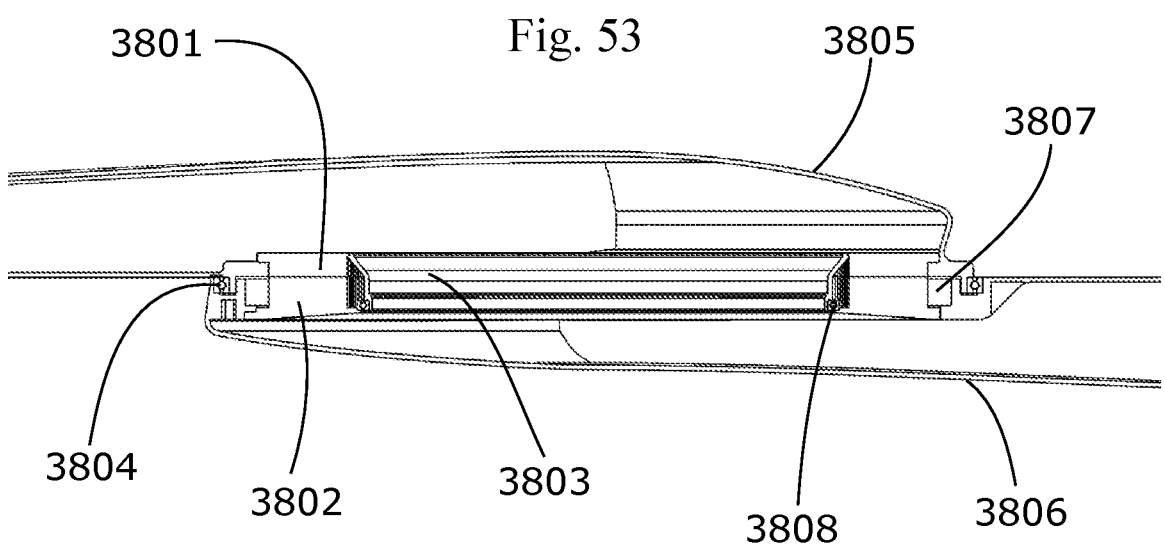
FIG. 53 displays a cross-sectional view of the frameless motor/actuator and robot arm.
Figure 54:
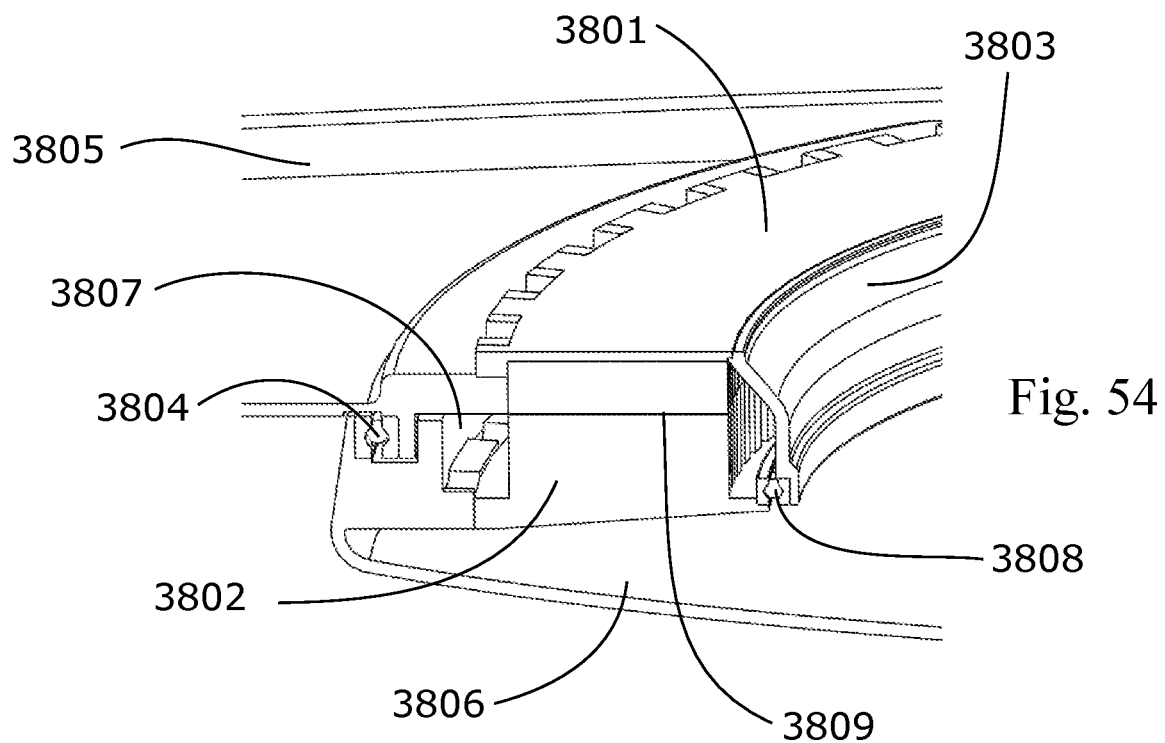
FIG. 54 shows a close up of the section view of the frameless motor/actuator stator, rotor and housing assembly.
Figure 55:
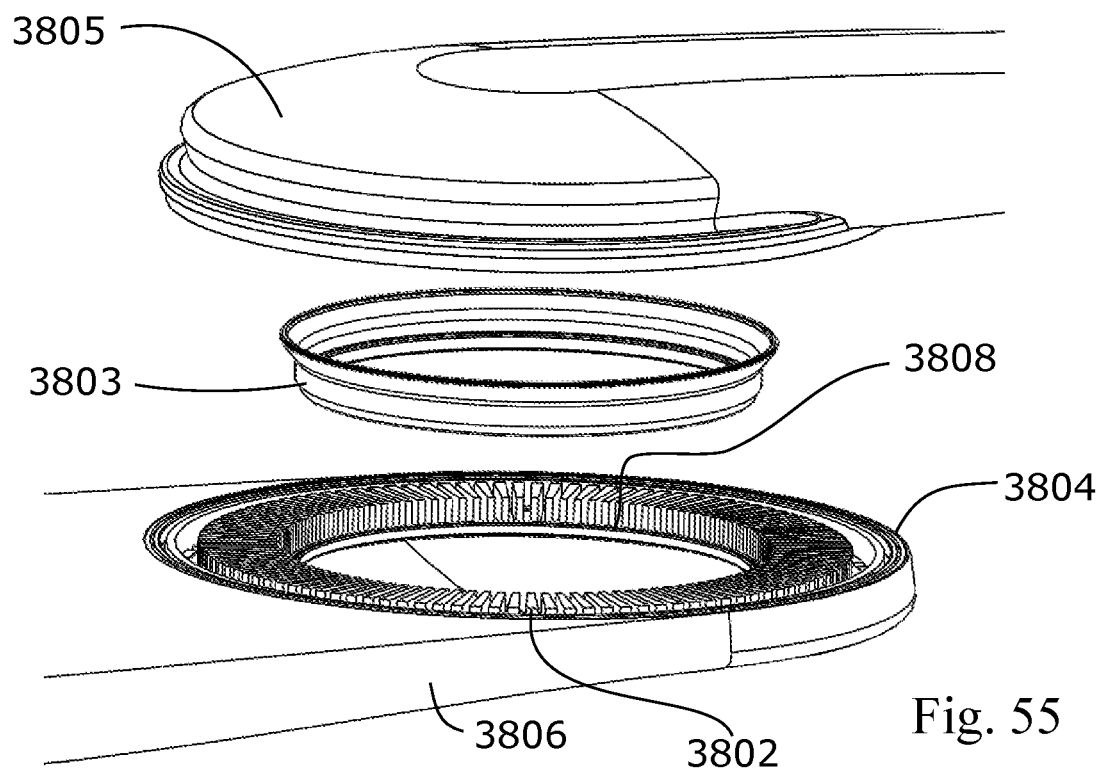
FIG. 55 shows an exploded view of the frameless motor/actuator robot arm assembly.
Figure 56:
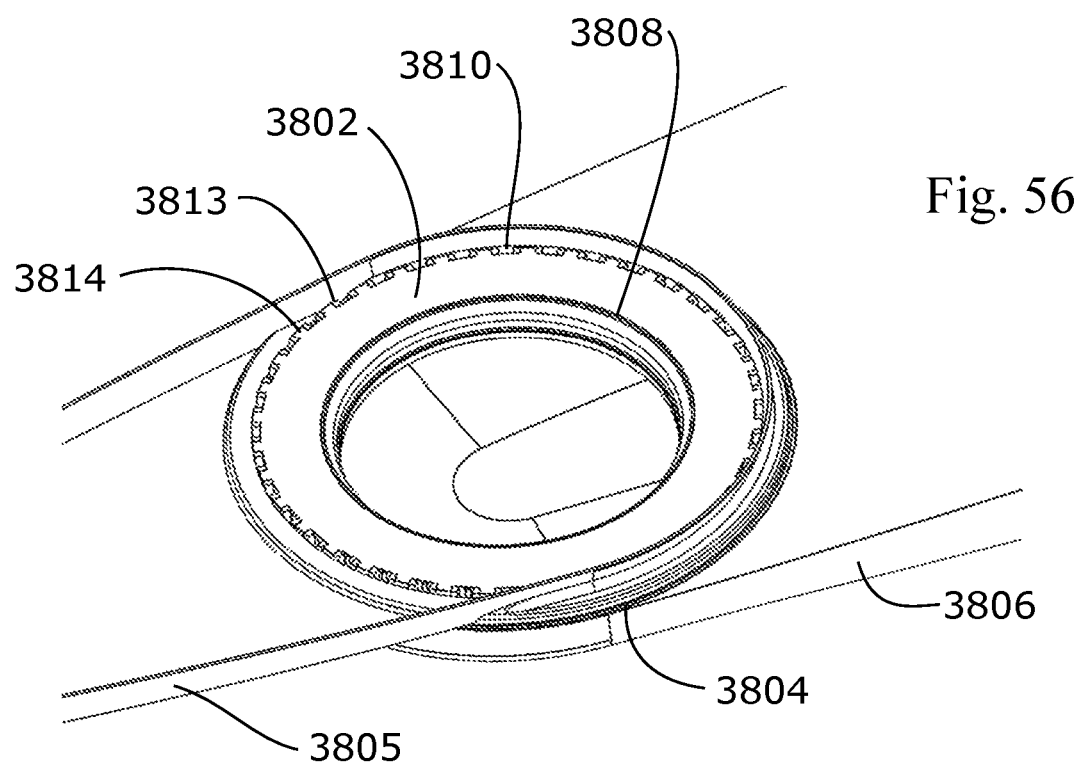
FIG. 56 displays a section view through the housing to view the stator and tab features on the rotor.
Figure 57:
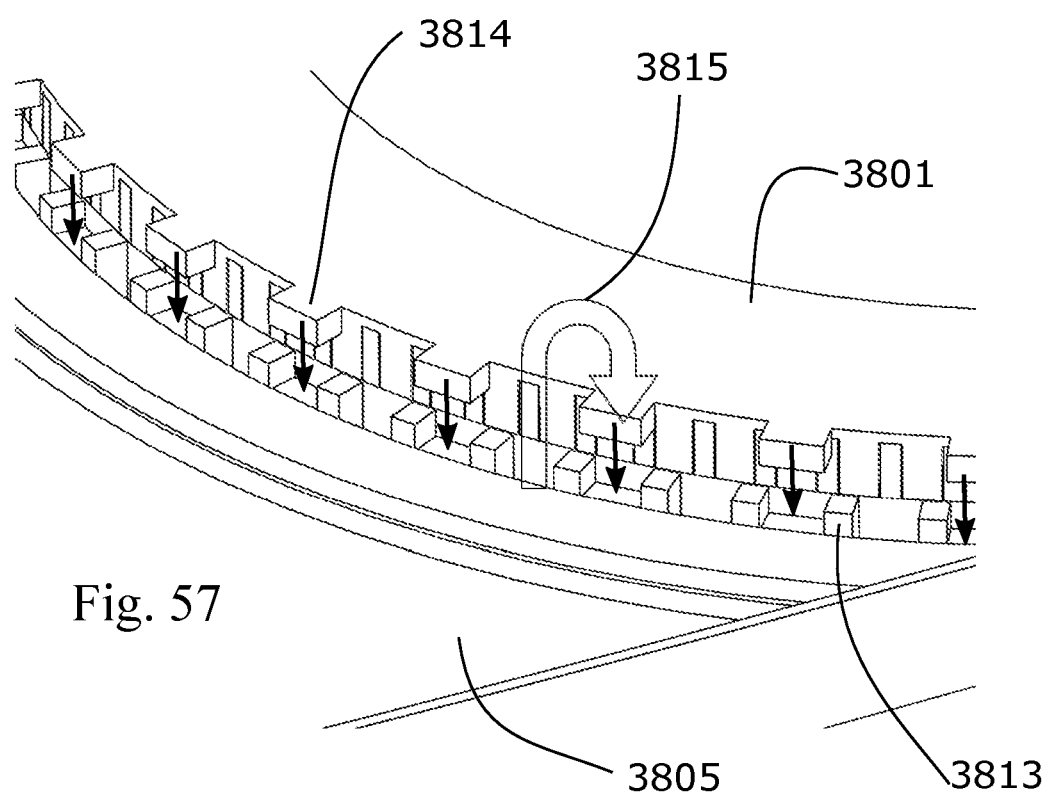
FIG. 57 shows a representation of an up, over and down assembly motion used with the tab features in FIG. 56 to secure the rotor.
Figure 58:
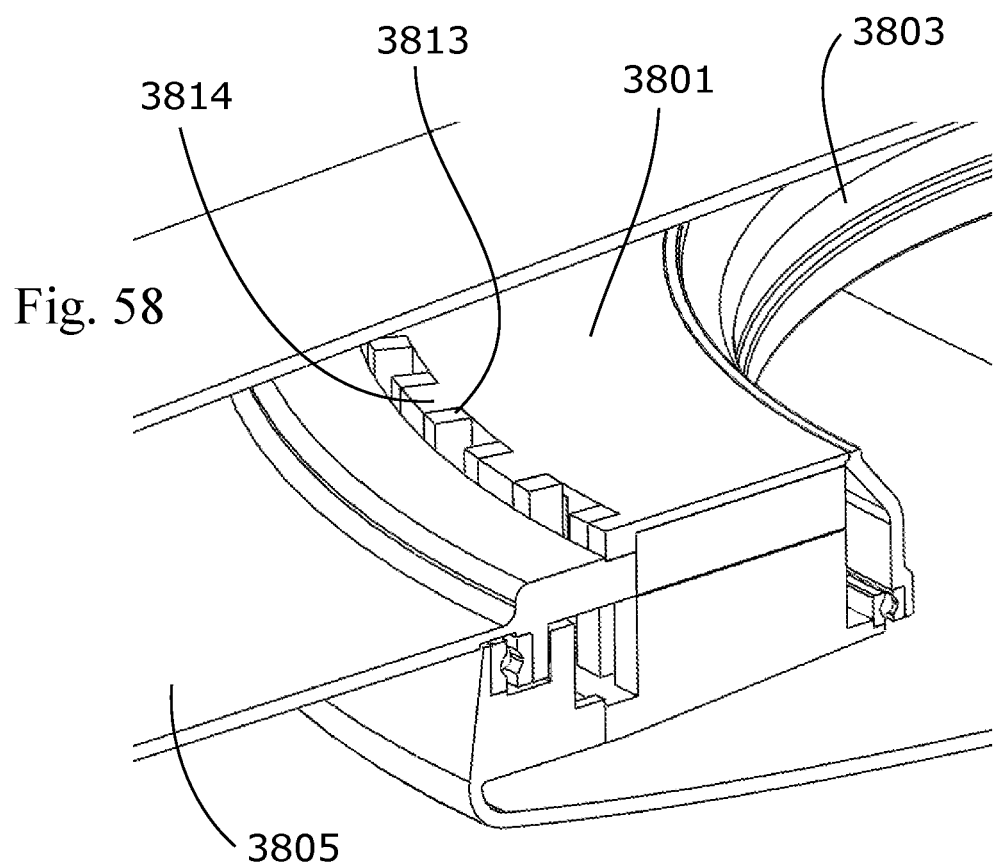
FIG. 58 shows a close up of the section view displaying the tab feature used to secure the rotor.
Figure 59:
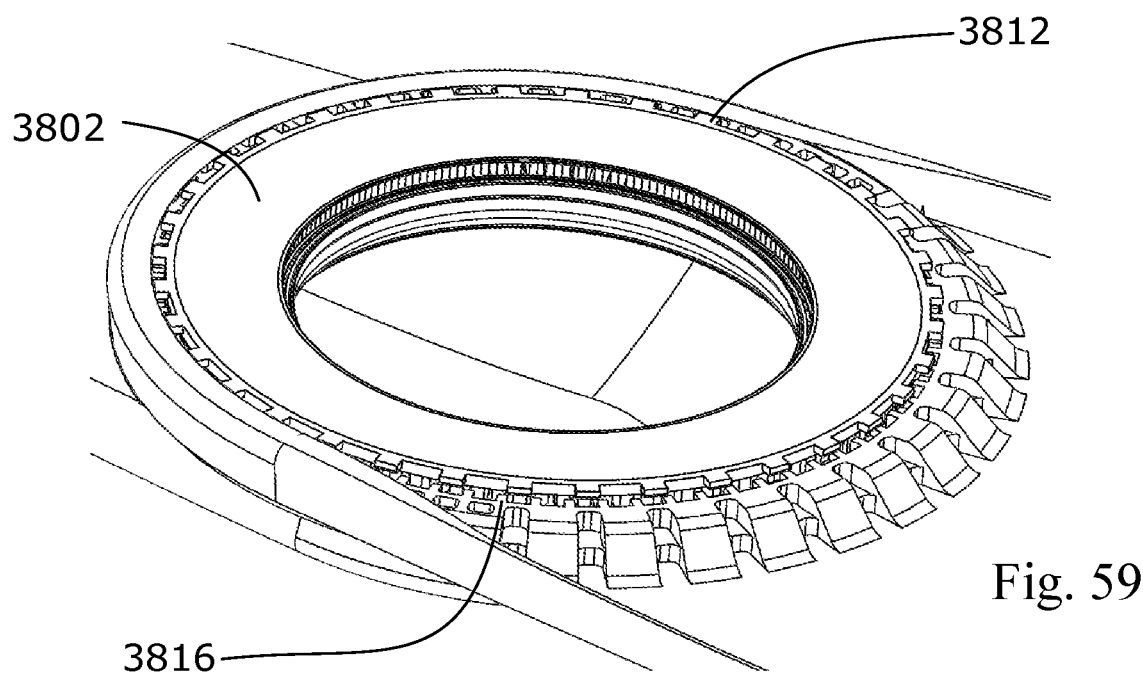
FIG. 59 shows a section view through the housing to display the tab features used on the stator to secure the stator.

In a machine with 25 mm size, the boundary line for $K''_R>3.6$ is defined by the values shown in Table 3 and the corresponding graph is FIG. 51.

TABLE 3

Set A3

| Post Height > | | | Points Pole Pitch | Post Height |
|---|---|---|---|---|
| −4.160*S + 5.032 | for | 0.723 < S < 0.967 | 0.723 | 2.024 |
| 0.839*S + 0.198 | for | 0.967 < S < 1.692 | 0.967 | 1.009 |
| 2.713*S − 2.973 | for | 1.692 < S < 1.939 | 1.692 | 1.617 |
| Post Height < | | | 1.939 | 2.287 |
| −53.233*S + 105.506 | for | 1.879 < S < 1.939 | 1.879 | 5.481 |
| −1.406*S + 8.122 | for | 1.465 < S < 1.879 | 1.465 | 6.063 |
| 3.898*S + 0.353 | for | 1.035 < S < 1.465 | 1.035 | 4.387 |
| 7.535*S − 3.412 | for | 0.723 < S < 1.035 | 0.723 | 2.036 |
| | | | 0.723 | 2.024 |

Figure 46:
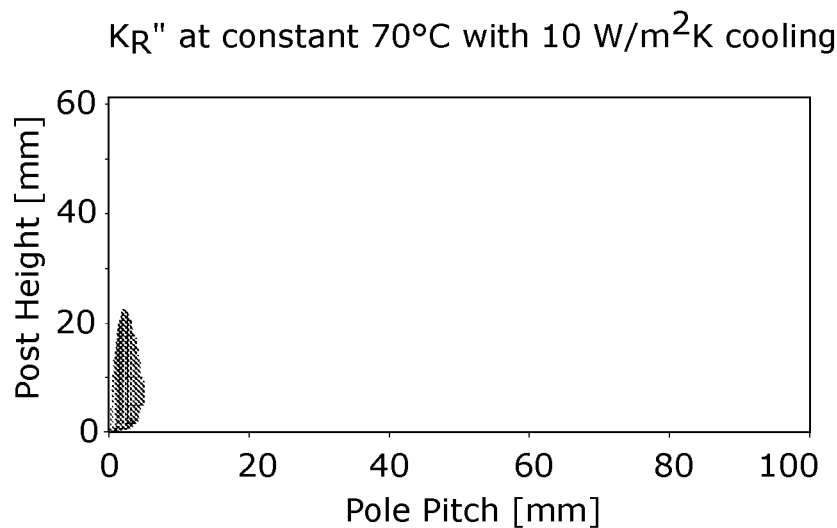
FIG. 46 shows the region of benefit for KR", with respect to the rest of the geometries in the domain, for a machine with 50 mm size and a boundary line for KR">2.2.

In a machine with 50 mm size, the boundary line for $K''_R>2.2$ is defined by the values in Table 4 and the corresponding graph is FIG. 46.

TABLE 4

Set B1

| Post Height > | | | Points Pole Pitch | Post Height |
|---|---|---|---|---|
| 0.254*S + 0.462 | for | 0.319 < S < 3.667 | 0.319 | 0.543 |
| 2.665*S + −8.380 | for | 3.667 < S < 5.000 | 3.667 | 1.394 |
| | | | 5.000 | 4.947 |
| Post Height < | | | 4.500 | 14.088 |
| −18.282*S + 96.357 | for | 4.500 < S < 5.000 | 2.738 | 22.304 |
| −4.663*S + 35.071 | for | 2.738 < S < 4.500 | 1.447 | 18.967 |
| 2.585*S + 15.227 | for | 1.447 < S < 2.738 | 0.319 | 0.904 |
| 16.013*S − 4.204 | for | 0.319 < S < 1.447 | 0.319 | 0.543 |

Figure 47:
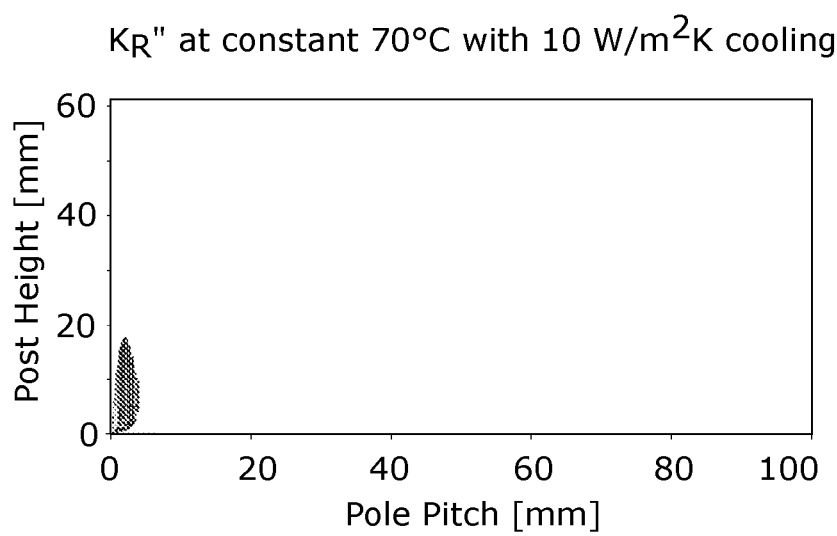
FIG. 47 shows the region of benefit for KR", with respect to the rest of the geometries in the domain, for a machine with 50 mm size and a boundary line for KR">2.5.

In a machine with 50 mm size, the boundary line for $K''_R>2.5$ is defined by the values in Table 5, and the corresponding graph is FIG. 47.

TABLE 5

Set B2

| Post Height > | | | Points Pole Pitch | Post Height |
|---|---|---|---|---|
| 0.269*S + 0.456 | for | 0.380 < S < 3.016 | 0.380 | 0.558 |
| 3.051*S − 7.936 | for | 3.016 < S < 4.167 | 3.016 | 1.267 |
| Post Height < | | | 4.167 | 4.779 |
| −14.766*S + 66.309 | for | 3.667 < S < 4.167 | 3.667 | 12.162 |
| −3.952*S + 26.654 | for | 2.315 < S < 3.667 | 2.315 | 17.505 |
| 3.108*S + 10.310 | for | 1.278 < S < 2.315 | 1.278 | 14.282 |
| 14.542*S − 4.303 | for | 0.389 < S < 1.278 | 0.389 | 1.354 |
| 88.444*S − 33.051 | for | 0.380 < S < 0.389 | 0.380 | 0.558 |

Figure 48:
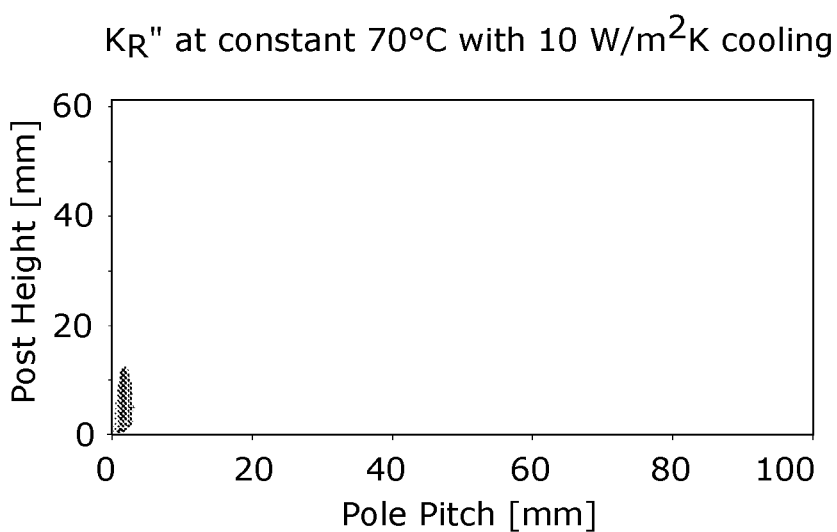
FIG. 48 shows the region of benefit for KR", with respect to the rest of the geometries in the domain, for a machine with 50 mm size and a boundary line for KR">2.9.

In a machine with 50 mm size, the boundary line for $K''_R > 2.9$ is defined by the values in Table 6, and the corresponding graph is FIG. 48.

TABLE 6

Set B3

| Post Height > | | | Points Pole Pitch | Post Height |
|---|---|---|---|---|
| 0.191*S + 0.626 | for | 0.472 < S < 2.181 | 0.472 | 0.716 |
| 2.135*S − 3.613 | for | 2.181 < S < 3.095 | 2.181 | 1.043 |
| 53.475*S − 162.511 | for | 3.095 < S < 3.175 | 3.095 | 2.994 |
| Post Height < | | | 3.175 | 7.272 |
| −5.095*S + 23.450 | for | 2.222 < S < 3.175 | 2.222 | 12.128 |
| 0.805*S + 10.339 | for | 1.381 < S < 2.222 | 1.381 | 11.451 |
| 10.251*S − 2.706 | for | 0.572 < S < 1.381 | 0.572 | 3.158 |
| 24.420*S − 10.810 | for | 0.472 < S < 0.572 | 0.472 | 0.716 |

Figure 43:
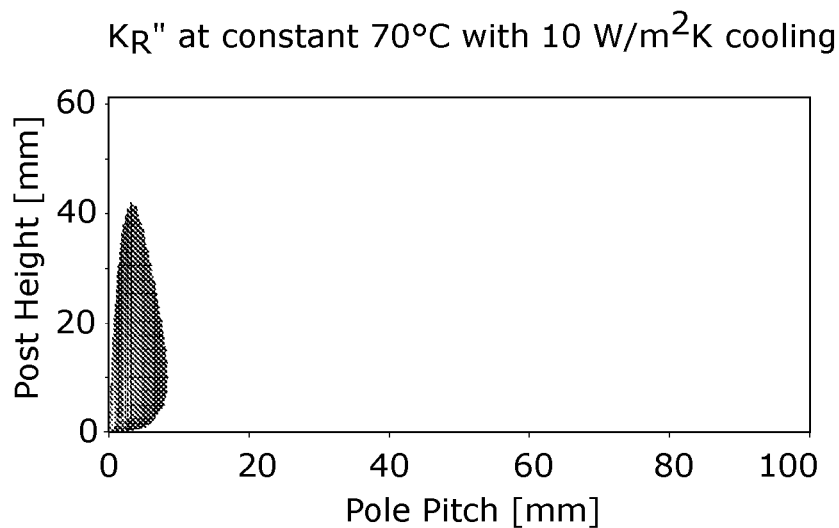
FIG. 43 shows the region of benefit for KR", with respect to the rest of the geometries in the domain, for a machine with 100 mm size and a boundary line for KR">1.5.

In a machine with 100 mm size, the boundary line for $K''_R > 1.5$ is defined by the values in Table 7, and the corresponding graph is FIG. 43.

TABLE 7

Set C1

| Post Height > | | | Points Pole Pitch | Post Height |
|---|---|---|---|---|
| 0.322*S + 0.359 | for | 0.233 < S < 6.667 | 0.233 | 0.434 |
| 2.202*S − 12.179 | for | 6.667 < S < 8.333 | 6.667 | 2.504 |
| Post Height < | | | 8.333 | 6.173 |
| −25.555*S + 219.122 | for | 7.778 < S < 8.333 | 7.778 | 20.356 |
| −5.585*S + 63.794 | for | 4.000 < S < 7.778 | 4.000 | 41.455 |
| 3.214*S + 28.600 | for | 1.793 < S < 4.000 | 1.793 | 34.362 |
| 21.749*S − 4.633 | for | 0.233 < S < 1.793 | 0.233 | 0.434 |

Figure 44:
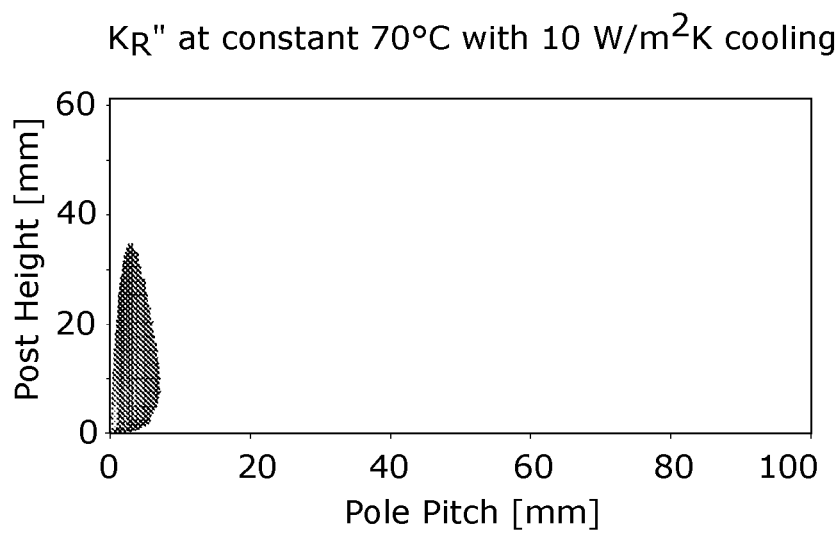
FIG. 44 shows the region of benefit for KR", with respect to the rest of the geometries in the domain, for a machine with 100 mm size and a boundary line for KR">1.7.

In a machine with 100 mm size, the boundary line for $K''_R > 1.7$ is defined by the values in Table 8, and the corresponding graph is FIG. 44.

TABLE 8

Set C2

| Post Height > | | | Points Pole Pitch | Post Height |
|---|---|---|---|---|
| 0.277*S + 0.593 | for | 0.250 < S < 5.182 | 0.250 | 0.662 |
| 2.342*S − 10.111 | for | 5.182 < S < 7.222 | 5.182 | 2.026 |
| Post Height < | | | 7.222 | 6.804 |
| −13.149*S + 101.763 | for | 6.111 < S < 7.222 | 6.111 | 21.412 |
| −4.885*S + 51.265 | for | 3.333 < S < 6.111 | 3.333 | 34.983 |
| 4.291*S + 20.680 | for | 1.520 < S < 3.333 | 1.520 | 27.203 |
| 20.788*S − 4.395 | for | 0.251 < S < 1.520 | 0.251 | 0.823 |
| 161.000*S − 39.588 | for | 0.250 < S < 0.251 | 0.250 | 0.662 |

Figure 45:
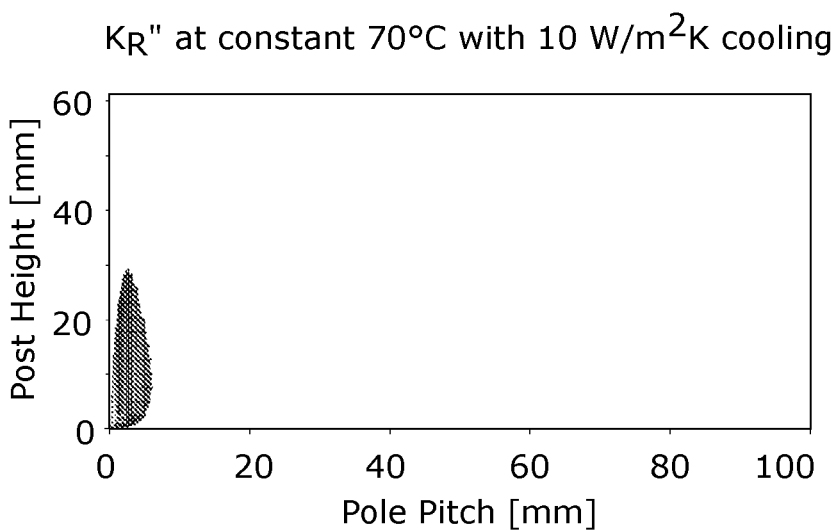
FIG. 45 shows the region of benefit for KR", with respect to the rest of the geometries in the domain, for a machine with 100 mm size and a boundary line for KR">1.9.

In a machine with 100 mm size, the boundary line for $K''_R > 1.9$ is defined by the values in Table 9, and the corresponding graph is FIG. 45.

TABLE 9

Set C3

| Post Height > | | | Points Pole Pitch | Post Height |
|---|---|---|---|---|
| 0.277*S + 0.591 | for | 0.278 < S < 4.425 | 0.278 | 0.668 |
| 1.916*S − 6.663 | for | 4.425 < S < 6.111 | 4.425 | 1.817 |
| Post Height < | | | 6.111 | 5.048 |
| −21.337*S + 135.438 | for | 5.556 < S < 6.111 | 5.556 | 16.890 |
| −4.985*S + 44.588 | for | 3.175 < S < 5.556 | 3.175 | 28.76 |

TABLE 9-continued

Set C3

| Post Height > | | | Points Pole Pitch | Post Height |
|---|---|---|---|---|
| 2.749*S + 20.031 | for | 1.560 < S < 3.175 | 1.560 | 24.320 |
| 18.321*S − 4.260 | for | 0.278 < S < 1.560 | 0.278 | 0.833 |
| | | | 0.278 | 0.646 |

Figure 40:
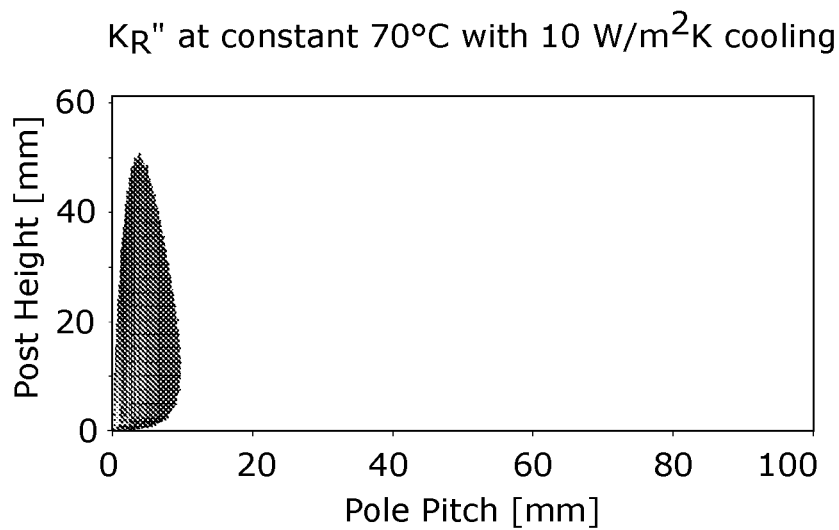
FIG. 40 shows the region of benefit for KR", with respect to the rest of the geometries in the domain, for a machine with 200 mm size and a boundary line for KR">1.3.

In a machine with 200 mm size, the boundary line for $K''_R > 1.3$ is defined by the values in Table 10, and the corresponding graph is FIG. 40.

TABLE 10

Set D1

| Post Height > | | | Points Pole Pitch | Post Height |
|---|---|---|---|---|
| 0.257*S + 0.327 | for | 0.208 < S < 7.778 | 0.208 | 0.381 |
| 1.977*S + −13.044 | for | 7.778 < S < 9.444 | 7.778 | 2.330 |
| Post Height < | | | 9.444 | 5.623 |
| −36.195*S + 347.445 | for | 8.889 < S < 9.444 | 8.889 | 25.711 |
| −5.777*S + 77.062 | for | 4.833 < S < 8.889 | 4.833 | 49.142 |
| 1.950*S + 39.718 | for | 2.222 < S < 4.833 | 2.222 | 44.051 |
| 20.301*S + −1.058 | for | 0.389 < S < 2.222 | 0.389 | 6.839 |
| 34.481*S + −6.574 | | 0.208 < S < 0.389 | 0.208 | 0.598 |
| | | | 0.208 | 0.381 |

Figure 41:
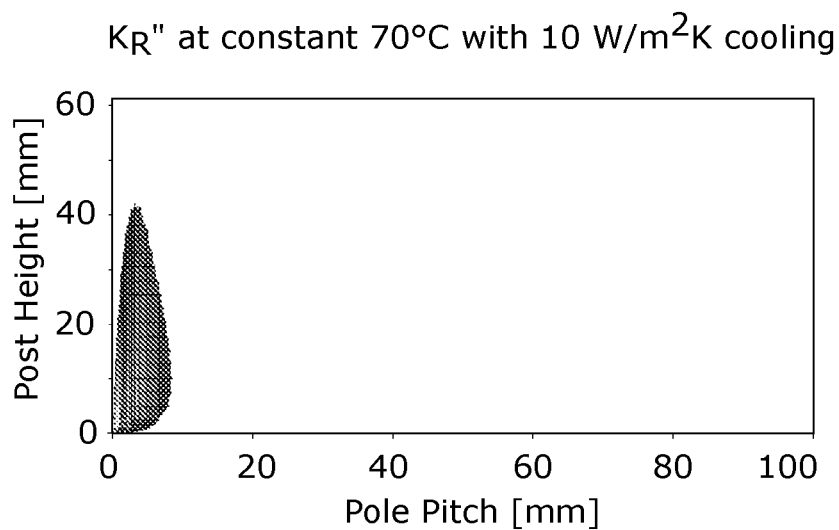
FIG. 41 shows the region of benefit for KR", with respect to the rest of the geometries in the domain, for a machine with 200 mm size and a boundary line for KR">1.5.

In a machine with 200 mm size, the boundary line for $K''_R > 1.5$ is defined by the values in Table 11, and the corresponding graph is FIG. 41.

TABLE 11

Set D2

| Post Height > | | | Points Pole Pitch | Post Height |
|---|---|---|---|---|
| 0.322*S + 0.359 | for | 0.233 < S < 6.667 | 0.233 | 0.434 |
| 2.202*S + −12.179 | for | 6.667 < S < 8.333 | 6.667 | 2.504 |
| Post Height < | | | 8.333 | 6.173 |
| −25.555*S + 219.122 | for | 7.778 < S < 8.333 | 7.778 | 20.356 |
| −5.585*S + 63.794 | for | 4.000 < S < 7.778 | 4.000 | 41.455 |
| 3.214*S + 28.600 | for | 1.793 < S < 4.000 | 1.793 | 34.362 |
| 21.749*S + −4.633 | for | 0.233 < S < 1.793 | 0.233 | 0.434 |

Figure 42:
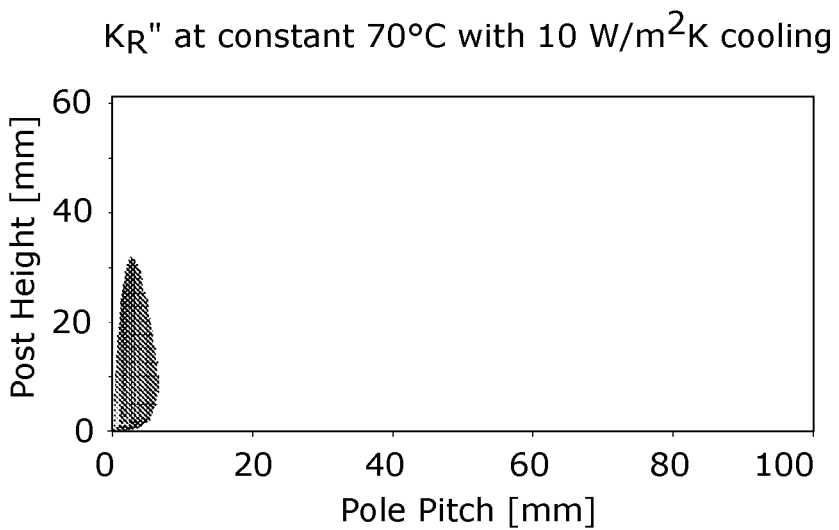
FIG. 42 shows the region of benefit for KR", with respect to the rest of the geometries in the domain, for a machine with 200 mm size and a boundary line for KR">1.8.

In a machine with 200 mm size, the boundary line for $K''_R > 1.8$ is defined by the values in Table 12, and the corresponding graph is FIG. 42.

TABLE 12

Set D3

| Post Height > | | | Points Pole Pitch | Post Height |
|---|---|---|---|---|
| 0.212*S + 0.600 | for | 0.264 < S < 4.833 | 0.264 | 0.656 |
| 3.017*S + −12.960 | for | 4.833 < S < 6.667 | 4.833 | 1.623 |
| Post Height < | | | 6.667 | 7.157 |
| −12.356*S + 89.531 | for | 5.556 < S < 6.667 | 5.556 | 20.884 |
| −4.551*S + 46.170 | for | 3.175 < S < 5.556 | 3.175 | 31.72 |
| 3.850*S + 19.496 | for | 1.502 < S < 3.175 | 1.502 | 25.279 |
| 19.751*S + −4.387 | for | 0.264 < S < 1.502 | 0.264 | 0.827 |
| | | | 0.264 | 0.656 |

At each machine size, each boundary line is defined for a given K" value, such that for each machine size there is a set of K" values and a corresponding set of boundary lines. Pairs of boundary lines can be chosen, in which one boundary line is chosen from each of two consecutive sizes of device, i.e. 25 mm and 50 mm, 50 mm and 100 mm, or 100 mm and 200 mm. The boundary lines occupy a space or volume defined by size, pole pitch and post height. A boundary surface may be defined as the two-dimensional uninterrupted surface in the space that is the exterior surface of the union of all lines that connect an arbitrary point in the first boundary line and an arbitrary point in the second boundary line. The boundary surface encloses a benefit space. For each pair of boundary lines, the boundary surface defines a benefit space. An electric machine with a size, pole pitch and post height that is within a given benefit space is considered to fall within the embodiment defined by the corresponding boundary lines for that size of machine.

For machine sizes greater than the largest calculated size, the boundary lines calculated for the largest calculated size are used. The benefit space beyond the largest calculated size is thus simply the surface defined by the calculated boundary lines for that size and the volume of points corresponding to greater size but with pole pitch and post height equal to a point on the surface.

The main components of an electric machine comprise a first carrier (rotor, stator, or part of linear machine) having an array of electromagnetic elements and a second carrier having electromagnetic elements defining magnetic poles, the second carrier being arranged to move relative to the first carrier for example by bearings, which could be magnetic bearings. The movement may be caused by interaction of magnetic flux produced by electromagnetic elements of the first carrier and of the second carrier (motor embodiment) or by an external source, in which case the movement causes electromotive force to be produced in windings of the electric machine (generator embodiment). An airgap is provided between the first carrier and the second carrier. The electromagnetic elements of the first carrier include posts, with slots between the posts, one or more electric conductors in each slot, the posts of the first carrier having a post height in mm. The first carrier and the second carrier together define a size of the electric machine. The magnetic poles having a pole pitch in mm. The size of the motor, pole pitch and post height are selected to fall within a region in a space defined by size, pole pitch and post height. The region is defined by 1) a union of a) a first surface defined by a first set of inequalities for a first size of electric machine, b) a second surface defined by a second set of inequalities for a second size of electric machine; and c) a set defined as containing all points lying on line segments having a first end point on the first surface and a second end point on the second surface, or 2) a surface defined by a set of inequalities and all points corresponding to greater size but with pole pitch and post height corresponding to points on the surface.

The first set of inequalities and the second set of inequalities are respectively sets of inequalities A and B, or B and C, or C and D where A is selected from the group of sets of inequalities consisting of the equations set forward in Tables 1, 2 and 3 (respectively sets of equalities A1, A2 and A3), B is selected from the group of sets of inequalities consisting of the equations set forward in Tables 4, 5 and 6 (respectively sets of equalities B1, B2 and B3), C is selected from the group of sets of inequalities consisting of the equations set forward in Tables 7, 8 and 9 (respectively sets of inequalities C1, C2, C3) and D is selected from the group of sets of inequalities consisting of the inequalities set forward in Tables 10, 11 and 12 (respectively sets of inequalities D1, D2 and D3).

The space in which the electric machine is characterized may be formed by any pair of inequalities that are defined by sets of inequalities for adjacent sizes, for example: A1 B1, A1 B2, A1 B3, A2 B1, A2 B2, A2 B3, A3 B1, A3 B2, A3 B3, B1 C1, B1 C2, B1 C3, B2 C1, B2 C2, B2 C3, B3 C1, B3 C2, B3 C3, C1 D1, C1 D2, C1 D3, C2 D1, C2 D2, C2 D3, C3 D1, C3 D2, C3 D3. It may also be formed by any set of inequalities and all points corresponding greater size but having post height and pole pitch within the region defined by the set of inequalities.

All of the devices described in this application may have sizes, pole pitches and post heights falling within the regions and spaces defined by these equations.

The range of geometry may provide unusually high torque-to-weight for a given electrical power input. This efficiency is independent of temperature. For example, at a given torque-to-weight, an actuator inside the disclosed range, may run cooler, for a given method of cooling, than a similar actuator outside of the disclosed range, because device in the disclosed range will use less power.

The low conductor volume, in this case has the benefit of lower thermal resistance due to the shorter conductors. Within the disclosed range, the need to power these conductors at higher current densities is more than compensated for by the heat dissipation benefits of the device to achieve a given torque-to-weight. Within the disclosed $K''_R$ range, the reduction in weight (which results, in part, from the low conductor volume) can exceed the extra power required (which results from the higher current densities) such that net benefit can be produced in terms of KR. The stated ranges of geometry in a machine of the given diameter provides a heat dissipation effect associated with feature geometry known for much smaller machines, but used according to the principles of the present device, in a large diameter machine.

For clarity, cooling is still needed to achieve the KR benefit, but it is assumed for the $K_R$ calculation that adequate cooling is used. For some motors and applications, radiative cooling is sufficient. For others a fan and cooling fins is needed. For others at full power, water cooling is needed.

For the disclosed electric machine, the $K_R$ is the same at low to high power output (until the stator saturates at which time the $K_R$ will be reduced) so different levels of cooling will be needed depending on the power output but the torque-to-weight-to-power consumption remains reasonably constant. The disclosed range of pole density and conductor volume may provide unusually high torque-to-weight for a given rate of heat dissipation with a given method of cooling. The disclosed range of pole density and conductor volume may produce higher torque-to-weight for a given cooling method applied to the back surface of the stator and a given conductor temperature. The primary form of electrical conductor cooling for the disclosed range of pole density and electrical conductor volume is thermal conductive heat transfer from the electrical conductors to the back surface of the stator.

Heat can be extracted from the back surface of the stator though direct contact with a cooling fluid or through conduction to another member such as a housing, or through radiation, for example. Other surfaces of the stator or conductors can also be cooled by various means. Cooling the back surface of the stator is shown to be a cost effective and simple option for many motor types. A sample analysis (not shown here) indicates that geometry in the disclosed range which shows better heat dissipation from the back surface of the stator (as compared to motors outside of the disclosed range) will also generally show improved heat dissipation than motors outside of the disclosed range when other surfaces of the stator or conductors are cooled. The back surface of the stator is, therefore, viewed as a useful cooling surface, as well as an indicator of the effectiveness of each motor in the series to the application of cooling to other surfaces of the stator and conductors. The back surface of the stator has been chosen for the main cooling surface for the motor series analysis which is used to identify the disclosed range.

Other methods of cooling may be applied to an electric machine with the disclosed range of pole density and conductor volume, but the heat flow path from conductors to the back of the stator will preferably always be used for cooling the motor regardless of what other types of cooling (EG: direct coil cooling) are used.

Stator back iron may have an axial depth that is 50% of the width (circumferential or tangential width) of the posts. The posts may each have a tangential width and the stator may comprise a backiron portion, end iron and side iron, the backiron portion having a thickness equal to or less than half of the tangential width of the posts, or may be less than the tangential width of the posts. Thicker back iron adds weight with minimal benefit. Thinner backiron helps with cooling but the effect of back iron thickness on cooling is not very significant. The backiron surface may be in physical contact with the housing to conduct heat physically from the stator to the housing, and/or the back surface of the stator can be exposed to an actively circulated cooling fluid and/or the back surface of the stator can be configured for radiative heat dissipation to the atmosphere or to the housing or other components, and/or the back surface of the stator can be configured for convective or passive cooling through movement of air or liquid over the surface of the stator and or housing. Gas or liquid moving past the back surface of the stator may be contained or not contained. The back surface of the stator may be sealed from the atmosphere or exposed to the atmosphere. The atmosphere may be air or water or other fluid surrounding the actuator. The environment may also be a vacuum, such as is necessary for some manufacturing processes or the vacuum of space. The back surface of the stator may be configured with cooling fins which increase the surface area. These cooling fins may be exposed to a cooling fluid and/or in contact with a heat sink such as the housing or other solid member. The cooling fins on a stator may have a height greater than 50% of the post width in the circumferential direction.

In addition to heat being dissipated from the back surface of the stator, other heat dissipating surfaces may include the surface of a post which may be exposed to a cooling fluid such as air or liquid which is circulated through a slot such as between a conductor and the post.

Other methods of cooling the stator and/or the conductors may include cooling channels on or below the surface of the stator and/or on or below the surface of the conductors. These and other forms of cooling are seen as supplementary to the primary thermally conductive cooling from the conductors to the back surface of the stator. In some cases the supplementary cooling methods may even draw more heat away from the stator than the primary conductive cooling effect, but active cooling methods require energy and additional cost and complexity, so the conductive cooling path from the conductors to the back surface of the stator is disclosed here as the primary mode of cooling.

For a single actuator producing a fixed torque, the power consumption rises in the disclosed range, and becomes exponentially larger towards the smallest post heights and slot pitches inside the disclosed range. From simulations of the power consumption necessary to produce 100 N m of torque with a single 200 mm average airgap diameter actuator with a radial tooth length of 32 mm and rotor and windings, it can be seen that the lowest power consumption occurs outside of the disclosed range, and that the power consumption increases significantly inside the disclosed range. In order to minimize power consumption, a designer would be led toward larger slot pitch and larger conductor volume devices. Any actuators using the geometry of the present device will have higher power consumption than those outside of the disclosed range towards larger slot pitch and conductor volume values for this type of application.

With the disclosed structure, in which a pole carrier of the electric machine includes slots and posts, the slots having a slot or pole pitch s and the posts having a height h, in which s is related to h according to the disclosed equations, electric excitation may be applied to conductors in the slots with a current density of at least 70 A/mm2 Electric excitations in excess of 70 A/mm$^2$ are generally considered suitable for the operation of the disclosed device. The cooling effect of having the disclosed slot and conductor structure provides cooling to offset some or all of the heat generated by the current in the conductors. Any remaining heat generated may be dissipated using one or more of the disclosed cooling structures or channels. Motors inside the disclosed range show a reduction of the average flux density in the magnetic flux path for a given electrical input power. This is due, in part, to the reduced flux path length of the shorter posts and reduced distance from post to adjacent post through the backiron, as well as the reduced flux leakage between posts. The result is the ability to run higher current density in motors in the disclosed range without reaching saturation. The combination of increased cooling capability and lower flux density at a given current density as compared to motors outside of the disclosed range, creates a combination of conditions where higher continuous torque-to-weight can be achieved for a given temperature at a given cooling rate, and where the peak momentary torque-to-weight of motors in the disclosed range can be significantly higher due to operating at a lower flux density for a given torque-to-weight in the disclosed range.

One of the most significant challenges that must be overcome in order to achieve the performance and power consumption benefits of the disclosed geometry, is to provide a structure that can withstand the immense magnetic forces that exists between the rotor and stator. Embodiments of the disclosed rotor can achieve unusually high flux density in the airgap leading to high attraction forces on the stator posts. At the same time, achieving the high torque-to-weight of an embodiment of the disclosed electric machine requires the use of a backiron that has an axial thickness that, in an embodiment, is less than the circumferential thickness of the posts (and, in an embodiment, is about half of the thickness of the posts). Furthermore, the axial flux motor configuration disclosed and the relatively short stator posts of the disclosed range results in an inherently thin stator structure. With a radial flux motor, circular laminates with integrated posts can be used. This has an inherent rigidity and naturally provides a desirable flux path along the circumferential and radial orientation of the laminates. In contrast, the axial flux function of an embodiment of the present device requires an assembly of individual laminated parts. The result is the need to manufacture up to hundreds of post components for each actuator, which increases manufacturing complexity, time and cost. Furthermore, the relatively thin backiron does not provide an adequate surface area for many potting compounds or adhesives to reliably fix the posts to the backiron, especially at the high frequency force variation and elevated temperatures that are common to electrical machines. As an example, a typical aerospace adhesive that might be used to fix a stator post into a receiving slot in the stator, might have a heat deflection temperature of under 80 deg C. for a stress on the epoxy of less than 300 psi.

The back-iron disk of an embodiment can be made of laminates, powdered metal, or solid metal. The use of laminates has certain advantages, including the possibility of stamped material construction; however; if laminates are used, they must be attached through means capable of withstanding the forces and temperatures of operation of the device. Common methods such as glue may not be sufficient for certain regimes of operation where the forces and/or temperatures are high. Nonetheless, laminations may be a good choice for other regimes, and are expected to work well for many high-speed applications.

The use of powdered metal with electrical insulator coating on each particle for the back-iron of an embodiment has the advantage of reducing eddy currents. This coating, however, will typically reduce the magnetic force because it acts like multiple tiny airgaps in the flux path. This material is also typically less strong than solid steel or iron with significantly higher creep rate, especially at elevated temperatures A stator manufactured of solid steel typically has high eddy current losses. However, geometric features of motors in the disclosed range have an eddy current and hysteresis reducing effect that, in some regimes of operation of embodiments of the present device, for instance when operating at speeds which are suitable for robotics, the eddy current losses may be sufficiently low to enable the use of a solid stator. Using solid material is advantageous for strength, rigidity, heat resistance, and fatigue strength. Since embodiments of the present device can often generate sufficient torque to be used without a gearbox in certain applications, the resulting operational speeds may be sufficiently low that the eddy current losses be acceptable even with a solid steel stator. Solid cast iron has been found to give sufficiently low eddy current losses to be practical with some configurations and regimes of operation.

Stators may be constructed of either laminated stacks or a sintered powdered metal. An objective of these constructions, as compared to the use of solid materials, is to reduce the cross sectional area of electrically insulated soft magnetic material perpendicular to the flux path and thus reduce the generation of eddy currents. Eddy currents reduce the efficiency by requiring additional input power; they produce extra heat which must be dissipated by the system; and they reduce the output torque by creating a damping effect A single-piece stator fabricated from a solid electrically conductive material may be used with embodiments of the disclosed device within the disclosed ranges of pole density and post height. To avoid eddy current generation, the application should be sufficiently low speed, for example a duty cycle that consists of 50% (60%, 70%, 80%, 90%) of the operation at 200 rpm or less for a 175 mm average airgap diameter motor having the disclosed range of geometry. By combining this relatively low speed range with the relatively small cross sectional geometry of the stator teeth in the disclosed range, the individual stator teeth act somewhat like laminations and reduce the production of eddy currents. Speeds of less than 200 rpm are generally considered suitable for the operation of the device. Speeds of less than 100 rpm, less than 50 rpm and less than 25 rpm are also considered suitable for the operation of the device.

Additionally, the production of eddy currents is reduced by the relatively short tooth height in the disclosed range. Eddy current and hysteresis losses are volumetric, so the low volume of the present device contributes to the reduction of total iron losses for a given flux density and switching frequency.

The continuous flux path may be provided by a stator made of isotropic materials such as ductile iron, steel alloy such as cobalt or silicon steel, pressed or sintered powdered metal, for example. The metal may be isotropic from post to adjacent post and non-isotropic from a post to a bearing race or a post to a member or assembly that connects to a bearing, including variable material alloy from backiron to cooling fins and/or to bearings. This can be done by explosion welding or fused deposition additive manufacturing, or stir welding or other forms of combining dissimilar materials.

The stator may be one piece or unitary from a post to an adjacent post and from a post to a bearing race seat. The stator may be unitary from a post to a post and from one of these posts to a member or assembly that is in compression so-as to pre-load a bearing. The stator may be unitary from a post to a post and from one of these posts to a member or assembly that is in compression so-as to pre-load a bearing and all or part of the compressive load is a result of magnetic attraction between the stator and a rotor. In cases of pre-loaded bearings, the housing assembly may be flexible enough to displace the bearing race seat in the direction of bearing preload past the bearing seat position if the bearing is present, by more than 0.002" if the bearing is not present. In cases of pre-loaded bearings, the housing assembly may be flexible enough to displace the bearing race seat in the direction of bearing preload, past the bearing seat position if the bearing is present, by more than 0.002" if the bearing is not present and the force exerted on the stator to cause this deformation of the housing is provided at least in part, by the magnetic attraction of a stator to a rotor.

An embodiment of an electric machine with inner and outer bearings supporting a rotor will now be described.

FIG. 52 to FIG. 59 show an overview and simplified section views of an exemplary stator 3802 and rotor 3801 of a device within the disclosed range of pole density and post height inserted into a robot arm 3800 as a frameless motor/actuator. Note that conductors and wiring are not shown in these figures for simplicity. An outer bearing 3804 that is used for the arm pivot support is also used to define an airgap 3809. This allows the frameless actuator to be used in the system without the mass and complexity of a separate actuator housing. An additional bearing 3808 may be used on the ID of the frameless actuator assembly in conjunction with a spacer ring 3803 to maintain the desired airgap dimension with a longer radial post length. Interlocking features 3812 (FIG. 59), allow the attachment of the stator 3802 to lower arm housings 3806 and 3807 by sliding the stator tabs 3812 between the housing tabs 3816 and locking them into place according to an up-and-over path 3815 in FIG. 57. Similar tabs 3814 on the rotor secure the rotor 3801 to upper arm housing 3805, 3810 and the inner bearing spacer ring 3803. The mass of the stator and rotor is only increased by the additional securing features 3814, 3812 and the weight of the bearing spacer ring 3803 and inner bearing 3808. The spacer element 3803 can be made of a low density materials such as aluminum or magnesium. This exemplary embodiment has a 175 mm average airgap diameter and 25 mm radial post length. The isotropic steel alloy or iron alloy stator 3802 and isotropic steel alloy or iron alloy rotor 3801 with backiron are sufficiently rigid to maintain a 0.005" airgap when supported at the ID and OD with a bearing.

In an embodiment, the magnetic attraction between the rotor 3801 and stator 3802 can be used to provide preload on the bearings 3804, 3808 and may be used to reduce or eliminate the need for fasteners to keep the bearings seated in upper and lower arm housings 3805, 3806, respectively. This construction is considered to be beneficial in terms of simplicity and light weight to the point of allowing the entire arm assembly to be lighter than if it used a motor outside of the disclosed range.

Due to the axially inward magnetic attraction between the rotor 3801 and the stator 3802, they must both be secured to prevent movement toward each other at the airgap 3809. It is beneficial to achieve a light weight but stiff robot arm housing, so this exemplary embodiment provides a way to assemble the arm and magnetic components from the airgap axial end of the actuator. This is accomplished by the use of an array of tabs 3812, 3814 on the OD of the stator 3802 and rotor 3801 which allow the stator and rotor to be inserted in to the housings 3805, 3806 and then turned to engage with the matching array of tabs 3816, 3813 on the housings 3805, 3806. Threaded engagements would be another option.

Once the rotor 3801 and stator 3802 are assembled in their respective arms, the upper arm assembly with stator and lower arm assembly with rotor are brought together. The force between the rotor and stator will then preload the bearings 3804, 3808 and hold the arm joint together with up to approximately 400 KG of axial force for a device of this size.

A 10 OD actuator of the present device can have a passive PM preload of up to 1500 lbs or more between the stator or rotor. This makes it very challenging and even dangerous to assemble. Embodiments of the present device allow PM's to be inserted after the stator and rotor are assembled together. This allows precision and low risk alignment of the stator and rotor and bearings and connections before any PM's and their magnetic force is added to the assembly.

The ability to add and remove the magnets individually may be very helpful for large motor/actuators to allow disassembly for servicing of bearings etc. The only tools needed for such a procedure would be a magnet removal tool. If the magnets could not be removed before removing the rotor, a large actuator could require 10,000 lbs of force or more to remove the rotor.

By using a bearing on the ID and OD of an axial or conical motor, a reasonably consistent axial preload can be achieved on the bearings. This has a number of potential advantages: (a) no bearing race retention may be needed in the opposite axial direction, (b) the preload of the bearing may remain reasonably constant despite bearing seating, wear, or thermal expansion because the preload is provided by magnetic attraction which does not vary significantly if the bearing race seats move relatively to each other in the axial direction by as much as would be expected in normal service and (c) this may also have the additional advantage of allowing lower axial manufacturing tolerance Although the foregoing description has been made with respect to preferred embodiments of the present invention it will be understood by those skilled in the art that many variations and alterations are possible. Some of these variations have been discussed above and others will be apparent to those skilled in the art.

In the claims, the word "comprising" is used in its inclusive sense and does not exclude the possibility of other elements being present. The indefinite article "a/an" before a claim feature does not exclude more than one of the feature being present unless it is clear from the context that only a single element is intended. A reference to claims 1-N means any one or claims 1-N where N is a positive natural number.

We claim:

1. An electric machine comprising:
   a stator having an array of electromagnetic elements, the stator defining a stator axis;
   a rotor having permanent magnetic elements defining magnetic poles, the rotor carrier defining a center rotor axis;
   an airgap being formed between the rotor and the stator when the stator and the rotor are in an operational position;
   an inner bearing connecting the rotor and the stator, the inner bearing being arranged to allow relative rotary motion of the stator and the rotor;
   an outer bearing connecting the rotor and the stator, the outer bearing being arranged to allow relative rotary motion of the stator and the rotor;
   the electromagnetic elements of the stator and the permanent magnetic elements of the rotor having a magnetic attraction between each other; and
   wherein the rotor further comprises a plurality of posts in which the permanent magnetic elements of the rotor are placed between the plurality of posts, and the rotor further comprising a plurality of inner flux restrictors lying radially inward from the plurality of posts and radially outward from the rotor axis, and in which the plurality of inner flux restrictors further comprises a plurality of holes, and
   wherein the inner flux restrictors lie radially outwardly of the inner bearing.

2. The electric machine of claim 1, wherein the plurality of inner flux restrictors further comprises a plurality of through holes.

3. The electric machine of claim 1, wherein the plurality of holes have a circular cross-section.

4. The electric machine of claim 1, wherein the plurality of holes have the same geometry.

5. The electric machine of claim 1, wherein the stator comprises N posts and the permanent magnetic elements of the rotor further comprises M poles, in which N and M have a greatest common divisor of four or more.

6. The electric machine of claim 5, wherein both N and M are 60 or more.

7. The electric machine of claim 1 wherein the inner bearing and outer bearing are roller bearings.

8. The electric machine of claim 1 wherein the inner bearing and outer bearing are ball bearings.

9. The electric machine of claim 1, wherein the stator and rotor are arranged in an axial configuration.

10. The electric machine of claim 1, wherein the stator and rotor are arranged in a radial configuration.

11. The electric machine of claim 10, wherein the rotor is positioned internal to the stator.

12. The electric motor of claim 1, wherein each of the inner flux restrictors are radially aligned with one of the posts.

13. The electric motor of claim 1, wherein the inner flux restrictors lie adjacent to each post.

14. The electric motor of claim 1, wherein the inner flux restrictors lie adjacent to every second post.

15. An electric machine comprising:
    a stator having an array of electromagnetic elements, the stator defining a stator axis;
    a rotor having permanent magnetic elements defining magnetic poles, the rotor carrier defining a center rotor axis;

an airgap being formed between the rotor and the stator when the stator and the rotor are in an operational position;

an inner bearing connecting the rotor and the stator, the inner bearing being arranged to allow relative rotary motion of the stator and the rotor;

an outer bearing connecting the rotor and the stator, the outer bearing being arranged to allow relative rotary motion of the stator and the rotor;

the electromagnetic elements of the stator and the permanent magnetic elements of the rotor having a magnetic attraction between each other; and wherein the rotor further comprises a plurality of posts in which the permanent magnetic elements of the rotor are placed between the plurality of posts, and the rotor further comprising a plurality of inner flux restrictors lying radially inward from the plurality of posts and radially outward from the rotor axis, and in which the plurality of inner flux restrictors further comprises a plurality of holes, and wherein the plurality of inner flux restrictors further comprises a plurality of blind holes.

16. An electric machine comprising:

a stator having an array of electromagnetic elements, the stator defining a stator axis;

a rotor having permanent magnetic elements defining magnetic poles, the rotor carrier defining a center rotor axis;

an airgap being formed between the rotor and the stator when the stator and the rotor are in an operational position;

an inner bearing connecting the rotor and the stator, the inner bearing being arranged to allow relative rotary motion of the stator and the rotor;

an outer bearing connecting the rotor and the stator, the outer bearing being arranged to allow relative rotary motion of the stator and the rotor;

the electromagnetic elements of the stator and the permanent magnetic elements of the rotor having a magnetic attraction between each other; and wherein the rotor further comprises a plurality of posts in which the permanent magnetic elements of the rotor are placed between the plurality of posts, and the rotor further comprising a plurality of inner flux restrictors lying radially inward from the plurality of posts and radially outward from the rotor axis, and in which the plurality of inner flux restrictors further comprises a plurality of holes, and wherein the rotor further comprises a plurality of outer flux restrictors lying radially outwardly from the plurality of posts and radially inwardly from the outer bearing.

* * * * *